United States Patent [19]
Mueller et al.

[11] Patent Number: 5,927,653
[45] Date of Patent: Jul. 27, 1999

[54] TWO-STAGE REUSABLE EARTH-TO-ORBIT AEROSPACE VEHICLE AND TRANSPORT SYSTEM

[75] Inventors: George E. Mueller, Santa Barbara, Calif.; Walter P. Kistler, Redmond; Thomas G. Johnson, Bellevue, both of Wash.; Henry O. Pohl, Seabrook, Tex.; Chris McLain, Portland, Oreg.; Allan S. Hill, Kent; Jason E. Andrews, Seattle, both of Wash.; Thomas C. Taylor, Las Cruces, N.M.; Aaron Cohen, College Station, Tex.; Dale Myers, Leucadia, Calif.; Adam P. Bruckner, Seattle, Wash.; Steven C. Knowles, Seattle, Wash.; Richard Warwick, Seattle, Wash.

[73] Assignee: Kistler Aerospace Corporation, Kirkland, Wash.

[21] Appl. No.: 08/632,786

[22] Filed: Apr. 17, 1996

[51] Int. Cl.[6] .................................................. B64G 1/40
[52] U.S. Cl. .................. 244/172; 244/158 R; 244/160; 244/172; 244/138 R; 244/164
[58] Field of Search ............................. 244/172, 158 R, 244/63, 16, 160, 138 R, 164, 100 A, 129.4, 129.5; 102/377, 378

[56] References Cited

U.S. PATENT DOCUMENTS

| | | |
|---|---|---|
| 1,739,193 | 12/1929 | Ward . |
| 1,874,423 | 8/1932 | Belleville . |
| 1,914,573 | 6/1933 | Kookogey . |
| 2,841,107 | 7/1958 | Scheider ................................. 114/43.5 |
| 2,977,080 | 3/1961 | Von Zborowski ....................... 244/140 |
| 3,000,593 | 9/1961 | Eggers et al. ................................. 244/2 |
| 3,122,098 | 2/1964 | Glennan ................................... 102/378 |
| 3,168,266 | 2/1965 | Yost ..................................... 244/138 R |
| 3,221,656 | 12/1965 | Sutten ................................. 244/138 R |

(List continued on next page.)

FOREIGN PATENT DOCUMENTS

| | | |
|---|---|---|
| 2073449 | 10/1971 | France . |
| 5-213282 | 8/1993 | Japan . |
| WO 96/01468 | 2/1996 | WIPO . |

OTHER PUBLICATIONS

Pfeffer, H: "Towards Resuable Launchers—A Widening Perspective" ESA Bulletin, No. 87, Aug., 1996, pp. 58–65, XP000624079.

Bono, P.: "The Resuable Booster Paradox–13 Aircraft Technology or Operations?" Spaceflight, vol. 9, No. 11, Nov. 1967, pp. 379–387.

Hale, Francis *Introduction to Space Flight*, Prentice Hall, Englewood Cliffs, NJ Copyright 1994.

*Primary Examiner*—Charles T. Jordan
*Assistant Examiner*—Tien Dinh
*Attorney, Agent, or Firm*—Seed amd Berry LLP

[57] ABSTRACT

A two-stage wingless reusable aerospace vehicle having upper and lower stages that take off from a take-off area and separate at a separation point along a first trajectory. The separation forces are generated by air retained between the upper and lower stages, which is at a pressure higher than ambient pressure at the separation point. The lower stage is then propelled along a return trajectory to a landing area. After separation from the lower stage, the upper stage continues to an Earth orbit for deployment of a payload. After deploying the payload, the upper stage moves out of the Earth orbit, re-enters the Earth's atmosphere, and returns to the take-off and landing area. The upper and lower stages are powered by liquid oxygen and kerosene engines. The aerospace vehicle is transported to a take-off area by a transport vehicle having a first fixed carriage and a second translatable carriage that is adapted to move the upper stage relative to the lower stage for assembly of the aerospace vehicle while in the horizontal position. The transport vehicle then pivots the aerospace vehicle from the horizontal to the vertical position for launching.

57 Claims, 26 Drawing Sheets

U.S. PATENT DOCUMENTS

| | | |
|---|---|---|
| 3,260,204 | 7/1966 | Wilkey . |
| 3,285,175 | 11/1966 | Keenan .................................. 102/49 |
| 3,384,016 | 5/1968 | Blanchard . |
| 3,437,285 | 4/1969 | Manfredi et al. ................... 244/172 |
| 3,534,686 | 10/1970 | Watson ................................. 102/378 |
| 3,606,212 | 9/1971 | Paine ..................................... 244/160 |
| 3,702,688 | 11/1972 | Faget ..................................... 244/155 |
| 3,738,597 | 6/1973 | Earl et al. ........................ 244/100 A |
| 3,964,698 | 6/1976 | Earl .................................. 244/100 A |
| 4,265,416 | 5/1981 | Jackson et al. ........................ 244/2 |
| 4,410,151 | 10/1983 | Höppner et al. ..................... 244/63 |
| 4,678,141 | 7/1987 | Sarrantonio ............................ 244/2 |
| 4,709,883 | 12/1987 | Giuliani et al. ...................... 244/63 |
| 4,744,529 | 5/1988 | Clarke ............................. 244/114 R |
| 4,796,839 | 1/1989 | Davis .................................... 244/158 |
| 4,884,770 | 12/1989 | Martin . |
| 5,090,642 | 2/1992 | Saikeld ........................... 244/158 R |
| 5,129,602 | 7/1992 | Leonard ............................. 244/172 |
| 5,143,327 | 9/1992 | Martin ............................. 244/158 R |
| 5,163,640 | 11/1992 | Altobelli ............................ 244/164 |
| 5,217,188 | 6/1993 | Thole et al. .................... 244/158 R |
| 5,295,642 | 3/1994 | Palmer .................................... 244/2 |
| 5,568,901 | 10/1996 | Stiennon ............................... 244/63 |
| 5,626,310 | 5/1997 | Kelly ............................... 244/158 R |

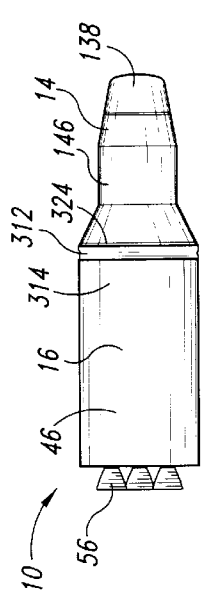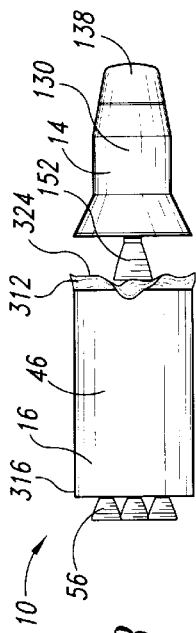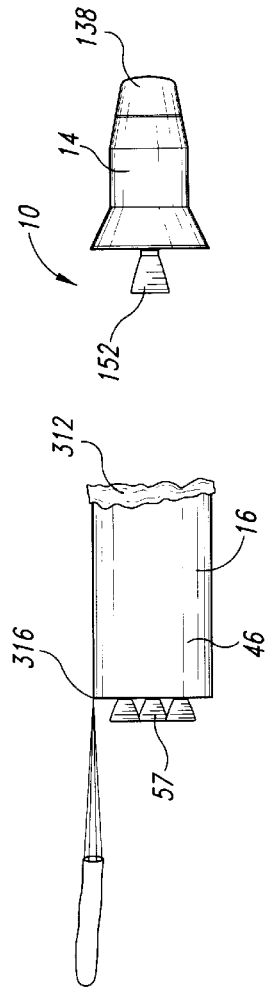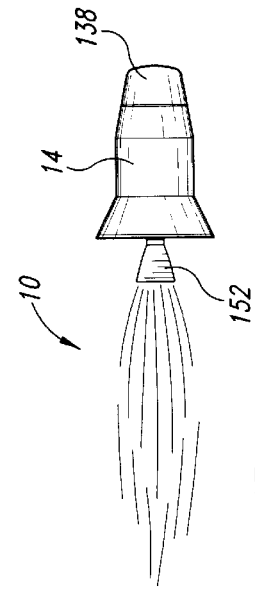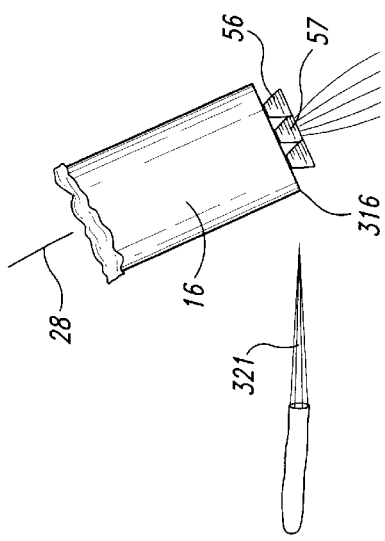
Fig. 14A  Fig. 14B  Fig. 14C  Fig. 14D

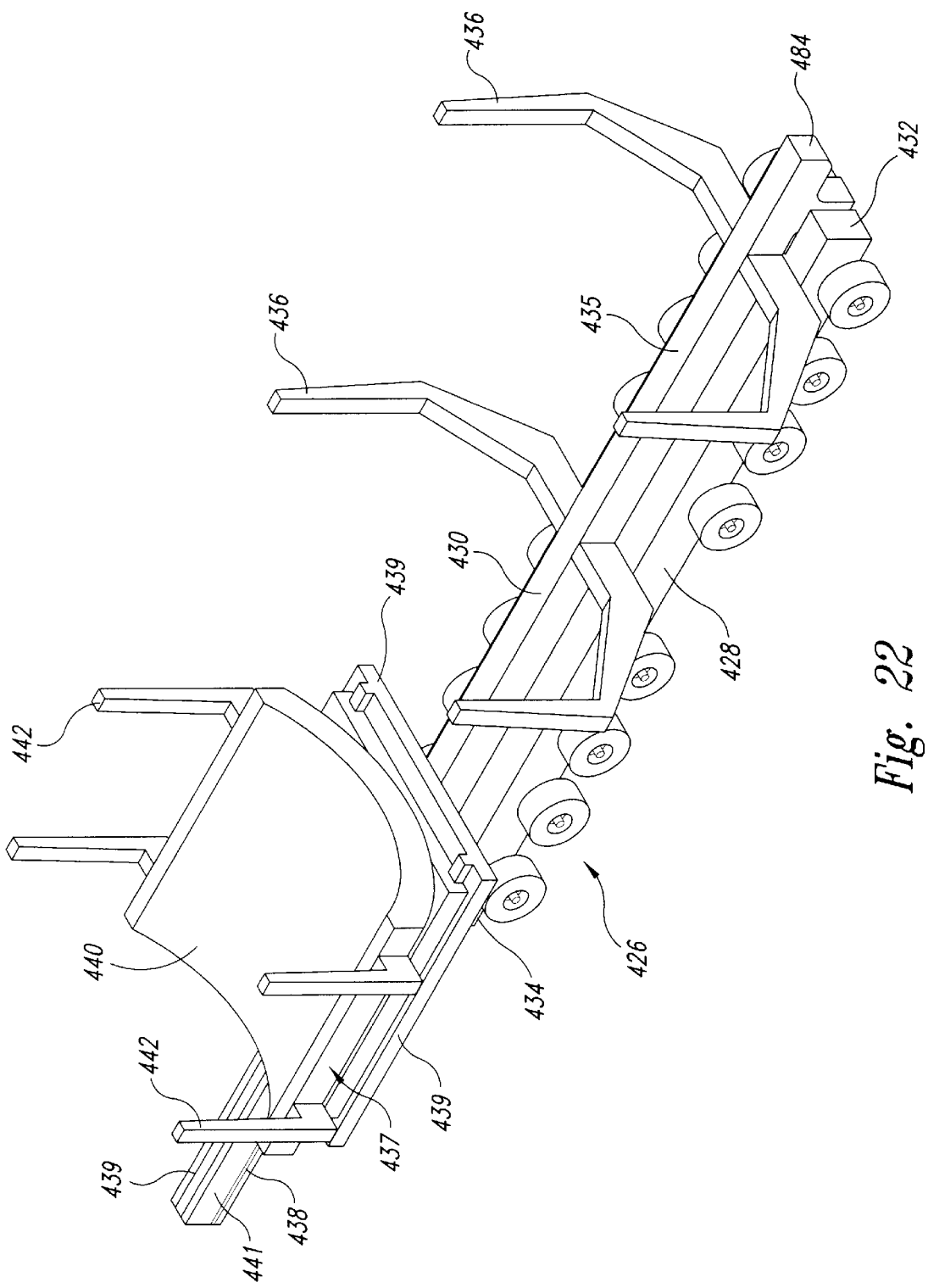

TWO-STAGE REUSABLE EARTH-TO-ORBIT AEROSPACE VEHICLE AND TRANSPORT SYSTEM

TECHNICAL FIELD

The present invention is related to aerospace vehicles and vehicle transport systems, and more particularly to Earth-to-orbit aerospace vehicles used for deployment of payloads, such as satellites, into low Earth orbits, and vehicle transport systems used in recovery, assembly, and take-off of the aerospace vehicles.

BACKGROUND OF THE INVENTION

Private industry and the U.S. government have a greatly increasing need for a safe, reliable, and economical way to transport and deploy satellites and other payloads into selected orbits around the Earth. Satellites for communication, weather monitoring, Global Positioning navigation, Earth sensing, microgravity research, and the like are being carried into space by conventional rockets at extremely high costs. The conventional rockets that can be used to carry and deploy satellites are multiple stage rockets having one or more expendable stages that are sequentially discarded during ascent and dumped into the ocean. The last stage of such a rocket remains in orbit where it contributes to a growing mass of useless space junk orbiting around the Earth.

One of the most significant problems facing industry with respect to satellite deployment is the extremely high cost to transport the satellite from the Earth into a desired orbit. As an example, one launch of an unmanned Delta rocket presently costs approximately $40 million, and a single launch of a larger unmanned Titan rocket presently costs approximately $200 million. Each rocket is used only once, so a failure during any part of the mission can be very costly, and typically the costs are substantially unrecoverable. These high costs are prohibitive for many companies, and the result is an over-demand for use of satellites presently orbiting Earth.

The NASA space shuttle was developed in an attempt to reduce the cost of space travel and to minimize the amount of space junk resulting from a satellite deployment. The space shuttle uses a very complex winged stage, known as an orbiter, that carries three or more astronauts and a payload into orbit, and the orbiter is then flown back to Earth and landed at a landing strip. The orbiter is launched from Earth into space using two solid propellant booster rockets and a very large expendable liquid hydrogen fuel tank. The liquid hydrogen fuel is extremely volatile, and extensive redundant safety systems are required for each space shuttle launch, which increase the cost of each launch.

As the space shuttle climbs along its ascending trajectory, the liquid hydrogen is consumed and the large tank is jettisoned into the ocean and is never reused. The solid propellant booster rockets are also jettisoned and fall back to Earth into the ocean. The booster rockets are recovered from the ocean and reused only after extensive and expensive refurbishing. The orbiter returns to Earth through the outer atmosphere, and the astronauts guide the orbiter through the lower atmosphere using control surfaces on the orbiter's wings to fly the orbiter to the selected landing strip. Once the orbiter has landed, it can be reused with a new liquid hydrogen fuel tank and new or refurbished solid propellant booster rockets.

The space shuttle program has not achieved the goal of making space more accessible to private industry, due primarily to the loss of expensive hardware, the high cost of rocket booster refurbishment, and the cost of redundant safety systems required for a manned flight utilizing liquid hydrogen fuel.

For several years, aerospace companies and the U.S. government have been attempting to develop hypersonic flight technology and a single-stage-to-orbit (SSTO) vehicle as a better means of space transportation. The SSTO vehicle currently under consideration is designed to operate like a large, powerful airplane, wherein the vehicle takes off from Earth, accelerates to space, deploys its payload in a selected orbit, reenters Earth's atmosphere, and lands like an airplane at a landing strip. After refueling, it would be ready for a subsequent trip. However, such an SSTO vehicle has not yet been developed because of the enormous development costs and the size required of such a vehicle to accomplish the flight from Earth to an orbit and back. While efforts in the area for an SSTO vehicle have been pursued for well over ten years, such a vehicle has not yet been developed.

SUMMARY OF THE INVENTION

The present invention provides a wingless two-stage Earth-to-orbit aerospace vehicle and transport system that is a reliable, reusable and cost-effective system for deployment of payloads to low Earth orbits.

In a preferred embodiment of the present invention, the aerospace vehicle is powered by engines burning liquid oxygen and kerosene fuel, which is less volatile and much easier to handle than liquid hydrogen. The aerospace vehicle carries a payload from a take-off and landing zone on Earth to a separation portion of a selected ascending trajectory where the upper and lower stages of the vehicle separate, and the upper stage carries the payload to an orbit around Earth. Each of the upper and lower stages returns to and lands at the take-off and landing area.

The upper stage of the aerospace vehicle is a wingless blunt tipped and flare stabilized structure that is coaxially aligned and releasably connectable atop to the wingless lower stage at take-off. The aerospace vehicle takes off from a take-off and landing area, and the lower stage propels itself and the upper stage along the ascending trajectory. The upper stage is separated from the lower stage at the separation portion of the ascending trajectory and the upper stage accelerates along the ascending trajectory to an orbital velocity and travels into a selected orbit around the Earth. After separation, the lower stage propels itself into a return trajectory and travels back to a landing at the take-off and landing area. The lower stage lands at the landing area approximately 8–10 minutes after take-off. The upper stage deploys the payload in a low Earth orbit, and the upper stage then moves out of the orbit along a return descending trajectory through the Earth's outer atmosphere, and returns to the landing area. The upper stage returns to the landing area approximately 12–36 hours after take-off.

Each of the upper and lower stages are recovered from the landing area upon return by a recovery vehicle. The recovery vehicle places upper and lower stages onto an assembly and launch transport vehicle. The upper and lower stages are reconnected to each other while on the transport vehicle, and prepared for a subsequent Earth-to-orbit flight. The assembly and launch transport vehicle also carries the aerospace vehicle to a take-off area and positions for take-off.

The wingless upper stage of a preferred embodiment includes an upper body structure having a flared distal end that provides aerodynamic stability during the ascending and descending trajectories. A payload support structure is connected to a proximal end of the upper body structure and a blunt tipped payload fairing is mounted to the proximal end over the payload support structure. The payload fairing is the leading portion of the upper stage during ascent and descent, and the payload fairing is the primary heat shield as the upper stage descends through Earth's outer atmosphere.

The upper stage has a power plant connected to the body structure, and the power plant propels the upper stage into orbit after separation from the lower stage. The power plant moves the upper stage out of orbit and into the descending trajectory to the take-off and landing area. The upper stage has a landing system that is deployed as the upper stage descends toward the landing area and that supports the first stage at touchdown. The landing system of the preferred embodiment includes a plurality of parachutes that are deployed to reduce the velocity of the upper stage as it approaches the landing area. The landing system also includes a plurality of airbag assemblies that are inflated while the upper stage is above the landing area and that cushion the upper stage at touchdown. The airbags support the body structure above the ground upon landing to prevent roll-over or impact with the ground.

The wingless lower stage includes a lower body structure that is coaxially aligned with the upper stage when the two stages are connected. The lower stage has a power plant connected to the lower body structure. The power plant propels the lower and upper stages as a unit along the ascending trajectory, it shuts down at the separation portion, and the power plant is re-started and propels the lower stage along the return trajectory to the landing area.

The lower stage includes a separation system that is releasably connected to the upper stage and that separates the lower and upper stages at the separation portion of the ascending trajectory. The separation system of the preferred embodiment uses pressurized air contained between upper and lower body structures to separate the upper and lower stages. The separation system includes a substantially air-impervious separation sleeve that extends between the upper and lower body structures and contains pressurized air such that the pressurized air pushes the upper and lower stages apart from each other.

The separation system also includes a plurality of releasable pneumatic connection members that releasably interconnect the lower and upper stages. Each of the connection members is operatively connected to a pressurized gas source, and the pressurized gas simultaneously activates all of the connection members and moves them to a released position to initiate separation.

The lower stage includes a vehicle redirection system that rotates the lower stage after separation to align with the return trajectory. In the preferred embodiment, the vehicle redirection system is a deployable drogue parachute attached to the distal end of the lower body structure. Upon deployment, the drogue parachute exerts a force on the distal end of the lower body structure to cause rotation of the lower stage.

The lower stage also includes a landing system that is deployed as the lower stage moves along the return trajectory toward the landing area. The landing system supports the lower stage at touchdown. The preferred landing system includes a plurality of parachutes that reduce the velocity of the lower stage as it descends toward the landing area, and airbag assemblies that cushion the landing of the lower stage. The airbags support the lower body structure above the ground to prevent roll-over or impact with the ground.

The assembly and launch vehicle is a self-propelled vehicle having a frame structure and an elongated stage support beam pivotally connected to the frame. The support beam is pivotally movable relative to the frame between a horizontal transport position and a vertical take-off position. At least two opposing rear stabilizing arms are attached to opposite sides of a rear portion of the stage support beam. The rear stabilizing arms are sized and spaced apart to receive and removably retain the lower stage. The rear stabilizing arms are movable relative to the support beam between an inward secured position that secures the lower stage on the transport vehicle, and an outward released position that allows the lower stage to be moved onto or off of the transport vehicle.

The transport vehicle includes a translatable carriage having a support bed and at least two forward stabilizing arms on opposite sides of the bed for receiving and retaining the upper stage. The forward stabilizing arms are movable relative to the bed between an inward secured position that secures the upper stage on the carriage and an outward released position that allows the upper stage to be moved onto or off of the carriage.

When in the horizontal position, the carriage is translatable fore and aft relative to the support beam between a forward separated position and a rearward joined position. In the forward separated position, the carriage is adjacent to the forward end of the support beam such that the upper and lower stages are positioned apart from each other. In the rearward joining position, the carriage is positioned closer to the rear stabilizing arms such that the upper and lower stages are in engagement with each other.

The upper and lower stages are independently placed on the transport vehicle when the carriage is in the forward separated position, and the carriage is then moved rearwardly to the joining position. The upper and lower stages are reconnected in preparation for a subsequent take-off and flight. After the aerospace vehicle has been prepared for the flight, the assembly and launch transport vehicle moves the aerospace vehicle to a take-off area, erects the aerospace vehicle to the vertical take-off position, and places the aerospace vehicle on a take-off stand. After being refueled, the aerospace vehicle is ready for take-off.

BRIEF DESCRIPTION OF THE DRAWINGS

FIGS. 14A–D are enlarged schematic side elevation views of a separation sequence of the lower stage and the upper stage at the separation portion of the ascending trajectory of FIG. 2.

FIG. 22 is a top isometric view of an assembly and launch transport assembly of the transport and launching system of FIG. 1.

DETAILED DESCRIPTION OF THE INVENTION

Figure 1:
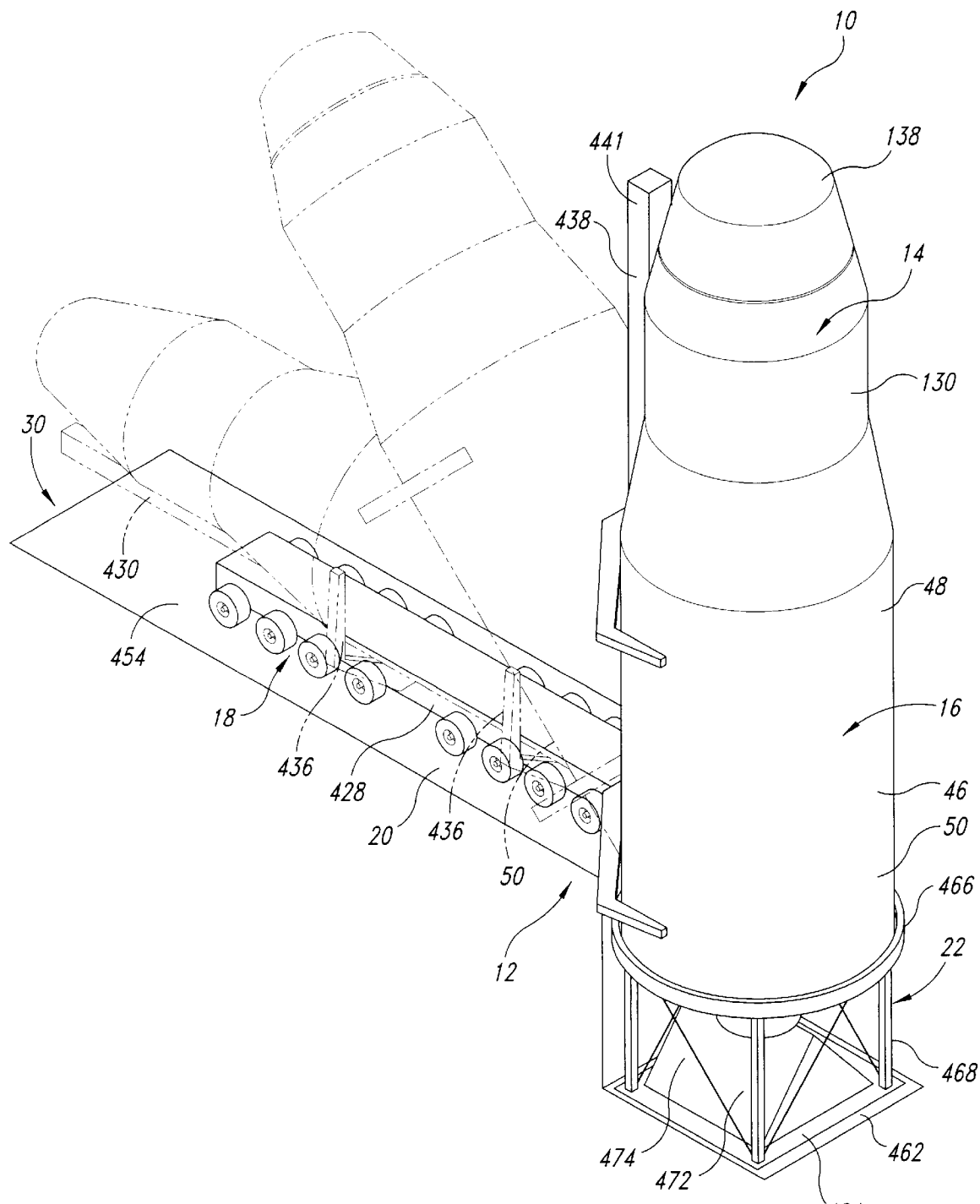
FIG. 1 is an isometric view of a reusable, wingless two-stage aerospace vehicle and a transport and launching system in accordance with the present invention, with the aerospace vehicle shown in solid in a vertical take-off position and shown in phantom in a horizontal position and an angled position.

The present invention will be more clearly understood from the following detailed description of a preferred embodiment taken in conjunction with the attached drawings. A reusable Earth-to-orbit wingless aerospace vehicle and transport, retrieval, and launch system in accordance with the present invention are shown in the Figures for illustrative purposes. The aerospace vehicle is a wingless reusable two-stage vehicle that takes off from a take-off and landing area, travels to a low Earth orbit, and returns to the same take-off and landing area. As best seen in FIG. 1, the aerospace vehicle 10 includes an upper stage 14 that is a reusable second stage orbit vehicle, and a lower stage 16 that is a reusable first stage launch assist platform. The upper and lower stages 14 and 16 are releasably joined together at an assembly location, transported in a horizontal position on an assembly and launch vehicle 18 to a take-off and landing area 30, erected to a vertical take-off position, and placed onto a take-off stand 22.

Figure 2:
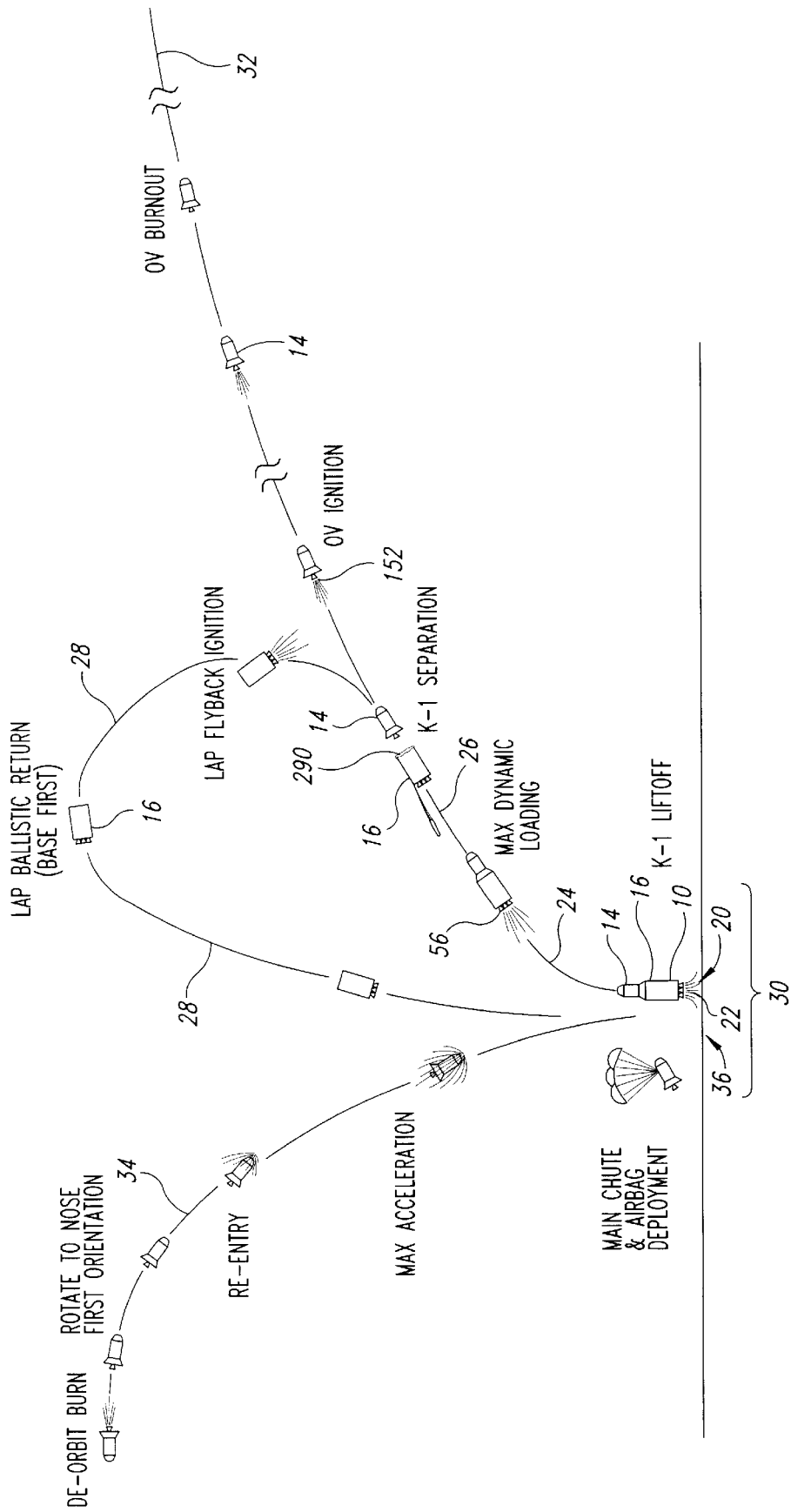
FIG. 2 is a schematic view of the flight trajectories of the two stages of the aerospace vehicle of FIG. 1.

As best seen in FIG. 2, the aerospace vehicle 10 takes off from the take-off stand 22 and follows an ascending trajectory 24 to a separation area 26 along the ascending trajectory. At the separation area 26, the upper and lower stages 14 and 16 separate from each other, and the upper stage continues along the ascending trajectory to a low Earth orbit 32. The lower stage 16 is propelled along a return parabolic trajectory 28 to a landing area 36 in the take-off and landing area 30. The lower stage 16 has a landing system, described in detail below, that provides for a controlled and cushioned landing. The lower stage 16 is retrieved from the landing area 36, placed on the assembly and launch vehicle 18 (FIG. 1), and prepared for a subsequent take-off.

The upper stage 14 orbits the Earth, deploys its payload, such as a satellite or the like, exits the orbit, and returns through the Earth's outer atmosphere along a descending trajectory 34 to the landing area 36. The upper stage 14 also has a landing system, described in detail below, that provides for a controlled and cushioned landing. The upper stage 14 is retrieved from the landing area 36, placed on the transport and launch vehicle 18 (FIG. 1), rejoined to the lower stage 16, and prepared, in a matter of days, for a subsequent launch to carry another payload to a selected orbit.

The aerospace vehicle 10, a flight control and electronics system, the trajectories and orbits, and the retrieval, transport and launch system 12 are discussed in detail below.

The Aerospace Vehicle

Figure 3:
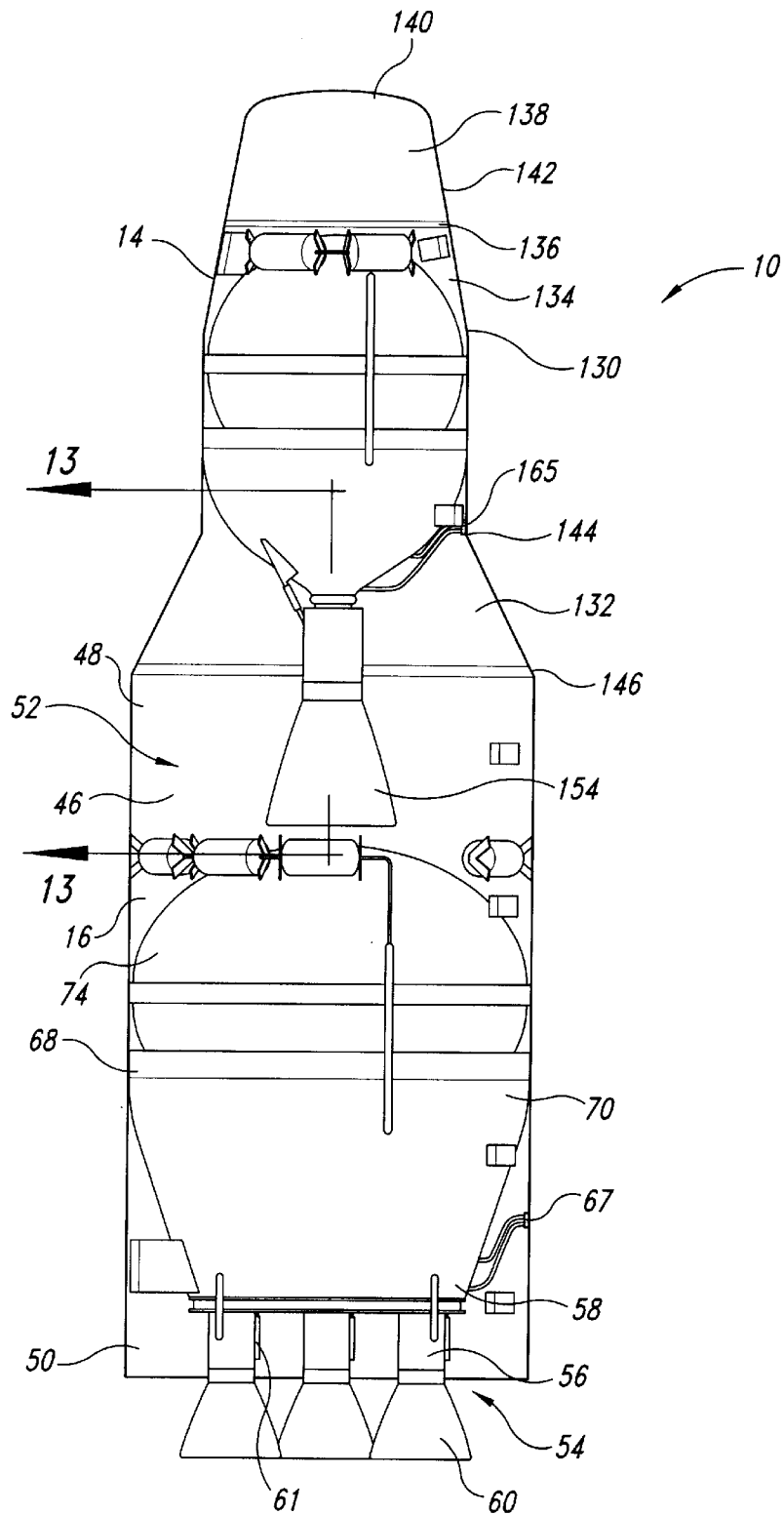
FIG. 3 is an enlarged isometric view of the aerospace vehicle of FIG. 1 shown removed from the transport and launch system, and outer body structures being shown as translucent to illustrate interior components, and a separation system is not shown.

As best seen in FIG. 3, the lower stage 16 of the aerospace vehicle 10 is releasably connected to the bottom of the upper stage 14, such that the lower and upper stages are coaxially aligned. The lower stage 16, illustrated in FIGS. 3 and 4, includes a substantially cylindrical lower-stage body 46 having an interior area 52 extending between digital and proximal portions 48 and 50 of the lower-stage body. The lower-stage body 46 includes an outer layer of external insulation material, such as CFBI 10, to minimize heating of the body structure during the ascending trajectory 24 (FIG. 2) and the return trajectory 28 (FIG. 2). The lower-stage body 46 of the preferred embodiment is a carbon epoxy composite structure having a height of approximately 12.3 meters (40 feet, 6 inches), and a diameter of approximately 6.7 meters (22 feet).

A liquid oxygen (LOx) fuel tank 74 and an RP-1 kerosene fuel tank 68 are positioned within the interior area 52 and attached to the lower-stage body 46. A thrust-distributing structure 58 is integrally attached to the bottom of the RP-1 tank 68 and is positioned within the interior area 52 of the lower-stage body 46. A power plant 54 having five engines 56 is mounted to the thrust distributing structure 58, such that booster nozzles 60 of the engines extend distally from the lower-stage body 46.

Each of the five engines 56 is an RD-120M-1 staged combustion engine, manufactured by NPO Energomash, and the engines are powered by liquid oxygen and kerosene fuel. Each engine has a plurality of gimbal actuators 61 connected to the thrust distributing structure 58 that provide ±6 degrees gimbaling action in two orthogonal planes for directional control of the aerospace vehicle 10.

Figure 4:
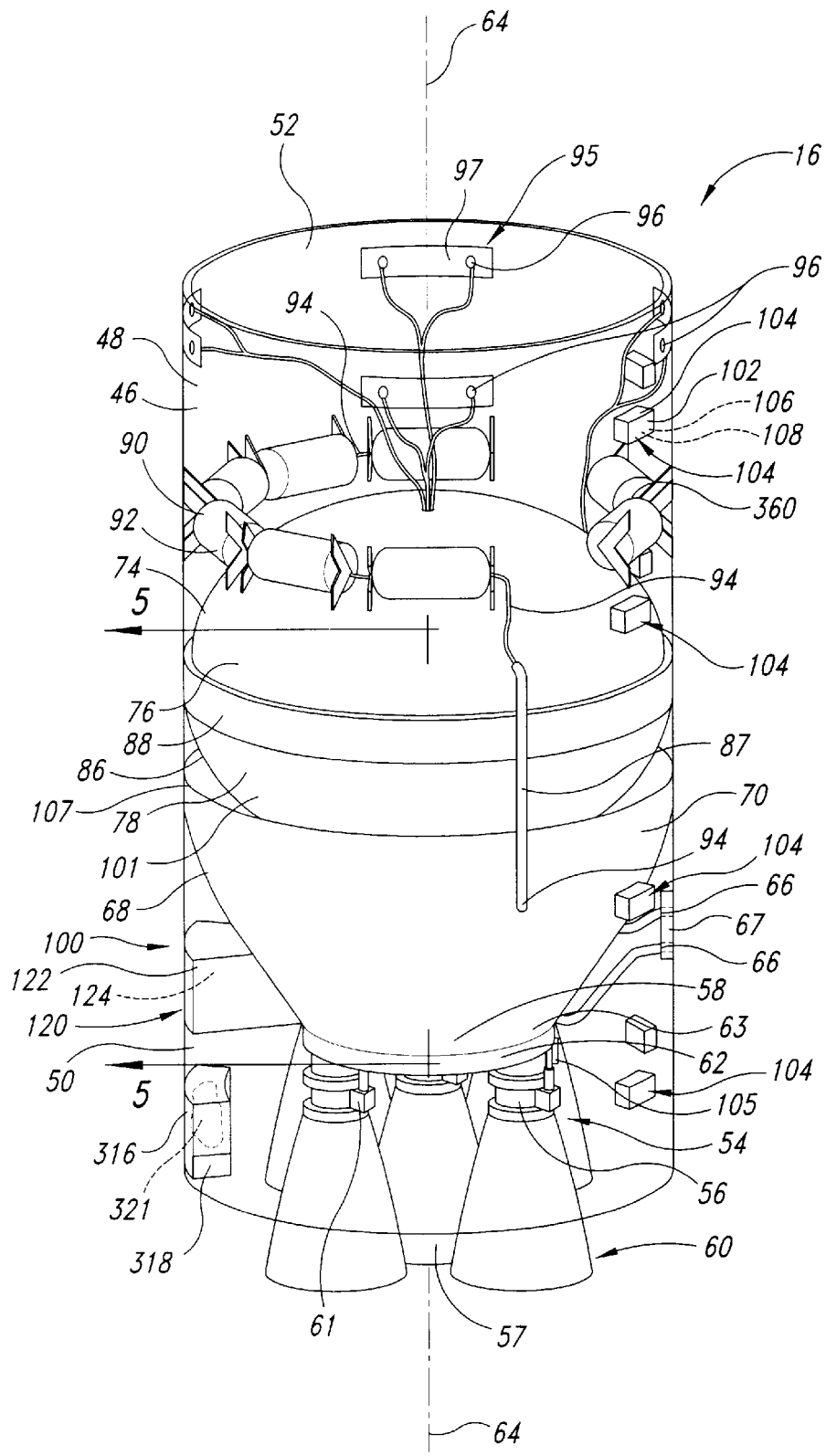
FIG. 4 is an enlarged isometric view of a lower stage of the aerospace vehicle of FIG. 3 with the outer body structure shown as translucent to illustrate interior components.
Figure 5:
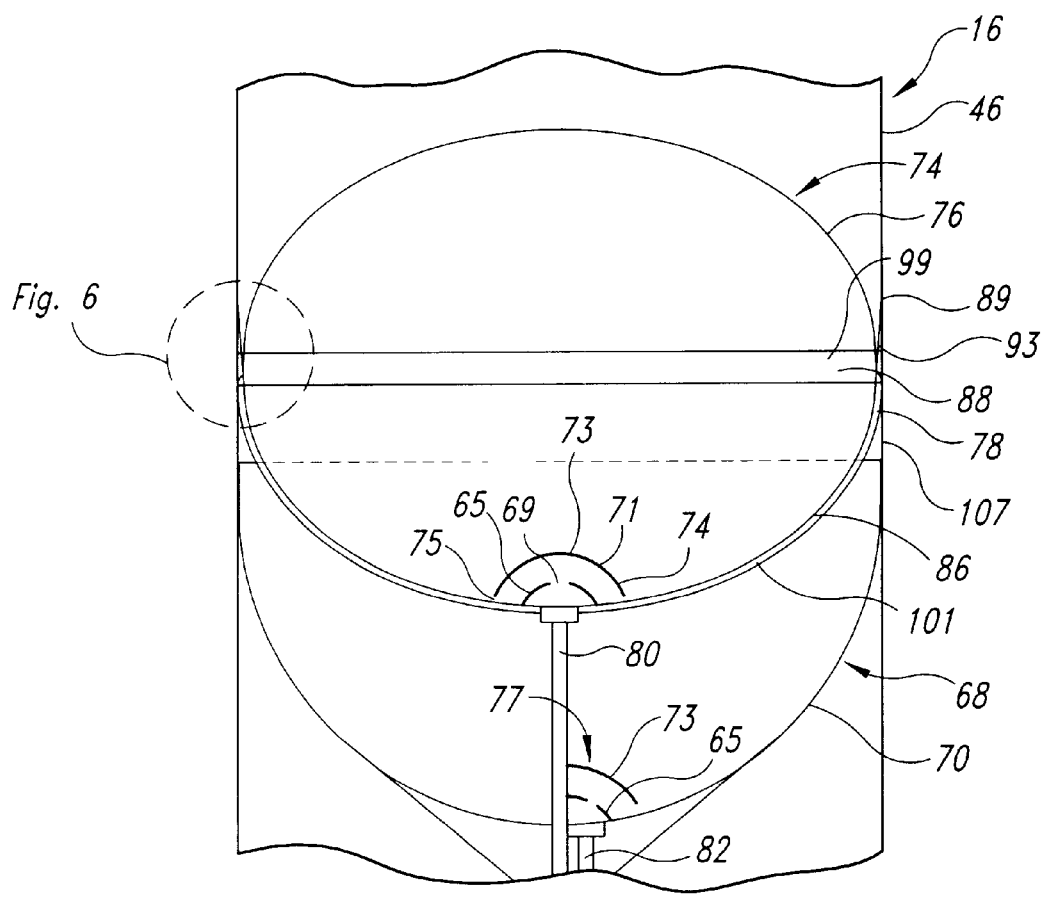
FIG. 5 is an enlarged cross-sectional view taken substantially along line 5—5 of FIG. 4 showing a fuel tank system of the lower stage.

As best seen in FIGS. 4 and 5, the LOx tank 74 is a generally oblate tank positioned above the RP-1 tank 68. The LOx tank 74 has upper and lower dome-shaped walls 76 and 78 that are connected to a girth ring 88 mounted to the lower-stage body 46. A layer of insulation 86, such as SOFI insulation, is adhered to the LOx lower wall 78 to minimize heat transfer between kerosene in the RP-1 tank 68 and the liquid oxygen in the LOx tank 74. The LOx tank 74 has an outlet 80 (FIG. 5) that extends from the lower wall 78, through the RP-1 tank 68 and is manifolded to the five engines 56 (FIG. 4) in a conventional manner to provide the necessary fuel flow during operation of the engines.

As best seen in FIG. 5, the LOx tank 74 of the preferred embodiment has a partial dome-shaped LOx retaining structure 71 mounted to the interior of the lower wall 78 above the outlet 80. The retaining structure 71 has an inner dome 65 fixed to the lower wall 78 around the outlet 80, and the bottom dome has a central aperture 69 aligned with the outlet. An outer dome 73 is spaced above the inner dome 65, and the outer dome has fuel passages 75 offset from the central aperture 69. Accordingly, the LOx retaining structure 71 retains liquid oxygen fuel under the inner dome 65 at the outlet 80 at all times during the flight of the lower stage 16 along the ascending trajectory and the return trajectory to ensure proper fuel flow to the engines 56. The LOx tank 74 also includes conventional slosh baffles and anti-vortex devices (not shown) to control fuel flow from the tank to the engines 56.

Figure 6:
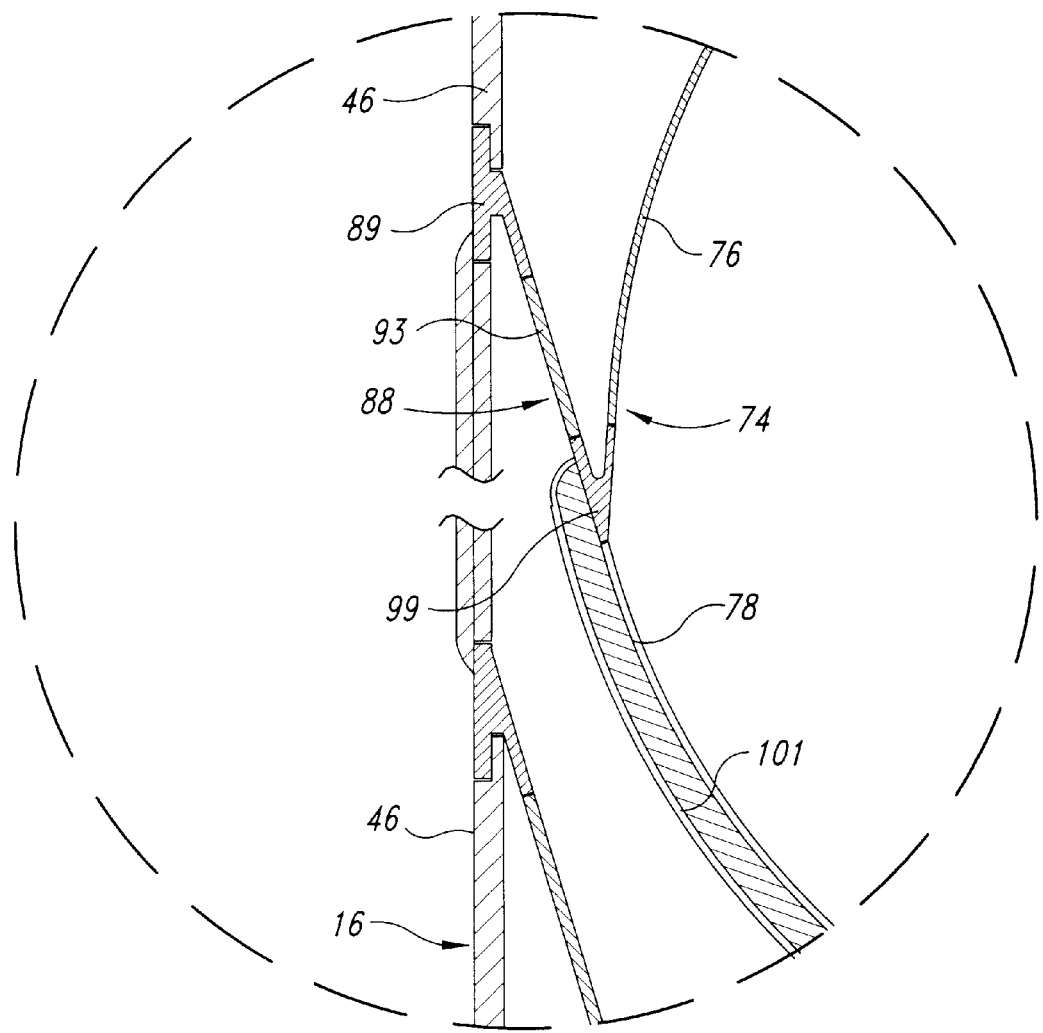
FIG. 6 is an enlarged detail view of the fuel tank system of FIG. 5 showing the fuel tank interface with the body structure of the lower stage.

The LOx tank 74 has aluminum upper and lower walls 76 and 78 that are welded to an aluminum girth ring 88. As best seen in FIG. 6, the girth ring 88 has an upper band 89 securely fixed to the lower-stage body 46 by composite lay-ups or other fastening techniques. The upper band 89 is integrally connected to a support strip 93 that extends downwardly and inwardly, and the support strip integrally connects to a lower band 99 that is welded to each of the upper and lower walls 76 and 78 of the LOx tank 74. Accordingly, the girth ring 88 supports the upper and lower walls 76 and 78 of the LOx tank 74 within the interior area, and thrust forces generated by the engines 56 (FIG. 4) are not transmitted through the upper or lower walls of the LOx tank. Thus, the LOx tank 74 is not used to support other components in the aerospace vehicle 10 and, therefore, must resist only the forces caused by the weight of the LOx tank and liquid oxygen fuel contained therein during acceleration of the aerospace vehicle.

As best seen in FIGS. 4 and 5, the RP-1 tank 68 has a hemisphere-shaped lower wall 70 that is integrally connected to the lower-stage body 46 at its upper end. The lower wall 78 of the RP-1 tank 68 of the preferred embodiment is a carbon epoxy composite structure. The upper wall of the RP-1 tank 68 is formed by the lower wall 78 of the LOx tank 74, such that the lower wall is a common tank wall between the LOx and RP-1 tanks. The upper and lower walls of the RP-1 tank 68 are spaced apart such that the portion of the lower-stage body 46 between the girth ring 88 and the top of the RP-1 tank lower wall 70 forms a side wall 107 of the RP-1 tank.

The insulation layer 86 on the common tank wall has a lower liner 101 that communicates with the interior of the RP-1 tank 68. The liner 101 is made of a conventional material that is not damaged by exposure to the kerosene fuel. The outlet 80 from the LOx tank 74 extends through the interior of the RP-1 tank 68 and through the RP-1 tank's lower wall 70. As best seen in FIG. 5, the RP-1 tank 68 includes an RP-1 outlet 82 that is slightly offset from the LOx outlet 80. The RP-1 outlet extends downwardly from the lower wall 78 and is operatively connected to the engines 56.

The RP-1 tank 68 has a fuel retaining structure 77 mounted to the lower wall 70 adjacent to the LOx outlet 80 and positioned over the fuel outlet 82 to retain kerosene at the RP-1 outlet during the flight of the lower stage 16. The RP-1 fuel retaining structure 77 has substantially the same construction as the LOx fuel retaining device 71 with the inner and outer domes 65 and 73. The RP-1 tank 68 also includes conventional slosh baffles and anti-vortex devices (not shown) to avoid excessive motion of the fuel and to ensure proper fuel flow to the engines 56.

As best seen in FIG. 4, each of the LOx and RP-1 tanks 74 and 68 have a fuel fill-and-drain line 66 that connects at one end to the bottom of the respective tank and at an opposite end to an umbilical panel 67 mounted on the lower-stage body 46. The umbilical panel 67 includes conventional connection members at the end of the fuel fill-and-drain lines 66 to allow for easy connection to a fuel truck or other fuel source for filling or emptying of the RP-1 and LOx tanks 74 and 68.

The thrust-distributing structure 58 is a carbon epoxy composite structure having a bottom engine-mount structure 62 and generally conically shaped sidewalls 63 that extend upwardly and outwardly from the engine mount. The sidewalls 63 are integrally connected to the lower wall 78 of the RP-1 tank 68 at a position inward of the lower-stage body 46. The side walls 63 substantially tangentially intersect the lower wall 78 so thrust from the engines 56 is evenly distributed from the sidewalls to the RP-1 tank lower wall and to the lower-stage body 46. The thrust distributing structure 58 of the preferred embodiment is connected to the RP-1 tank with conventional composite lay-up techniques.

The engine mount 62 includes an I-beam that is formed in a circle, and a pair of I-beam cross-members extend perpendicular to each other across the middle of the circle. Each of the five engines 56 are rigidly secured to the engine mount 62 with four engines encircling a center engine 57. The center engine 57 is mounted to the engine mount 62 at the intersection of the I-beam cross-members, so the center engine 57 is aligned along the longitudinal axis 64 of the lower-stage body 46.

In one embodiment (not shown), the lower stage 16 includes an aft close-out panel that extends across the interior area 52 at the distal end of the lower-stage body 46, and the engines 56 extend through apertures in the close-out panel. The aft close-out panel substantially prevents exhaust gas recirculation within the interior area 52 during operation of the engines 56. The aft close-out panel also prevents excessive heating of components within the interior area 52, including the RP-1 tank 68 and the LOx tank 74.

Referring again to FIG. 4, the lower stage 16 has a fuel tank pressurization system 90 for pressurizing the LOx tank 74 and the RP-1 tank 68. The pressurization system 90 has eight interconnected helium tanks 92 mounted to the proximal portion 48 of the lower-stage body 46 above the LOx tank 74. Each helium tank 92 contains helium at an initial pressure of approximately 4,000 psi at take-off. Helium gas lines 94 extend from the helium tanks 92 downwardly along a raceway 87 in the lower-stage body 46 to carry the helium to a helium heat exchanger 105 on one of the engines 56 to heat and expand the helium.

The gas lines 94 return upwardly from the heat exchanger 105 along the raceway 87 and into the interior area 52 above the LOx tank 74. One of the gas lines 94 penetrates into the RP-1 tank 68 through the lower-stage body 46 at the RP-1 tank's sidewall 107. A return gas line 94 exits the RP-1 tank through the sidewall 107 into the raceway 87 and extends upwardly into the interior area 52 with the other gas lines. Another one of the helium gas lines 94 extends from the raceway 87 to the top of the LOx tank 74 and penetrates into the LOx tank's interior area. A return gas line 94 exits the LOx tank 74 through the top of the tank's upper wall 76 and extends upwardly away from the LOx tank. The helium from the helium tanks pressurizes the LOx tank 74 and RP-1 tank 68 during flight to ensure continual LOx and fuel flow to the engines 56. One of the helium gas lines 94 branches near the bottom of the raceway 87 and terminates at a conventional connection member mounted to the umbilical panel 67 to allow for quick and easy refilling or emptying of the helium tanks 94.

The helium gas lines 94 exiting the RP-1 and LOx tanks 68 and 74 are operatively connected to an attitude control system 95 having thrusters 96 mounted to the proximal portion 48 of the lower-stage body 46. Accordingly, the thrusters 96 are powered by the pressurized helium gas from the interior of the LOx and RP-1 tanks 74 and 68. The attitude control system 95 has four thruster pods 97, with two thrusters 96 per pod, and the pods are positioned around the lower-stage body 46. The thrusters 96 are oriented to allow control of the attitude of the lower stage 16 by selectively activating one or more pairs of thrusters.

Each thruster pod 97 is removable as a unit from the lower-stage body for quick and easy replacement. Three thruster pods 97 are supplied with pressurized helium from the LOx tank 74 and one thruster pod is supplied from the RP-1 tank 68. In the preferred embodiment, each thruster 96 on the lower stage 16 is a 150-pound thruster that exerts sideways forces on the proximal portion 48 of the lower-stage body 46 to control the body's relative attitude, particularly during separation and during the return trajectory.

Figure 7A:
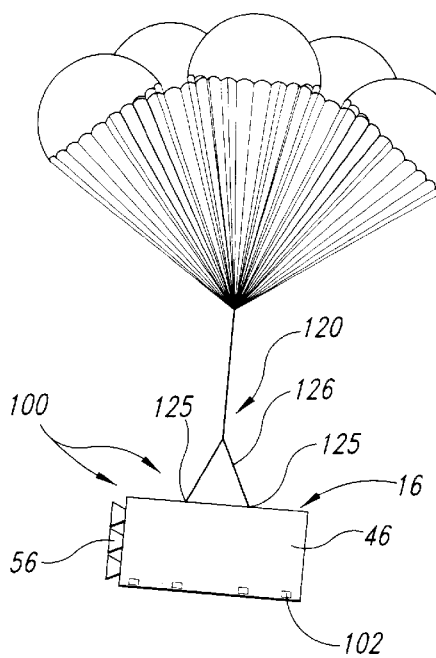
FIGS. 7A–C are side elevation views of the lower stage of FIG. 4 illustrating a landing sequence for landing at a take-off and landing area.

As best seen in FIGS. 4 and 7A–C, the lower stage 16 has a landing system 100 that is activated as the lower stage moves along the return trajectory toward the landing area. The landing system 100 includes a parachute assembly 120 and eight airbag assemblies 102 that are deployed above the landing area. The parachute assembly 120 includes an insulated housing 122 (FIG. 4) mounted on the lower-stage body 46 and five packed parachutes 124 contained within the housing until deployment. As illustrated in FIG. 7A, the five parachutes are attached to a common parachute bridal 126 that is releasably attached to the lower-stage body 46 at front and rear attachment points 125 on opposite sides of the lower stage's center of mass.

Figure 7B:
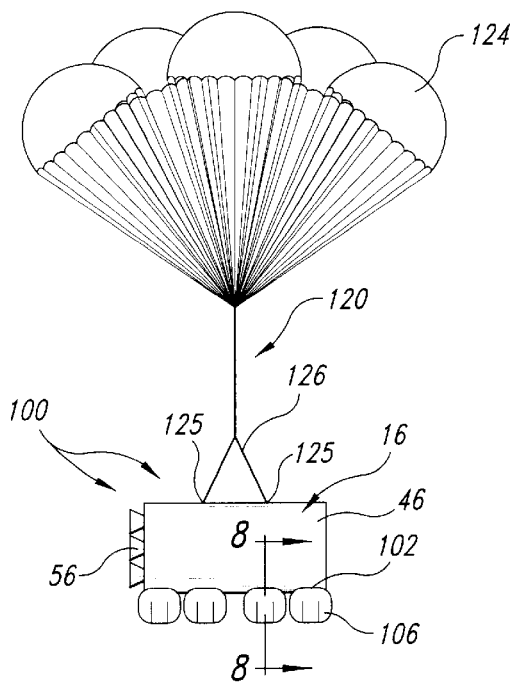
Figure 7C:
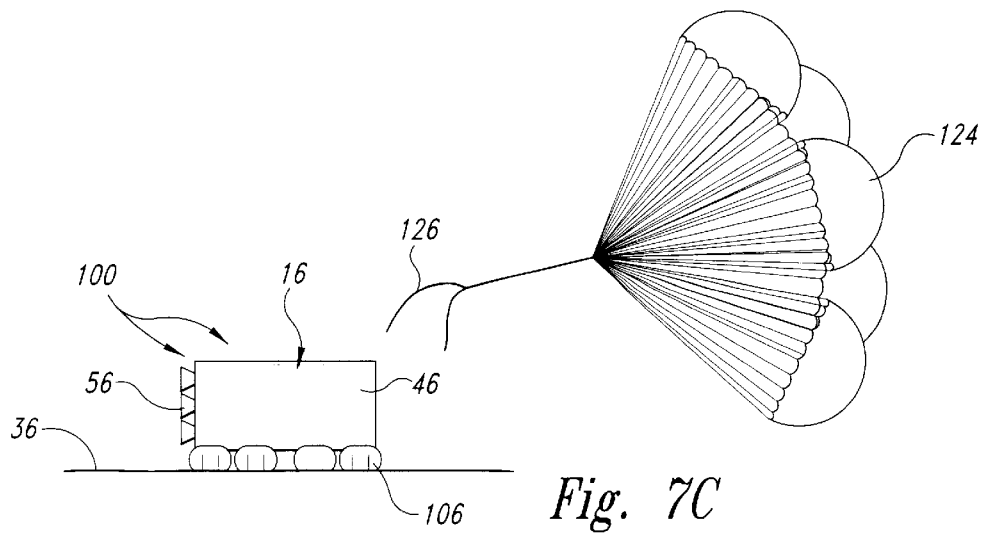

The parachute assembly 120 has a conventional deployment device that, upon activation, deploys the parachutes 124. When the parachutes 124 are deployed, as illustrated in FIGS. 7A and 7B, the parachutes and parachute bridal 126 support the lower stage 16 at approximately a horizontal attitude, so the airbag assemblies 102 are facing downwardly toward the landing area. The parachutes 124 of the preferred embodiment are preferably sized to reduce the velocity of the lower stage 16 relative to the landing area 36 (FIG. 7C) to approximately 8.1 meters per second. As illustrated in FIG. 7C, the parachute bridal 126 is releasably connected to the lower-stage body 46, and the bridal includes a conventional release mechanism that disconnects the bridal and the parachutes 124 from the lower-stage body upon landing. The release of the parachute bridal 126 protects the lower-stage body 46 from being dragged or rolled over after landing.

As best seen in FIG. 4, each of the eight airbag assemblies 102 has an airbag housing 104 mounted to the lower-stage body 46 along a common side opposite the parachute assembly 120. Each airbag housing 104 contains an airbag 106 and a pressurized gas source 108 connected to the airbag. The pressurized gas sources 108 are simultaneously activated and the airbags are deployed and inflated (FIG. 7B) after deployment of the parachutes 124. Each airbag 106 preferably has a dimension of approximately 1.5 meters in diameter with a height of approximately 2.25 meters. The airbags 106 are designed to cushion the lower stage 16 upon landing with a touchdown velocity, such as 8.1 meters per second, and to prevent the lower-stage body 46 from contacting the ground. The airbag assemblies 102 are positioned on the lower-stage body 46 with two spaced-apart lines of four assemblies with four airbag assemblies positioned at the proximal portion 48 of the lower-stage body and four airbags at the distal portion 50 (FIG. 4). Accordingly, the airbags 106 provide stable footing on which the lower-stage body 46 is supported upon landing.

Figure 8:
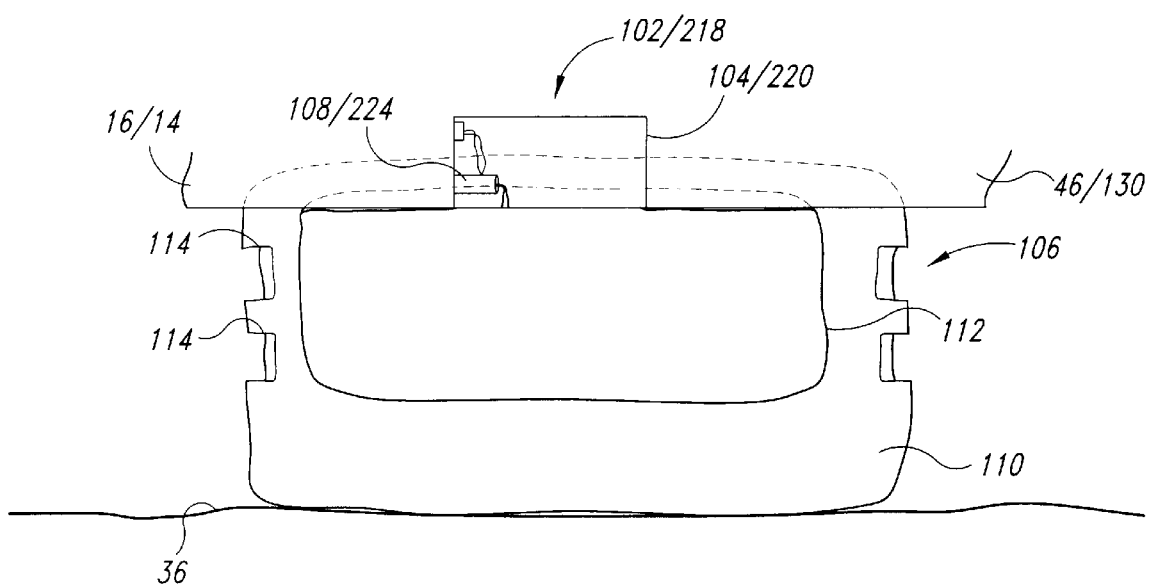
FIG. 8 is an enlarged cross-sectional view taken substantially along the line 8—8 of FIG. 7B showing an airbag assembly.

As best seen in FIG. 8, each airbag 106 of the preferred embodiment has an outer vented bag 110 and a sealed inner bag 112 positioned within the vented outer bag. The pressurized gas source 108 is operatively connected to each of the outer and inner bags 110 and 112. The pressurized gas source 108 inflates the outer and inner bags 110 and 112 substantially simultaneously upon deployment.

The outer bag 110 has a plurality of vents 114 that allow pressurized gas within the outer bag to escape as the airbag 106 engages the landing area 36. Accordingly, the outer bags 110 engage the ground fully inflated, as is shown in FIG. 8, and the outer bags partially deflate upon landing to provide damping and to avoid bouncing of the lower stage 16 on touchdown. The sealed inner bag 112 remains fully inflated and cushions the lower-stage body 46 upon landing. The pressure within the inner bag is such that the lower-stage body 46 does not come into contact with the landing area 36, thereby avoiding the risk of damage to the vehicle's body structure on landing.

The airbag assemblies 102 of the preferred embodiment are completely replaceable units that can be repacked for subsequent use. After the lower stage 16 lands, the deployed airbag assemblies 102 are quickly and easily removed and replaced with packed airbag assemblies that are ready for deployment.

Figure 9:
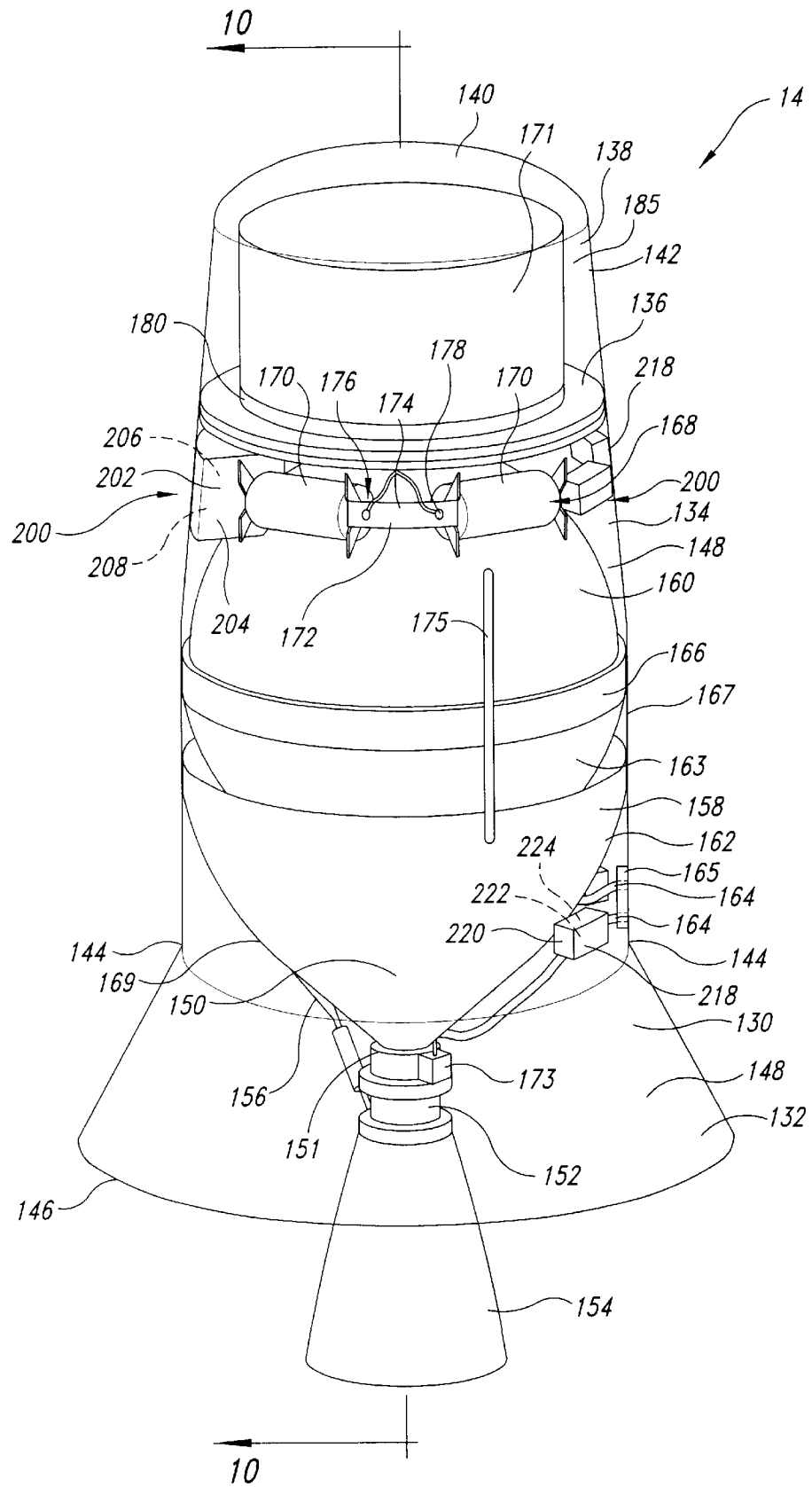
FIG. 9 is an enlarged isometric view of an upper stage of FIG. 3 with the outer body structure shown as translucent to illustrate interior components.
Figure 10:
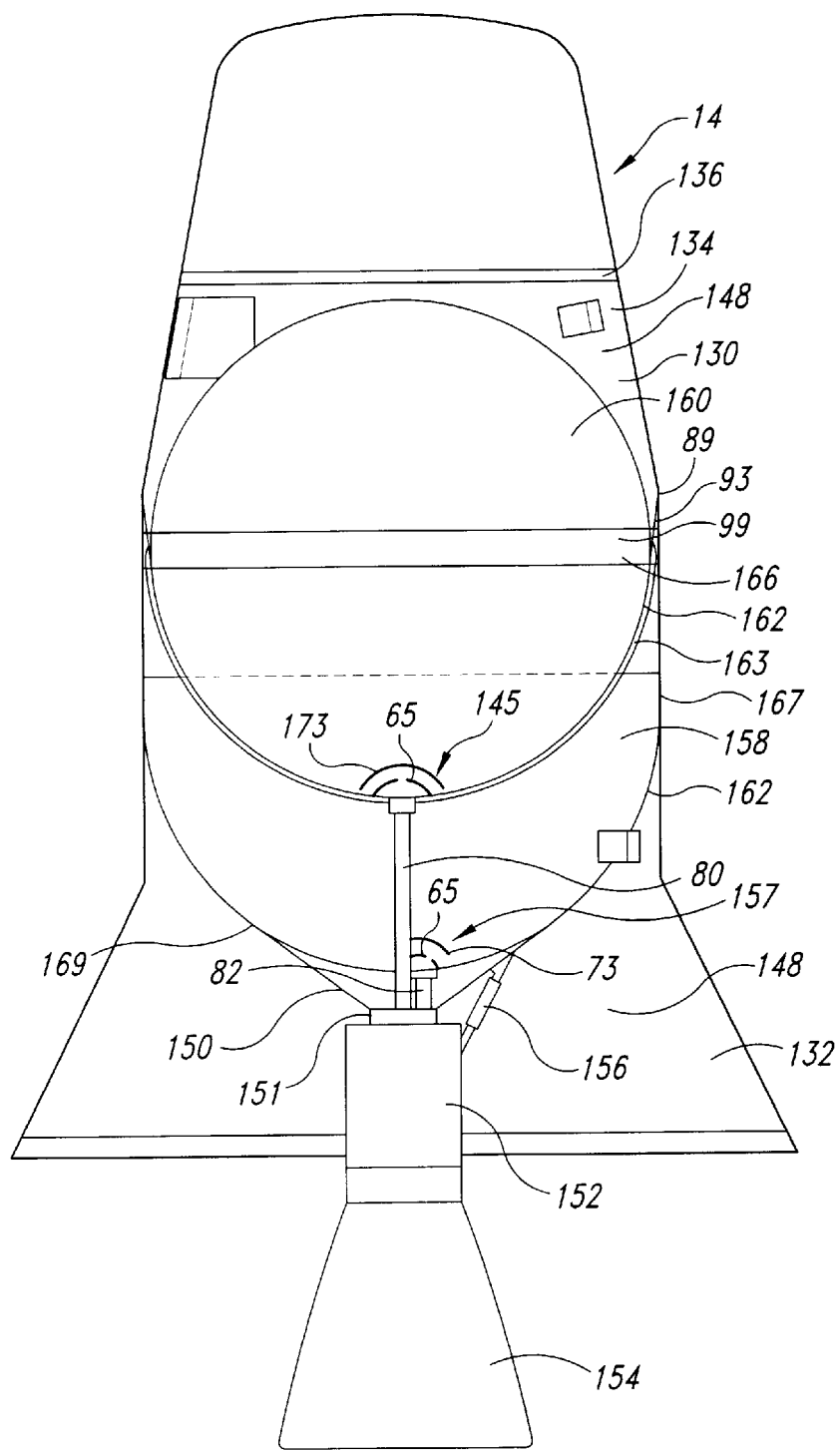
FIG. 10 is an enlarged cross-sectional view taken substantially along line 10—10 of FIG. 9 showing the engine and fuel tank system of the upper stage.

As best seen in FIGS. 3, 9 and 10, the upper stage 14 has an upper-stage body structure 130 with a distal portion 134 and a proximal portion 132. A payload support structure 136 is mounted to the distal portion 134, and a payload fairing 138 is pivotally mounted to the distal portion atop the payload support structure 136. The payload fairing 138 defines a leading end of the upper stage 14 and the proximal portion 132 and defines the trailing end of the upper stage during substantially all of its flight.

The payload fairing 138 is a blunt-tipped structure having a generally cylindrical, cap-like shape. The payload fairing 138 has an endwall 140 spaced apart from the payload support structure 136 and side walls 142 extending between the endwall and the payload support structure 136. Accordingly, the upper stage 14 is a blunt-tipped body that is propelled along the ascending trajectory out of the Earth's atmosphere, into an orbit, and back through Earth's atmosphere along the descending trajectory to the landing area.

To provide aerodynamic stability to the upper stage 14 during flight, the proximal portion 132 of the upper-stage body 130 flares outwardly from a middle area 144 to an edge 146, such that the upper stage is a flare stabilized structure.

In the preferred embodiment, the upper-stage body 130 is a carbon epoxy composite structure similar to the lower-stage body 46. As best seen in FIGS. 9 and 10, the upper-stage body 130 defines an interior area 148 extending between the distal and proximal portions 134 and 132. The interior area 148 contains a LOx tank 160 and an RP-1 tank 158 in a configuration substantially identical to the configuration discussed above for the lower stage 16. The LOx tank 160 has substantially the same construction as the lower stage's LOx tank 74, including a LOx retaining structure 145 (FIG. 10) for retaining LOx at the LOx tank outlet 80, particularly when the upper stage is in a gravity-less environment. The LOx tank 160 differs slightly in construction because the upper stage's LOx tank is a generally spherical aluminum tank rather than an oblate tank. The LOx tank 160 includes a lower hemisphere-shaped wall that is a common wall 162 with the RP-1 tank 158. The common wall 162 has a layer of insulation 163 adhered to its lower side facing the interior of the RP-1 tank 158. The LOx tank 160 includes an aluminum girth ring 166 attached to the upper-stage body 130 as described above and shown in FIG. 6 for the lower stage, such that the LOx tank need only resist the forces exerted by its own weight during acceleration of the upper stage 14.

The RP-1 tank 158 also has a construction substantially similar to the RP-1 tank 68 of the lower stage 16. A bottom wall 162 of the RP-1 tank 158 is integrally connected to the upper stage body 130 below the girth ring 166 of the LOx tank 160. Accordingly, the portion of the upper stage body 130 extending between the top edge of the wall 162 and the girth ring 166 forms a side wall 167 of the RP-1 tank for containment of the kerosene fuel.

The RP-1 tank 158 also includes a fuel retention structure 157 mounted to the bottom wall 162 over a fuel outlet as discussed above for the lower stage's RP-1 tank. As best seen in FIG. 9, each of the RP-1 and LOx tanks 158 and 160 also have a fill-and-drain line 164 that connects at one end to the respective tank and at the other end to an umbilical panel 165 similar to the umbilical panel 67 of the lower stage 16. The fill-and-drain lines 164 are each connected to a conventional connector to allow for quick and easy connection to the fuel lines of a fuel truck or other fuel source.

A carbon epoxy composite thrust distributing structure 150 having a generally conical shape is integrally connected at an upper end 169 to the bottom wall 162 of the RP-1 tank 158 inwardly from the upper-stage body 130. The upper end 169 of the thrust distributing structure 150 engages the bottom wall 162 substantially tangentially to provide for even distribution of thrust forces to the RP-1 tank 158 and to the upper-stage body 130.

The thrust distributing structure 150 extends downwardly and inwardly from the upper end and converges to an engine mount structure 151 that is coaxially aligned with the longitudinal axis of the upper-stage body 130. A single liquid oxygen and kerosene-powered engine 152 is rigidly mounted to the engine mount structure 151 of the thrust distributing structure 150, and the booster nozzle 154 of the engine extends out of the flared distal portion 132 of the upper-stage body 130. The engine includes gimbaling actuators 156 connected to the thrust distributing structure 150 and to the booster nozzle 154. The booster nozzle gimbals ±6 degrees in two orthogonal planes for directional control of the upper stage 14. The engine 152 is coupled to the RP-1 tank 158 and the LOx tank 160 fuel outlets that extend downwardly from the bottom of the respective tank, as discussed above regarding the lower stage's fuel tanks, to provide a continuous flow of fuel to the engine during its operation.

In the preferred embodiment, the upper stage engine 152 is an RD-120M-2 engine manufactured by NPO Energomash. The RD-120M-2 engine and the RD-120M1 engines of the lower stage 16 are high performance, staged combustion, reusable engines with a 10 flight cycle before a minor overhaul is needed. Major overhaul is scheduled only after several 10 flight cycles. However, other liquid oxygen and kerosene engines can be used to propel the aerospace vehicle along its trajectories.

As best seen in FIG. 9, the top of the LOx tank 160 terminates at the distal portion 134 of the upper-stage body 130 below the payload support structure 136. A fuel tank pressurization system 168 is mounted to the upper-stage body 130 above the upper end of the LOx tank 160. The fuel tank pressurization system 168 is substantially the same as the pressurization system as described above for the lower stage 16. The fuel tank pressurization system 168 includes six helium tanks 170 mounted to the upper-stage body 130, and the helium tanks are operatively connected to the RP-1 and LOx tanks 158 and 160 by gas lines 172. The helium tanks 170 contain helium gas at pressures of approximately 4,000 psi at take-off for pressurization of the fuel tanks throughout the flight of the upper stage 14.

The gas lines 172 extend from the helium tanks 170 into an elongated raceway 175 in the upper-stage body 130 and down to a helium heat exchanger 173 on the engine 152 to heat and expand the helium. The gas lines 172 return from the heat exchanger 173 upwardly along the raceway 175, and one of the gas lines penetrates through the upper-stage body 130 into the RP-1 tank 158. Another gas line 172 extends up the raceway 175 and to the top of the LOx tank 160, and extends through the top of the LOx tank into the tank's interior. The gas lines 172 also have a branch that connects the helium tanks to a conventional connector at the umbilical panel 165 to allow for quick and easy connection to a helium source for filling or emptying the helium tanks 170.

The upper stage 14 also includes an attitude control system 176 having four replaceable thruster pods 174 of attitude control thrusters 178 with three thrusters per pod. Each thruster 178 is connected to a helium gas line 172 extending from either the top of the LOx tank 160 or the side of the RP-1 tank 158. The attitude control thrusters 178 generate propulsive forces with the pressurized helium from the RP-1 tank 158 and LOx tank 160. Pressurized helium for three of the thruster pods 174 (or nine thrusters) is supplied from the LOx tank 160, and the pressurized helium for the remaining thruster pod is provided from the RP-1 tank 158. Each of the thrusters 178 on the upper stage 14 is a 25-pound force thruster that is used to control the attitude of the upper stage during its flight, particularly during its orbit around the Earth, as discussed in greater detail below.

Figure 11:
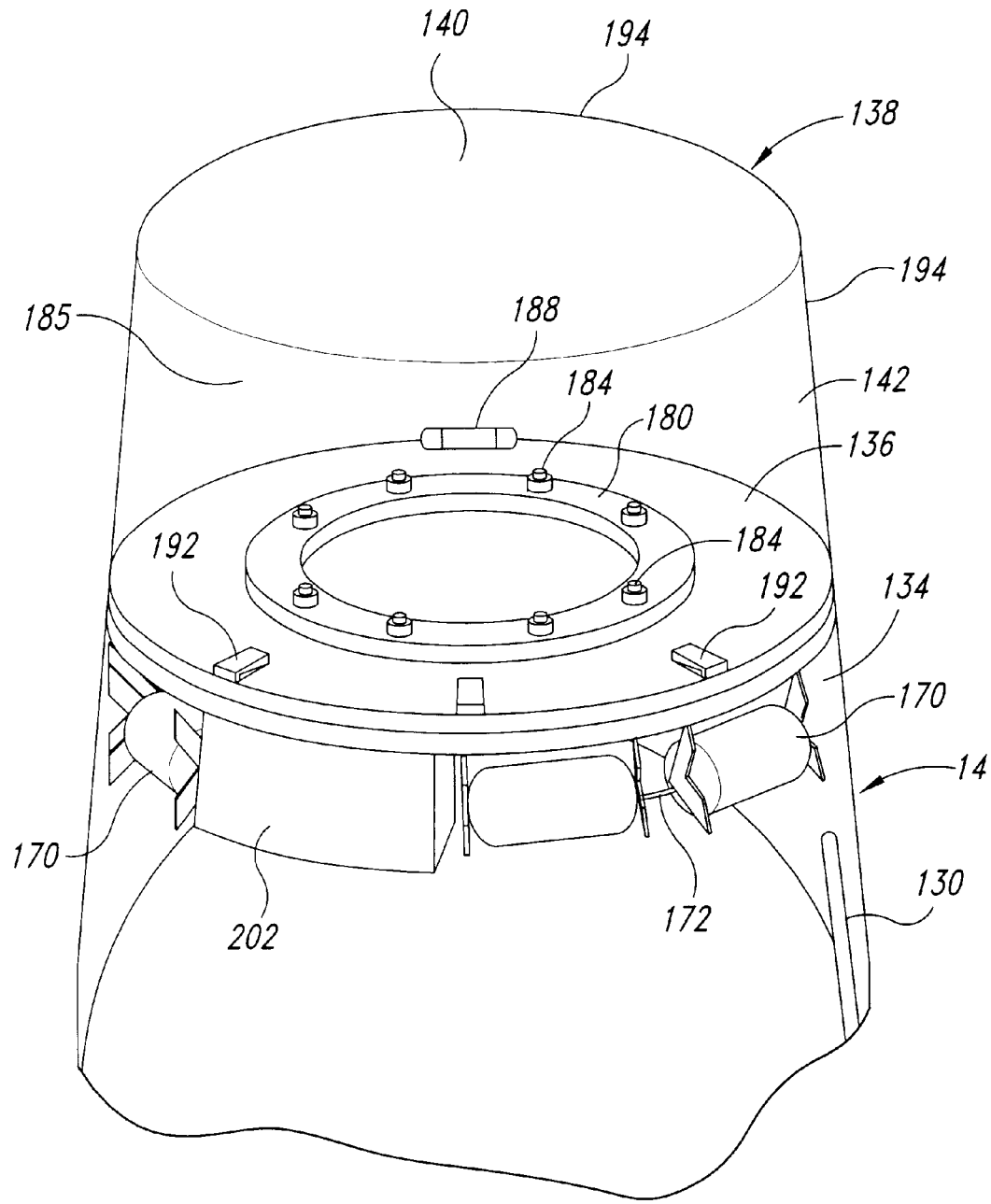
FIG. 11 is an enlarged isometric view of the payload fairing and payload support structure of FIG. 9 with the payload not illustrated and the outer body structure and payload fairing shown as translucent for illustrative purposes.
Figure 12A:
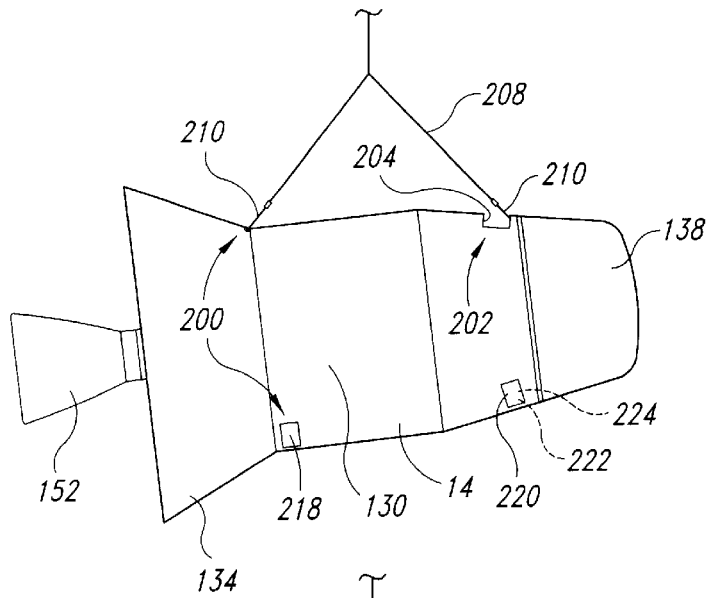
FIGS. 12A–C are side elevation views of the upper stage of FIG. 9 illustrating a landing sequence for landing at the take-off and landing area.
Figure 12B:
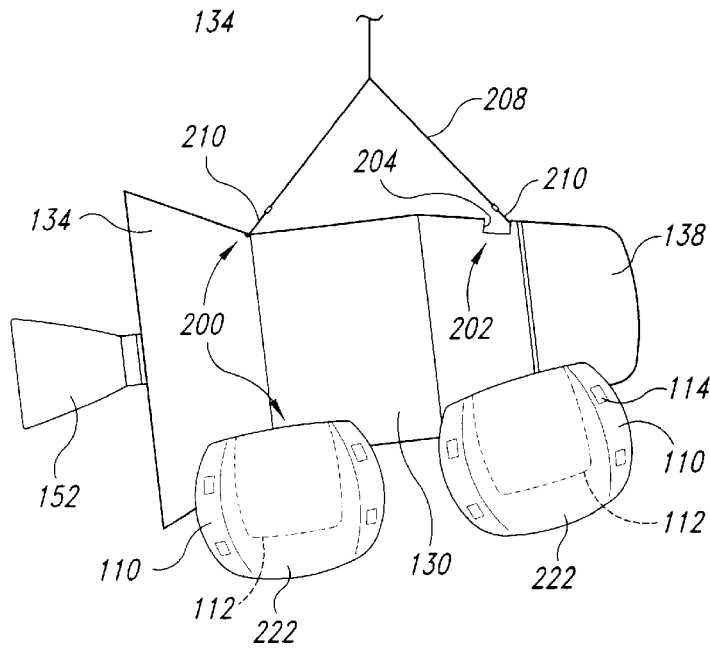
Figure 12C:
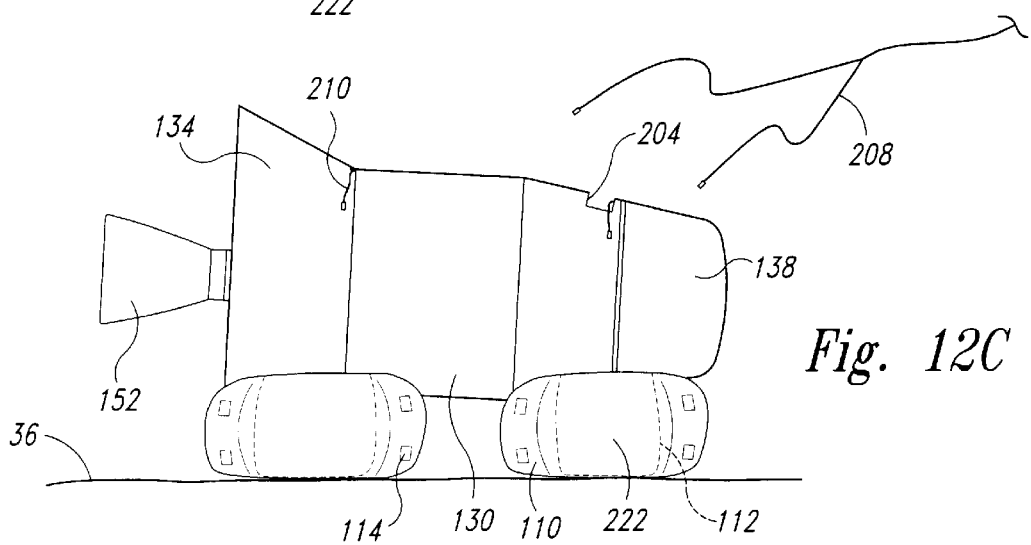

As best seen in FIGS. 9 and 11, the payload support structure 136 is mounted to the distal end of the upper-stage body 130 to close off the distal end. The payload support structure 136 of the preferred embodiment is a carbon epoxy composite honeycomb disk having a diameter of approximately 4.2 meters that provides a rigid support deck for a selected satellite or other payload 171 (FIG. 9). As best seen in FIG. 11, the payload support structure 136 includes a payload mounting ring 180 having a plurality of releasable retention bolts 184 mounted in a selected pattern around the ring for releasably engaging the payload. The retention bolts 184 are conventional bolts having an activable charge for simultaneously releasing and deploying the payload in the selected low Earth orbit.

The payload fairing 138 is pivotally mounted to the payload support structure 136 and positioned so the side walls 142 of the payload fairing engage the support structure to form a covered payload bay 185. When the payload fairing 138 is in the closed position, the bottom edges are substantially sealed against the support structure 136, and the payload 171 (FIG. 9) is contained and protected within the payload bay 185. The side walls 142 of the payload fairing 138 are connected to the payload support structure 136 by an internal power hinge 188, illustrated in FIG. 11, that pivots the payload fairing between the closed position and an open position. In the open position the sidewalls 142 of the payload fairing 138 are moved away from the payload support structure 136 except at the hinge 188 so as to completely expose the payload mounting ring 180 for either deployment of the payload 171 or installation of the payload.

The payload fairing 138 is pivoted between the open and closed positions with a pair of small conventional electric motors integral with the power hinge 188. When the upper stage 14 is in space orbiting Earth, the small electric motors generate sufficient forces on the hinge 188 to move the payload fairing between the open and closed positions. When the upper stage 14 is on Earth, as an example, having the payload 171 mounted to the mounting ring 180, the power hinge 188 may not be strong enough to support the payload fairing in its open position, and additional support for the fairing may be required.

As best seen in FIG. 11, the payload fairing 138 is retained in the closed position by three electrically actuated, over-center latches 192 mounted on the payload support structure 136. The latches 192 releasably engage mating hook structures on the sidewall 142 of the payload fairing 138, and lock the payload fairing in the closed position until the upper stage 14 is in orbit around the Earth. The latches 192 also lock the payload fairing 138 in the closed position during the decent trajectory through the Earth's outer atmosphere.

The payload fairing 138 is a unitary blunt cap-like member that defines the blunt-tipped end of the upper stage 14. The payload fairing 138 is the leading end structure of the upper stage 14 during virtually all of the vehicle's flight, including along the decent trajectory through the Earth's outer atmosphere. The preferred payload fairing 138 is a carbon epoxy composite structure having an external layer of insulation 194, such as FRCI 12, on the end wall 140 and the side walls 142 to protect the fairing 138 from frictional heat generated during ascent and descent through the Earth's outer atmosphere. The blunt payload fairing 138 is thus the primary heat shield of the upper stage 14. After the upper stage 14 re-enters the atmosphere to return to the take-off and landing area, the upper stage will encounter increasing atmospheric drag as it drops to lower altitudes having higher density air. At an altitude of about 60,960 meters, dynamic pressure and air resistance becomes considerable and starts slowing down the upper stage 14 very quickly, and maximum heating occurs at the payload fairing 138. The deceleration profile with a deceleration of approximately 8 gs occurs about 10 minutes after the upper stage 14 has experienced its first interface with the rarefied Earth atmosphere. The later deceleration through atmospheric drag rapidly decreases to 1 g as the vehicle has lost its horizontal velocity component and drifts down in a generally vertical path toward the ground. During re-entry through the Earth's outer atmosphere, the stagnation point is at the endwall 140 of the payload fairing 138, and the temperatures at the insulation on the endwall may be in the range of 1700K–1800K, causing the insulation to become white hot. The unitary structure of the payload fairing 138 is seamless and it allows for generally uniform distribution of the heat across the front of the upper stage 14 during reentry.

As discussed above with reference to FIG. 9, the upper stage 14 is an aerodynamically flare stabilized vehicle, and when the upper stage passes through the Earth's outer atmosphere, the flared proximal portion 132 of the upper-stage body 130 also encounters substantial frictional resistance as the upper stage passes through the atmosphere and decelerates. A layer of FRCI 12 insulation is adhered to the flared proximal portion 132 to prevent damage from over-heating during reentry into the Earth's atmosphere. Accordingly, the flared proximal portion 132 provides a secondary heat shield for protection of the upper stage 14. Although the preferred embodiment uses FRCI 12 insulation, other suitable insulative materials, including ceramic tiles or the like, can be used to protect the payload fairing 138 and the flared proximal portion 132 from frictional heat. The selected insulation material must protect the structure from damage during re-entry, so the payload fairing can be safely reused for subsequent flights to deploy satellites or the like.

In the preferred embodiment, the lower-stage body 46 and the upper-stage body 130 also have an external insulation layer to protect the structure from overheating during flight. The preferred insulation layer is an 8 millimeter thick layer of sheet insulation having an inner sheet of E-glass fabric that is bonded to the upper and lower stage bodies 130 and 46, an outer sheet of quartz fabric, and a microquartz insulation layer sandwiched between the inner and outer sheets. The insulation layer limits the base temperature of the carbon epoxy composite structures to approximately 500K.

As best seen in FIGS. 9 and 12A–C, the upper stage 14 has a landing system 200 that is deployed as the upper stage returns to the landing area along the descending trajectory. The landing system 200 is similar to the landing system 100 of the lower stage 16 discussed above. The upper stage landing system 200 includes a deployable parachute assembly 202 having an insulated housing 204 removably mounted to the upper-stage body 130 adjacent to the helium tanks 170, and three deployable parachutes 206 packed in the housing 204. In the preferred embodiment, the parachutes 206 are deployed at an altitude of approximately 1,500 meters to minimize drift relative to the landing area 36 (FIG. 12C) during the landing sequence. The parachutes 206 are retained behind a hinged door on the housing that remains closed until deployment of the parachutes.

The parachutes 206 are preferably sized to reduce the descent velocity of the upper-stage body 130 upon deployment to approximately 7.6 meters per second. The three parachutes 206 are attached to a single parachute bridal 208 (FIGS. 12A–C) that is attached to proximal and distal attachment points 210 on the upper-stage body 130. When the parachutes 206 are deployed, the parachute bridal 208 supports the upper-stage body 130 generally horizontally with a slight nose-up attitude. When the upper-stage body 130 touches down at the landing area 36 (FIG. 12C), the parachute bridal 208 is released from its attachment points 210, jettisoning the parachute bridal and parachutes 206 to prevent wind from dragging the upper stage 14 or inducing a rollover.

After landing, the parachutes 206 and parachute bridal 208 are retrieved by a ground crew. In the preferred embodiment, the housing 204 of the deployed parachute assembly 202 is removed from the upper-stage body 130, and a packed replacement parachute assembly is mounted to the upper-stage body. The deployed parachute assembly is then reassembled at a repacking area for subsequent use on the aerospace vehicle 10.

The landing system 200 also includes four airbag assemblies 218 mounted on a side of the upper-stage body 130 opposite the parachute assembly 202. When the upper-stage body 130 is moving toward the landing area 36 with the parachutes 206 deployed, the airbag assemblies 218 are facing downwardly toward the landing area. Each airbag assembly 218 has a construction substantially identical to the lower-stage's airbag assemblies 102 discussed above, including an insulated housing 220, a deployable airbag 222 in each housing, and a conventional pressurized gas source 224 connected to the airbag for inflation before the upper stage 14 reaches the landing area 36 (FIG. 12D). Each of the airbag assemblies 218 are removable as a unit from the upper-stage body 130 for quick and easy replacement. The deployed airbag assemblies 218 are removed and replaced with packed assemblies, and the deployed assemblies are returned to a selected repacking area, repacked, and reused on an upper or lower stage 14 or 16 during a subsequent flight.

Two of the airbag assemblies 218 are mounted adjacent to the payload support structure 136 and two of the airbag assemblies are mounted to the upper-stage body 130 adjacent to the flared proximal portion 132. The airbag assemblies 218 are positioned to provide a stable footing for the upper stage 14 upon landing to avoid rollover. Each of the four airbags 222 has a vented outer bag 110 and a sealed inner bag 112, as discussed above and shown in FIG. 8. The bags 110 and 112 provide a damped yet supported landing on the landing area to prevent the upper-stage body 130 from bouncing or impacting the ground upon landing.

As best seen in FIG. 2, the upper stage 14 is releasably mounted atop the lower stage 16 from the take-off and along the ascending trajectory to the separation portion of the ascending trajectory. When the aerospace vehicle 10 reaches the separation area 26 at an altitude of approximately 40,000 meters, a separation system 290 on the lower stage 16 is activated, and the upper and lower stages 14 and 16 separate from each other.

Figure 13:
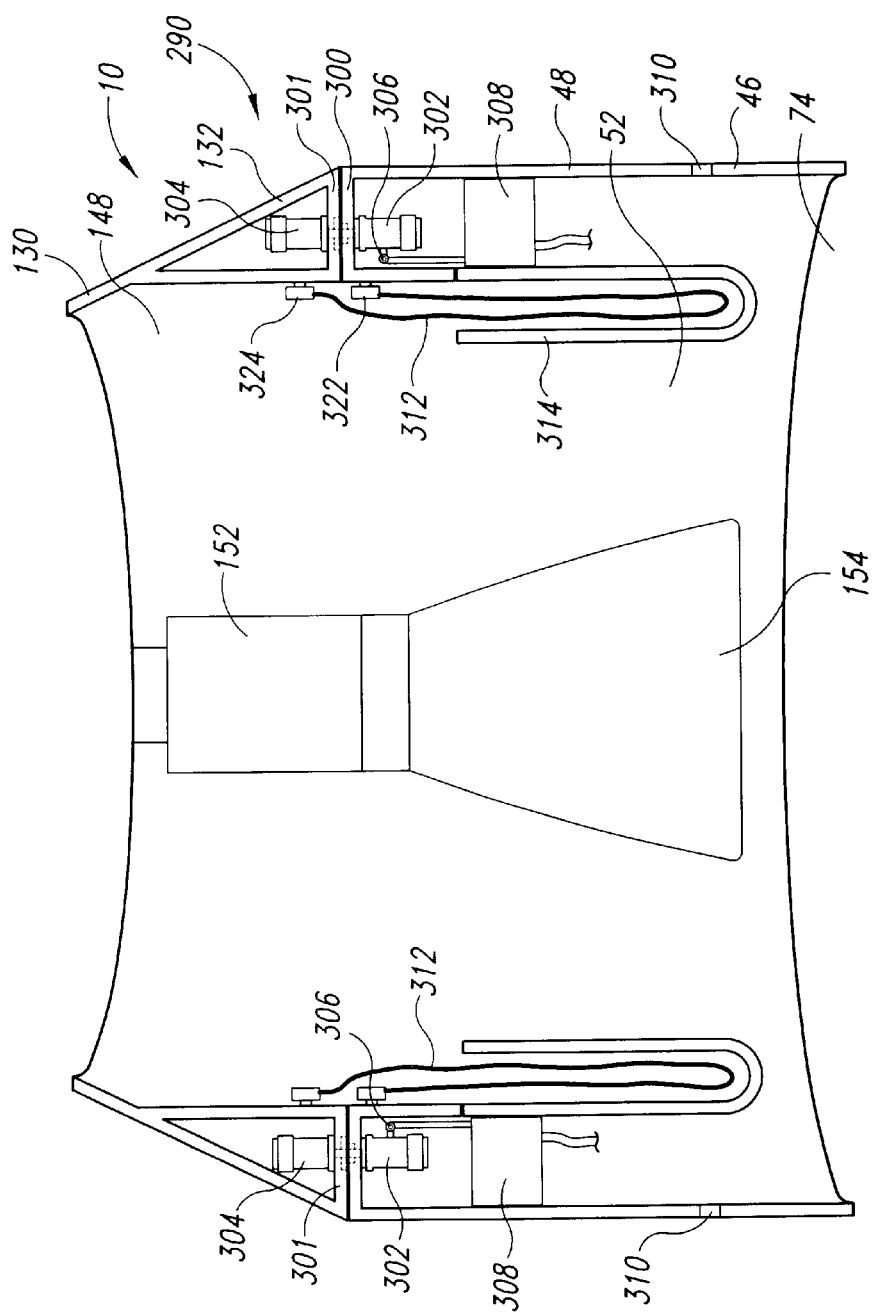
FIG. 13 is an enlarged cross-sectional schematic view taken substantially along the line 13—13 of FIG. 3 showing a stage separation system.

As best seen in FIG. 13, the separation system 290 is mounted to the distal portion 48 of the lower-stage body 46. The lower-stage body 46 has a generally flat interface ring 300 that provides a flat surface for supporting a bottom mounting ring 301 on the flared proximal portion 132 of the upper-stage body 130. The separation system 290 has twelve separation nuts 302 mounted to and equally spaced around the interface ring 300. The separation nuts 302 are releasably connected to mating shear cone and bolt assemblies 304 mounted on the mounting ring 301 of the upper-stage body 130. Each separation nut 302 is releasably connected to a respective one of the bolt assemblies 304. In the preferred embodiment, the separation nuts 302 are pneumatically driven separation nuts, such as the SNR7311-4 separation nut manufactured by High Sheer Corporation.

Each separation nut 302 is movable between a locked position and a released position. In the locked position, the separation nut 302 securely engages its respective mating bolt assembly 304, and in the released position, the separation nut is out of engagement with the mating bolt assembly, thereby allowing the upper stage 14 to separate from the lower stage 16. The separation nuts 302 are all manifolded through a gas line 306 to a pair of high pressure nitrogen tanks 308 mounted to the lower-stage body 46 below the interface ring 300. The two nitrogen tanks 308 are on opposite sides of the lower-stage body 46, and each of the separation nuts 302 is manifolded to both tanks. When the separation nuts 302 are activated, pressurized nitrogen gas from the two nitrogen tanks 308 simultaneously moves all twelve separation nuts 302 from the locked position to the released position for a smooth and substantially instantaneous separation between the upper and lower stages 14 and 16. During release and separation of the upper and lower stages 14 and 16, the dual high-pressure nitrogen tanks 308 avoid releasing of the separation nuts at slightly different times around the upper-stage interface ring, a phenomena known as the "zipper effect." Accordingly, the separation system 290 avoids tip-off errors or roll inducement during separation.

The separation system 290 also has a separation sleeve 312 that retains pressurized air within the interior areas 52 and 148 between the upper-and lower-stage bodies 54 and 130 during separation to push the upper and lower stages 14 and 16 away from each other. When the aerospace vehicle 10 takes off, air at atmospheric pressure is contained in the interior areas 52 and 148 above the lower stage LOx tank 74 and below the upper stage RP-1 tank 168. As the upper and lower stages 14 and 16 ascend to an altitude of 40,000 meters, the ambient air pressure decreases to substantially 0 psi, thereby creating a pressure differential between the outside environment and these interior areas 52 and 148. However, it is desirable to limit the differential pressure to about 3 psi so that the force separating the upper and lower stages is not excessive. The differential pressure is limited to about 3 psi by venting the lower-stage body 46 through vents 310 to allow some of the air to escape during ascent.

At the separation portion, the engines 56 (FIG. 4) of the lower stage 16 are shut off and the aerospace vehicle 10 coasts along the separation portion. Immediately after the engines 56 are shut off, the separation nuts 302 are activated and moved to the released position, and the pressurized air in the interior areas 52 and 148 exerts a separation force that forces the upper and lower stages 14 and 16 apart from each other at a separation velocity of approximately 6 meters per second. The separation velocity is controlled by controlling the pressure of the air in the interior areas 52 and 148.

The separation sleeve 312 is a substantially air impervious material that is attached at a lower end 322 to the interface ring 300 and attached at an upper end 324 to the flared distal portion 132. The separation sleeve 312 prevents the pressurized air from immediately exiting the space between the upper and lower stages 14 and 16 at the start of separation. The separation sleeve 312 is retained within a sleeve holder 314 mounted to the interface ring 300 to facilitate unfurling of the separation sleeve during separation and to prevent the separation sleeve from being entangled during ascent. The preferred sleeve holder 314 is an annular structure having a generally U-shaped cross section, although other sleeve holders can be used.

As best seen in FIGS. 14A and 14B, the upper and lower stages 14 and 16 move apart from each other at separation. The separation sleeve 312 unfurls from the sleeve holder 314, and the sleeve extends between the upper-and lower-stage bodies 46 and 130. The separation sleeve 312 contains the pressurized air between the upper and lower stages 14 and 16 and provides an elongated separation stroke length sufficient to generate the 6 m/s separation velocity. The separation sleeve 312 has a fixed length, and when the distance between the upper and lower stages 14 and 16 exceeds the fixed length, the upper end 324 of the separation sleeve is pulled off of the upper-stage body 130 (FIG. 14B) and physical separation between the two stages is completed.

The separation between the upper stage 14 and lower stage 16 is accomplished within three seconds as the aerospace vehicle 10 coasts and loses vertical velocity in the order of 10 m/s per second. At three seconds, the engine 152 of the upper stage 14 is started and the engine propels the upper stage away from the lower stage 16 and along the remainder of the ascending trajectory to the selected orbit.

As best seen in FIGS. 4 and 14C, the separation system has a drogue parachute assembly 316 mounted to the proximal end of the lower-stage body 46 at a position away from the center of mass of the lower stage 16. The drogue parachute assembly 316 includes a drogue parachute 321 contained within an insulated housing 318 (FIG. 4) that is removably mounted to the lower-stage body 46. A conventional deployment mechanism is mounted in the housing 318 and, upon activation, it deploys the drogue parachute 221 from a packed position (FIG. 4) to a deployed position (FIG. 14C).

The drogue parachute 221 is releasably attached to the lower-stage body 46. When the drogue parachute 221 is deployed and inflated, the drogue parachute slows down and pulls on the proximal end of the lower-stage body 46, thereby exerting a rotational force on the lower-stage body and causing the lower-stage body to pitch up and rotate, as illustrated in FIG. 14D. Rotation of the lower-stage body 46 is also caused by increased aerodynamic drag of the lower-stage body as the lower stage 16 pitches up.

The rotation of the lower stage 16 moves the longitudinal axis of the lower stage away from the ascending trajectory and redirects the longitudinal axis to align with the return trajectory 28, illustrated in FIGS. 2 and 14D. In the preferred embodiment, the lower stage 16 is rotated to approximately 120° from horizontal. As the lower stage 16 approaches the 120° position, the drogue chute 321 is jettisoned, as shown in FIG. 14D, to slow down the rotation. The center engine 57 is restarted as the lower stage 16 reaches the 120° position, and the center engine propels the lower stage upwardly into the generally parabolic return trajectory 28, illustrated in FIG. 2, that leads back to the landing area 36. Accordingly, the engines 56 of the lower stage 16 do not consume all of the fuel in the RP-1 and LOx tanks 68 and 74 along the ascending trajectory 24, and a sufficient amount of fuel remains for restarting the middle engine 57 for a return burn along the return trajectory.

In an alternate embodiment, not shown, the drogue parachute assembly 316 is attached to the distal end of the lower-stage body 46. In another alternate embodiment, the lower stage 16 has redirection thrusters mounted to the proximal or distal ends of the lower-stage body, and the thrusters are activated to rotate the lower stage.

In one embodiment of the present invention, the middle engine 57 is an auxiliary engine that is not fired during initial take-off and climb to the separation portion of the ascending trajectory. The auxiliary middle engine is fired only after separation to propel the lower stage into the return trajectory. In this alternate embodiment and the preferred embodiment wherein the middle stage is fired, the middle engine 57 is provided with liquid oxygen and kerosene that is in the respective tanks and that has not been consumed during ascent to the separation portion. In an alternate embodiment, the lower stage 16 includes a separate fuel tank system dedicated to the auxiliary middle engine for the burn along the return trajectory.

Electronics and Flight Control Computers

Figure 15:
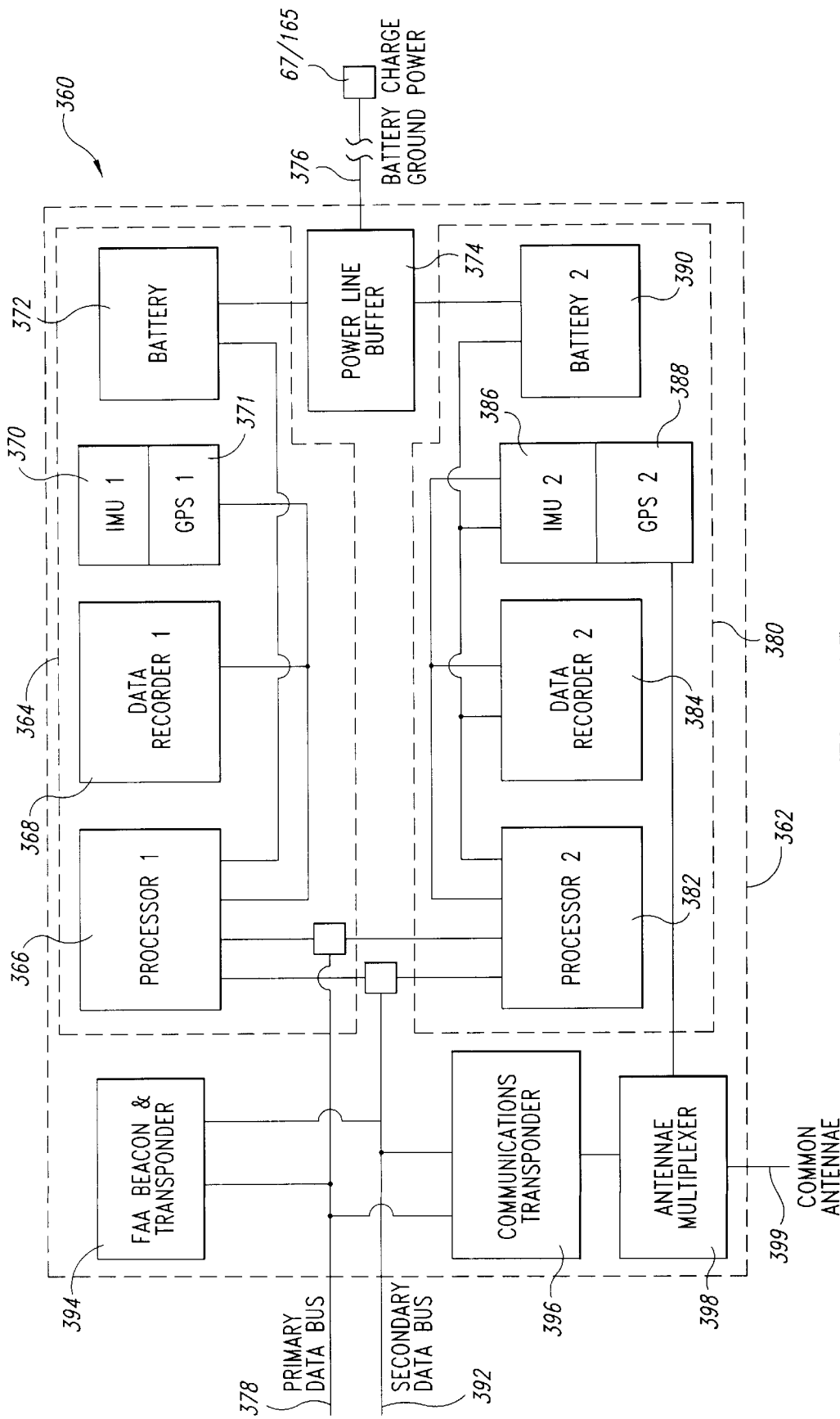
FIG. 15 is a schematic block diagram of a flight control computer assembly of the upper and lower stages of FIG. 3.

The upper and lower stages 14 and 16 each have a central flight control computer system 360, schematically illustrated in FIG. 15, that monitors and controls the structures, propulsion systems, and landing systems to successfully guide the aerospace vehicle 10 to the selected orbit for payload deployment and back to the take-off and landing area. Each of the flight control computer systems 360 are contained in a structural housing 362 that is thermally insulated, acoustically shielded, and vibration isolated. The structural housings 362 are removably mounted to the upper- and lower-stage bodies 46 and 130, such that each of the housings and its internal components discussed below can be removed as a unit. Accordingly, the flight control computer system 360 is an electronics line-replaceable-unit (LRU) that can be easily and quickly removed and replaced with a substitute system if, for example, a malfunction is detected in preparation for take-off. The malfunctioning system can be repaired remotely, such as at the manufacturer's facilities, without significantly impacting a take-off schedule for the aerospace vehicle 10.

The flight control computer system 360 for the lower stage 16 will be discussed below in detail, and it is to be understood that the description also applies to the flight control computer system of the upper stage 14. The flight control computer system 360 has a primary flight control computer 364 mounted within the housing 362. The primary computer 364 includes a programmable microprocessor 366 that is connected to an internal data storage device 368, an inertial measurement unit 370, and a global positioning system (GPS) receiver 371. A rechargeable battery 372 is connected to the microprocessor 360 to provide independent power for the primary computer 364 during flight. The battery 372 is connected to a power line buffer 374 that is connected to an input line 376, and the input line terminates at the umbilical panel 67 for connection to a battery recharger or to ground power.

The primary computer 364 is operatively connected to a primary data bus 378 that extends through the lower-stage body 46 and connects to the microprocessors and microcontrollers on components of the lower stage 16 as discussed in detail below. The primary computer's microprocessor 366 is preprogrammed with a simulated model of anticipated flight conditions, and the microprocessor receives digital data over the data bus from systems of the lower stage 16 regarding flight conditions. The microprocessor 366 compares the actual data to the anticipated flight conditions for health monitoring and to ensure accuracy of the lower stage flight. If the actual data differs from the anticipated conditions, the microprocessor 366 sends digital control signals to the selected system, such as the propulsion system, to make a change to meet the anticipated conditions. The microprocessor 366 also monitors the inertial measurement unit 370 and the GPS receiver 371 regarding the relative position and orientation of the lower stage 16 to generate steering, and cut-off commands to the power plant 54.

The preprogrammed flight control computer system 360 controls all operations of the aerospace vehicle 10 from take-off to landing. Once the aerospace vehicle 10 leaves the take-off pad, the entire flight may be controlled by the flight control computer system, and personnel on the ground preferably have no way to control, abort or destroy the aerospace vehicle until it lands.

The flight control computer system 360 preferably has a safe abort capability in case of engine failures or other substantial malfunction. As discussed above, both the upper and lower stages 14 and 16 are designed for a safe landing with a controlled descent by the parachutes and cushioned landing on the airbags. In the event of an engine out condition or other abort warranted condition, the microprocessor 366 of the flight control computer 364 will switch to an abort program, wherein all of the propellants are expelled or jettisoned from the vehicle as the abort program guides the aerospace vehicle to a return trajectory for a safe and controlled landing.

The flight control computer system 360 has a backup computer 380 that is a redundant computer system. If a malfunction is detected in the primary flight control computer 364, the back-up computer will take over in controlling the aerospace vehicle throughout its flight. The backup computer 380 has a programmable microprocessor 382 that is connected to a data storage device 384, an inertial measurement unit 386, and a GPS receiver 388. Data from the backup inertial measurement unit 386 and the GPS receiver 388 is also used to generate control and cut-off commands to the power plant 54. In an alternate embodiment, one or both of the primary and backup flight control computers 364 and 380 utilize a star tracking system rather than the GPS receivers 371 and 388 for monitoring the spatial position of the lower stage 16.

The backup microprocessor 382 is also connected to a rechargeable backup battery 390 to provide power independent of the primary computer battery 372. The backup battery 390 is also connected to the power line buffer 374 and the outlet line 376. The backup computer 380 is operatively connected to a backup data bus 392 which is connected to each of the microprocessors and microcontrollers throughout the lower stage 16. The backup computer 380 is also connected to the primary data bus 378, and the primary computer 364 is connected to the backup data bus 392. Accordingly, the primary and backup flight control computers 364 and 380, and the primary and backup data buses 378 and 392, provide redundant systems for accurate monitoring and control of the lower stage 16. The primary and backup data buses 378 and 392 are also connected to a respective connector at the umbilical panel 67 to allow for connection to a ground support computer during preparation for take-off.

The flight control computer system 360 also includes an FAA compatible radar beacon and flight transponder 394, a communications transponder 396 for uploading and downloading data, and an antenna multiplexer 398 connected to a common antenna 399.

Figure 16:
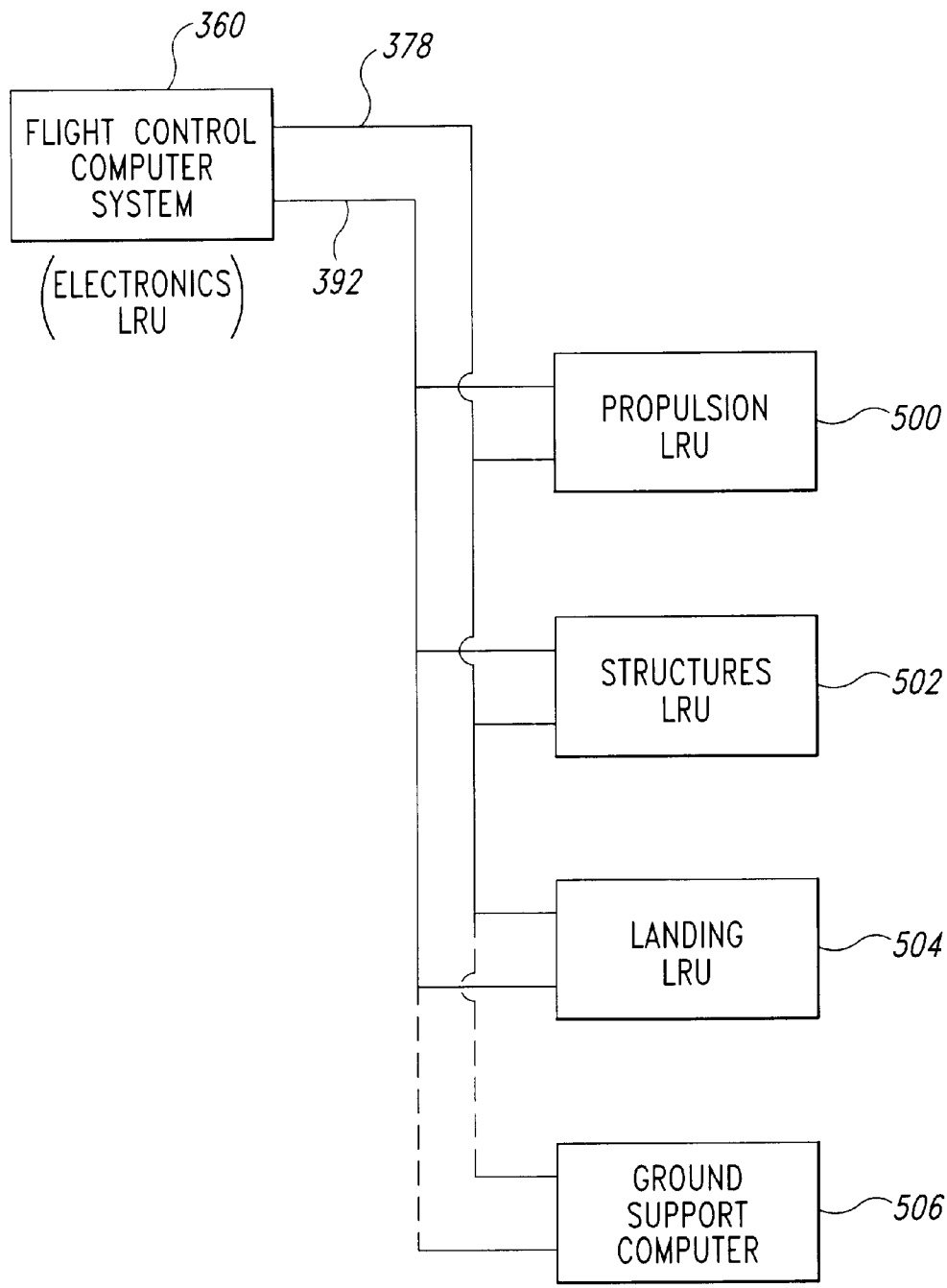
FIG. 16 is a schematic block diagram of the flight control computer system of FIG. 15 interconnected with line replaceable units of the aerospace vehicle of FIG. 3.

As best seen in FIG. 16, the primary and backup data buses 378 and 392 serially connect the flight control computer system 360, referred to as the electronics LRU, to a propulsion LRU 500, a structures LRU 502, a landing LRU 504, and the ground support computer 505. The electronics LRU monitors and controls the components of the respective LRU, as discussed below, during preparation for take-off and during the flight. The components of the propulsion LRU 500 of the lower stage 16 include the engines 56, the gimbal actuators 61, the fill-and-drain lines 66, other fuel lines, the fuel tank pressurization system 90, and the attitude control system 95. Each of these components includes a microprocessor or a microcontroller, which has its own rechargeable battery. Each microprocessor or microcontroller is connected to the primary and secondary data buses 378 and 392 for digital communication with the electronics LRU.

As an example, each of the engines 56 has an engine microprocessor serially connected to the primary and secondary data buses 378 and 392, and the engine microprocessor receives and transmits digital data regarding the status and control of the engines. Each engine microprocessor controls the respective engine 56 and control signals are also received from the primary or secondary flight control computers 364 and 380 (FIG. 15). Each engine 56 and its engine microprocessor are removable and replaceable from the lower stage 16 as a unit for easy and quick replacement for maintenance or in the event of a malfunction.

In the preferred embodiment, each of the gimbal actuators 61, the fill-and-drain lines 66, and the fuel tank pressurization system 90 includes a separate microcontroller operatively connected to the primary and secondary data buses 378 and 392. Each of these components and its respective microcontroller are removable and replaceable as a unit. The attitude control system 95 includes a separate microcontroller for each of the thruster pods 97, and each thruster pod and its microcontroller are removable and replaceable as a unit. Accordingly, each of the components and its microprocessor or microcontroller is a line-replaceable-unit that can be easily and quickly disconnected from the primary and secondary data buses 378 and 392, replaced, and reconnected to the data buses.

The structures LRU 502 includes a structures microcontroller that is connected to the primary and secondary data buses 378 and 292 and connected by multiple sensors to the lower-stage body 46, the LOx tank 74, the RP-1 tank 68, the separation system 290, and the insulation or thermal protection system. The structures microcontroller monitors the conditions or "health" of the structures LRU components. The structures microcontroller collects and reports sensor inputs from sensors around the lower stage 16 to determine vehicle structural status. The structures microcontroller provides health reports, including go/no-go signals, to the primary and backup flight control computers 364 and 380, and it has its own rechargeable battery for independent power during flight. The structures microcontroller also provides activation signals to the separation system 290 to release the separation bolts 3023/18/96 and to initiate separation.

The structures LRU of the upper stage 14 also includes the payload fairing 138, the power hinges 188, the latches 192, and the payload retaining system. The structures microcontroller provides signals to actuate the power hinge 188 and the latches 192 for opening and closing of the fairing and for deployment of the payload.

The landing system LRU 504 includes the parachute assembly 120, the airbag assemblies 102, and the drogue parachute assembly 320. Each of the parachute, airbag, and drogue parachute assemblies 120, 102, and 320 has its own microcontroller mounted within the respective housing assemblies 122, 104, and 318. Each microcontroller is operatively connected to the actuating device for deployment of the respective parachutes 124, airbag 106 or drogue chute 221. Accordingly, each parachute assembly 120, airbag assembly 102 and drogue parachute assembly 320 is removable with its microcontroller as a unit and replaceable.

Although the drogue parachute assembly 320 is part of the separation system 290 and not part of the lower-stage landing system 100, the controls and instructions for actuating the drogue parachute 321 are so similar to deployment of the parachutes 124, the drogue parachute assembly is included in the landing LRU 504. In addition, the landing LRU 504 for the upper stage 14 does not include a drogue parachute assembly and microcontroller unit.

Accordingly, the electronics of the upper and lower stages 14 and 16 of the aerospace vehicle 10 are greatly simplified and allow for removal and replacement of components and the respective microprocessor or microcontroller as a unit with easy and quick connections of the units to the data buses and, thus, connection to the flight control computer system 360.

Flight Trajectories and Orbits

The reusable two-stage aerospace vehicle 10 of the present invention carries the selected payload to a low Earth orbit along particular trajectories relative to the Earth that allow the liquid oxygen and kerosene powered vehicle to reach the necessary orbital velocity of 7.5 km/sec. As best seen in FIG. 2, the aerospace vehicle 10 takes off from the take-off stand 22 at the take-off area 20 and travels along the ascending trajectory 24 gaining altitude and moving down range. During approximately 130 seconds from take-off, the upper and lower stages 14 and 16 climb along the ascending trajectory 24 to an altitude of approximately 40,000 meters, reaches a velocity of Mach 4.4, and travels down range approximately 32 km from the take-off area. At 130 seconds from take-off, the five engines 56 of the lower stage 16 are shut off and the aerospace vehicle enters and coasts along the separation portion 26 of the ascending trajectory.

Immediately after shutting off the engines 56, the separation system 290 is activated, the separation nuts 302 move to the released position as described above, and the pressurized air contained in the interior areas 52 and 148 separates the upper stage 14 from the lower stage 16. Separation takes approximately one second before the separation sleeve 312 pulls away from the upper stage 14 for complete separation. Separation should occur quickly to minimize the loss of vertical velocity while coasting, but the separation must be precise to ensure the upper and lower stages 14 and 16 are properly oriented and to avoid the upper and lower stages from bumping to each other.

Immediately upon release of the separation sleeve 312 the drogue chute 321, under the command of the flight control computer, is deployed, causing the lower stage 16 to pitch up and rotate to approximately the 120° position so as to be pointing upwardly and back toward the take-off and landing area. The drogue chute 321 is jettisoned, the center engine 57 is reignited and the lower stage is propelled upwardly along the return trajectory 28 away from the separation portion 26 of the ascending trajectory 24.

The center engine 57 preferably burns for approximately 44 seconds to reverse the horizontal velocity of the lower stage 16 and to move the lower stage upwardly along the generally parabolic return trajectory 28 back to the take-off and landing area 30. The lower stage climbs to approximately 65,000 meters before beginning the descent of the return trajectory 28. Attitude control of the lower stage 16 during the return trajectory 28 is accomplished with the thrusters 96 of the attitude control system 95.

When the lower stage 16 descends to an altitude of approximately 1,500 meters above the take-off and landing area 30, the landing system 100 activates the parachute assembly 120 as discussed above to slow the vehicle's descent velocity. The airbags 106 are then deployed and inflated, the lower stage 16 touches down at the landing area 36 with the airbags damping and cushioning the landing and supporting the lower-stage body 46 above the ground. At touchdown, the parachutes 124 and parachute bridal 126 are jettisoned to avoid rollover and drag.

Figure 17:
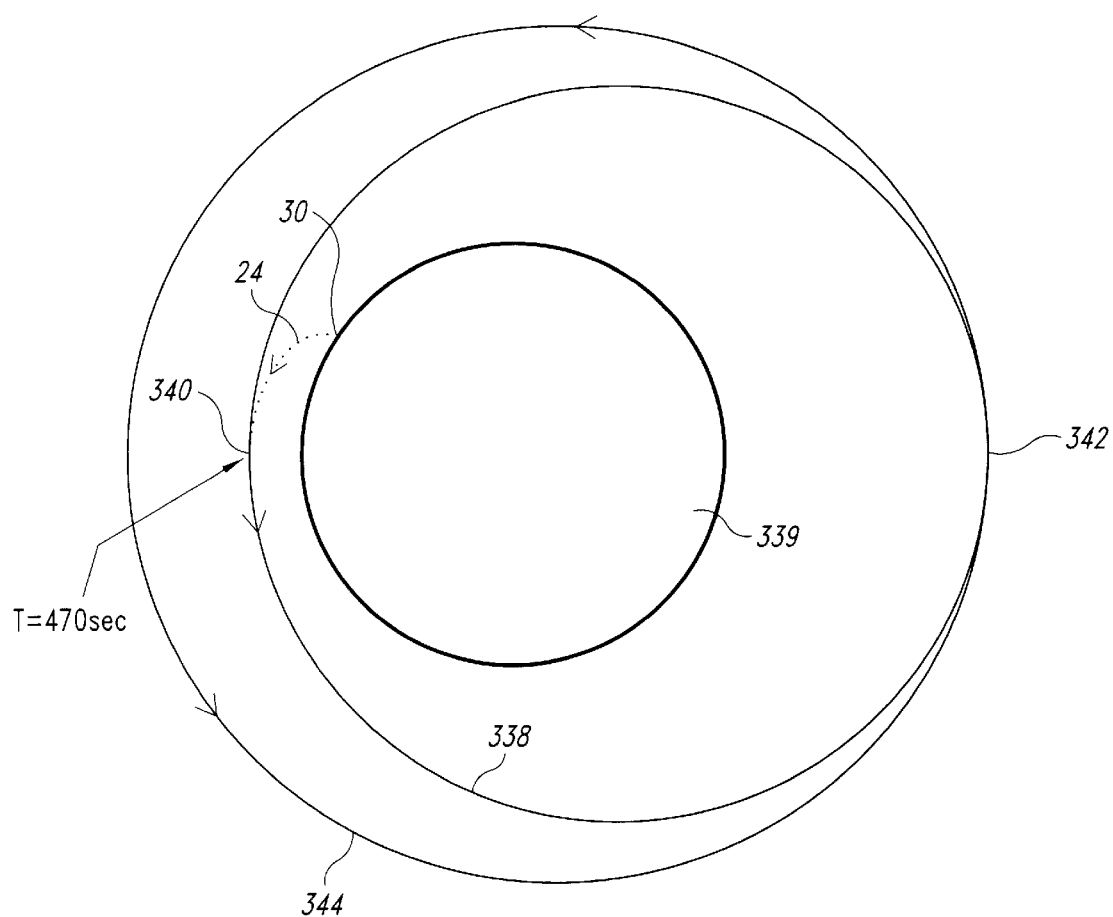
FIG. 17 is a schematic view illustrating a representative ascending trajectory of the aerospace vehicle of FIG. 3, an elliptical orbit, and a circular orbit around the Earth.

No less than three seconds after separation, the upper stage engine 152 is started and burns until approximately 470 seconds from take-off, propelling the upper stage along the ascending trajectory and out of the Earth's atmosphere at the orbital velocity. After 470 seconds the upper stage's engine 152 is shut off, ceasing acceleration, and the upper stage 14 is in a generally elliptical orbit 338 about the Earth 339, as illustrated in FIG. 17. When the upper stage engine 152 shuts off, the upper stage 14 is at the perigee 340 of the elliptical orbit 338. The upper stage 14 travels along one-half of the elliptical orbit 338 to the apogee 342 and refires the engine 152 for a 1–2 second circularizing burn, thereby moving the upper stage 14 into a circular orbit 344 around the Earth 399.

Figure 18:
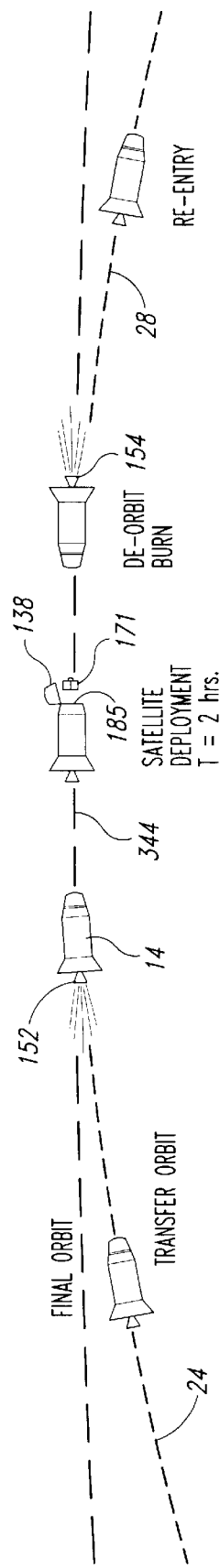
FIG. 18 is an enlarged schematic view of the upper stage trajectory into and out of the orbit of FIG. 17.

After approximately 120 minutes from takeoff, the upper stage 14 is in the circular orbit 344, as best seen in FIG. 18, and the upper stage 14 pivots the payload fairing 138 from the closed position to the open position to expose the payload 171 in the payload bay 185, and the upper stage deploys the payload into the selected orbit around the Earth. The payload fairing 138 is then pivoted to the closed position and latched in place for reentry through the Earth's atmosphere.

At a selected time depending upon the particular circular orbit 344 of the upper stage 14, the thrusters 178 of the attitude control system 176 (FIG. 5) are activated and the upper stage 14 is rotated 180 degrees so the booster nozzle 154 of the engine 152 defines the leading end of the upper stage. The engine 152 is then reignited for 1–2 seconds in a de-orbit burn, which reduces the velocity of the upper stage 14 and causes the upper stage to move out of the circular orbit 344 into the descending trajectory 28. As the upper stage 14 enters the descending trajectory 28, the thrusters 78 are again fired, rotating the upper stage approximately 180 degrees so the payload fairing 138 is again the leading end of the upper stage. The upper stage 14 then travels along the descending trajectory 28, through the Earth's upper atmosphere to the landing area, and lands as discussed above.

Figure 19:
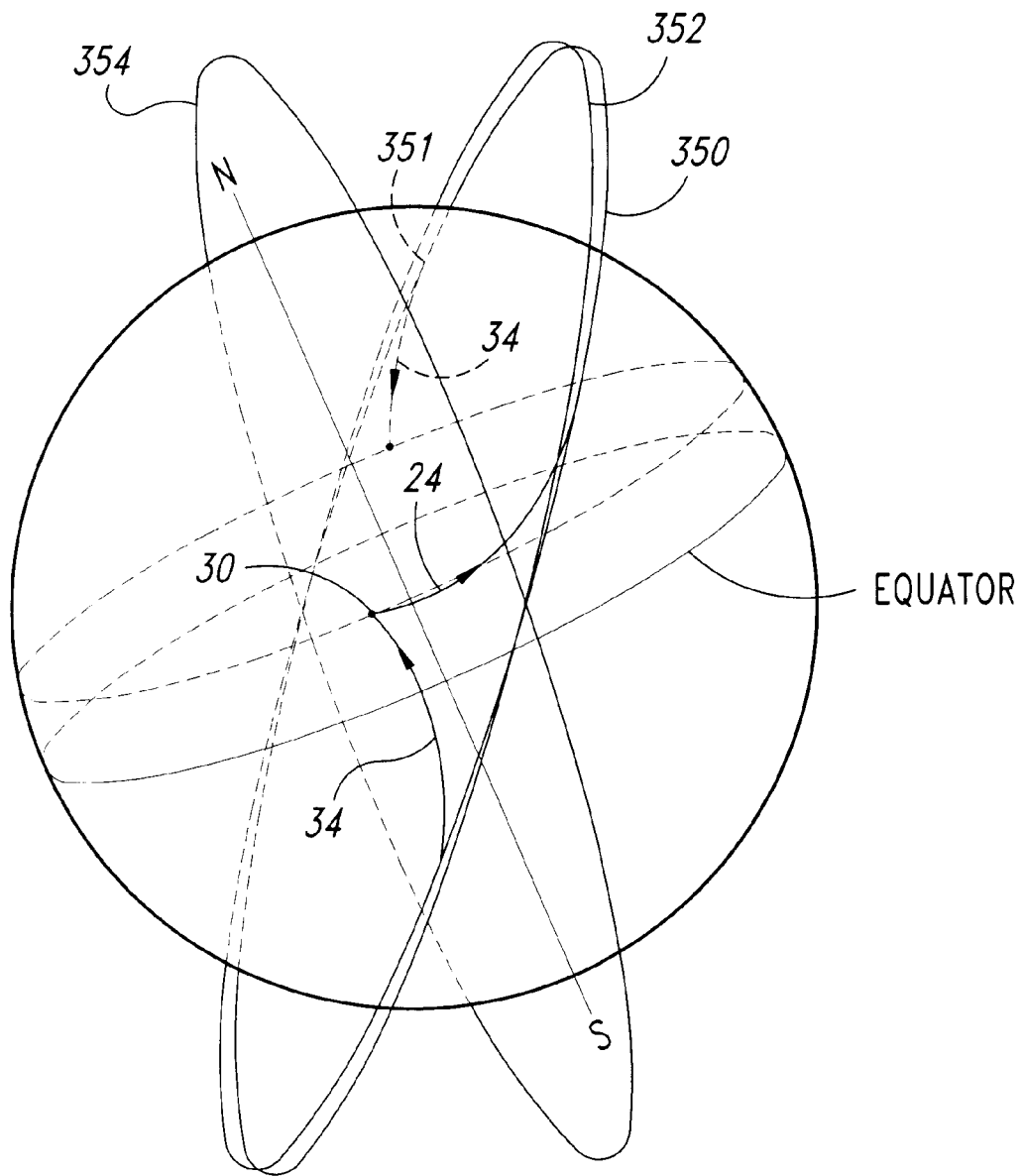
FIG. 19 is a schematic illustration of preferred low Earth orbits of the upper stage of FIG. 9 around the Earth for satellite deployment.

The maximum weight of the payload 171 that the aerospace vehicle 10 can launch to a particular low Earth orbit depends upon the height of the orbit and the inclination of the orbit relative to the equator. As best seen in FIG. 19, the inclination of an orbit is the angle between a plane defined by the circular orbit of the upper stage or satellite, and a plane defined by the equator of the Earth. Accordingly, an orbit around the equator has a zero degree inclination and a polar orbit over the Earth's poles has a 90 degree inclination. The orbital period, e.g., the time for one rotation around the Earth, of a low Earth orbit is approximately 90–120 minutes. Accordingly, each time the upper stage 14 returns to the same spatial point in inertial space along the orbit, the Earth will have rotated under the upper stage and the upper stage will be directly above a different point on the Earth.

After approximately sixteen orbits, or twenty-four hours, the upper stage 14 will be directly over the same point on the Earth, such as the take-off and landing area 30, because the Earth will have made one full revolution. The upper stage 14 will also be over the take-off and landing area 30 after approximately twelve hours when the upper stage is on the opposite side of the orbit, because the Earth will have made one-half of a revolution. The time periods of twelve and twenty-four hours for being over the take-off and landing area are approximations because the oblateness of the Earth and the inclination of the orbit affect the precise timing of the inertial space positioning of the upper stage relative to the take-off and landing area. Accordingly, the altitude, orbital period, the orbit inclination, and the relative rotation of the Earth are extremely important in terms of timing the re-entry burn of the upper stage 14 to ensure the upper stage returns to the landing area 36.

TABLE 1

Preferred Orbits for Upper Stage Return to Takeoff and Landing Area

| Inclination | Altitude (km) ±20 km | Number of Orbits to Return | Orbit Period (Min.) | Total Return Time (Hrs.) | Final Ascending Node Position Sensitivity to Upper Stage Altitude (deg/km) |
|---|---|---|---|---|---|
| 50-Land to SE | 270 | 20.212 | 89.91 | 30.29 | .100 |
| | 510 | 19.212 | 95.13 | 30.46 | .098 |
| | 525 | 4.212 | 95.03 | 6.67 | .021 |
| | 770 | 18.212 | 100.24 | 30.43 | .094 |
| | 1050 | 17.212 | 106.19 | 30.46 | .091 |
| 50-Land to NE | 210 | 16 | 88.69 | 23.65 | .079 |
| | 510 | 15 | 94.82 | 23.70 | .076 |
| | 850 | 14 | 101.93 | 23.78 | .073 |
| 52-Land to SE | 335 | 20.223 | 91.23 | 30.75 | .101 |
| | 575 | 19.223 | 96.17 | 38.81 | .098 |
| | 805 | 4.223 | 100.98 | 7.11 | .015 |
| | 835 | 18.223 | 101.61 | 30.86 | .095 |
| | 2120 | 17.223 | 107.69 | 30.91 | .092 |
| 52-Land to NE | 210 | 16 | 88.69 | 23.65 | .079 |
| | 510 | 15 | 94.82 | 23.70 | .076 |
| | 850 | 14 | 101.93 | 23.78 | .073 |
| 86-Land to SE | 535 | 7.293 | 95.34 | 11.59 | .075 |
| | 550 | 22.293 | 95.65 | 35.54 | .076 |
| | 765 | 21.293 | 100.13 | 35.54 | .112 |
| | 1010 | 20.293 | 105.33 | 35.62 | .108 |
| 86-Land to NE | 270 | 16 | 89.91 | 23.98 | .081 |
| | 570 | 15 | 96.06 | 24.02 | .078 |
| | 890 | 14 | 102.77 | 23.98 | .074 |

As best seen in FIG. 19 and Table 1, above, the preferred orbits for the upper stage 14 include a 50° inclination orbit 350, a 52° inclination orbit 352 and an 86° inclination orbit 354. For each orbit inclination, the upper stage 14 can orbit at altitudes in the range of approximately 270 km to 1120 km±20 km. (Table 1) The selected altitude of an orbit at an inclination determines the required timing for the upper stage 14 to execute the reentry burn and begin the descending trajectory 34 (FIG. 19) to return to the landing area.

The upper stage 14 can initiate its re-entry burn after an integer number of orbits, e.g., 14, 15, or 16 depending upon the altitude, so the upper stage will return to the landing area 36 approximately 23–24 hours after take-off. As best seen in FIG. 19, after an integer number of orbits the descending trajectory 34, shown in solid, results in the upper stage 14 landing at the landing area 36 heading in a northeast direction. If the re-entry burn is done on the opposite side 351 of the orbit, the upper stage 14 will land heading in the southeast direction.

If the reentry burn is not accomplished at the proper location on the particular orbit for either the northeast or southeast landings, the resulting descending trajectory 36 of the upper stage will not return to the landing area. In the preferred embodiment, the orbit characteristics are calculated such that the landing area 36 has approximately a 2 km diameter. As seen in Table 1, a descending trajectory for landings in the southeast direction is more sensitive to variations in the altitude and timing for the re-entry burn, and the total return time after take-off is typically 30–35 hours. Accordingly, the preferred orbits of the present invention are at 50°, 52° and 86° orbit inclinations at altitudes in the range of 210 km to 890 km±20 km, with the descending trajectories landing to the northeast.

Figure 20:
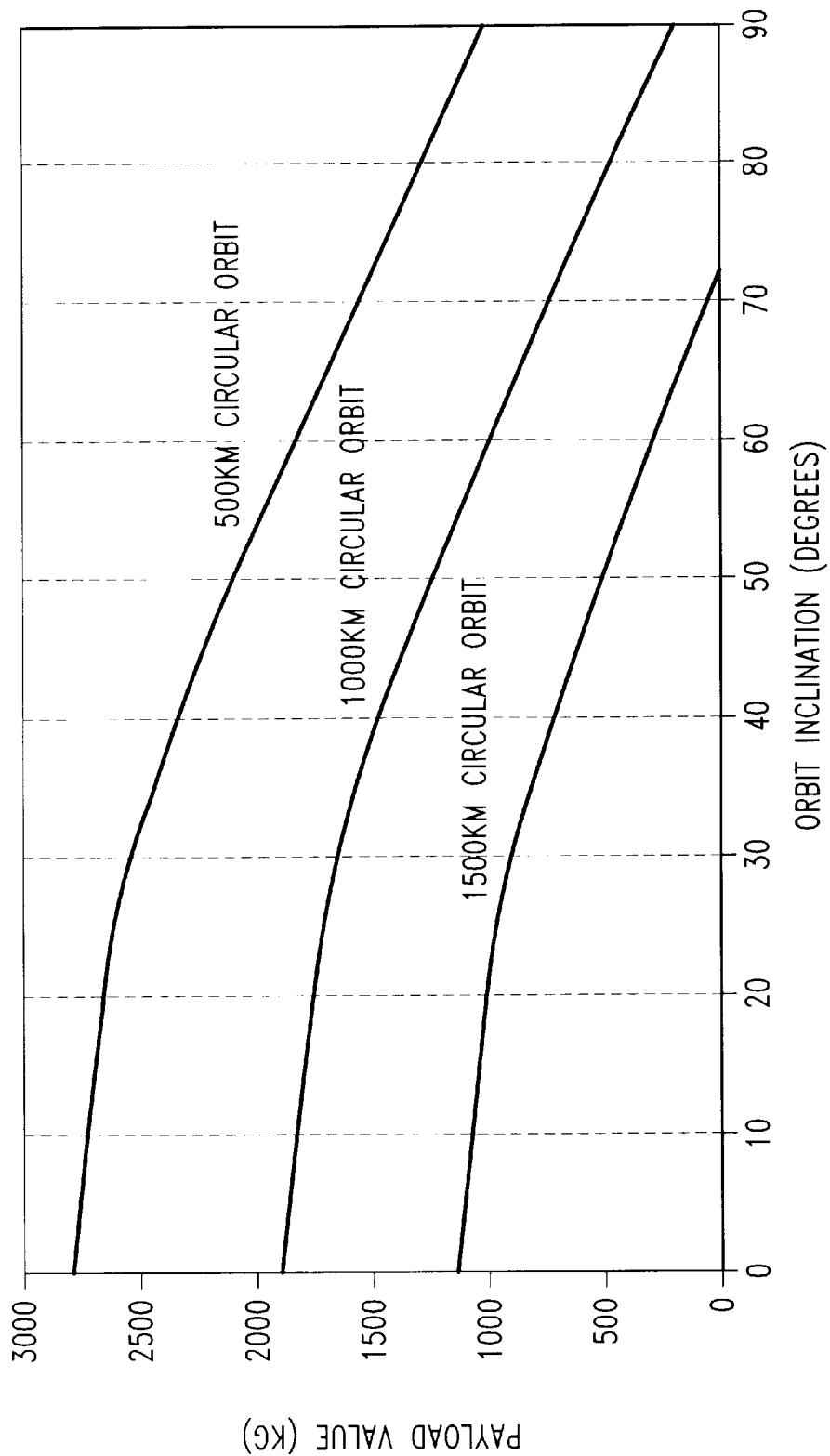
FIG. 20 is a graph illustrating orbit altitude limits for payload weight and orbit inclination of the upper stage of FIG. 9.

As indicated above, the selected orbit and altitude of the orbit determines the payload capability of the aerospace vehicle 10. The power and fuel capacity of the aerospace vehicle 10 are fixed, so heavier payloads can only be carried to a lower altitude along an orbit with a selected inclination. As best seen in FIG. 20, the aerospace vehicle 10 can deploy a payload of up to approximately 2,100 kg into a lower altitude orbit, such as 500 km, at a 50° orbit inclination. However, the aerospace vehicle 10 can only deploy a payload up to 500 kg into a 1500 km orbit at a 50° orbit inclination. Accordingly, the size of the payload also impacts the resulting orbit into which the satellite or other payload can be deployed while ensuring the upper stage 14 will return to the landing area 36.

Recovery, Transport, Assembly, and Launch Systems

Figure 21:
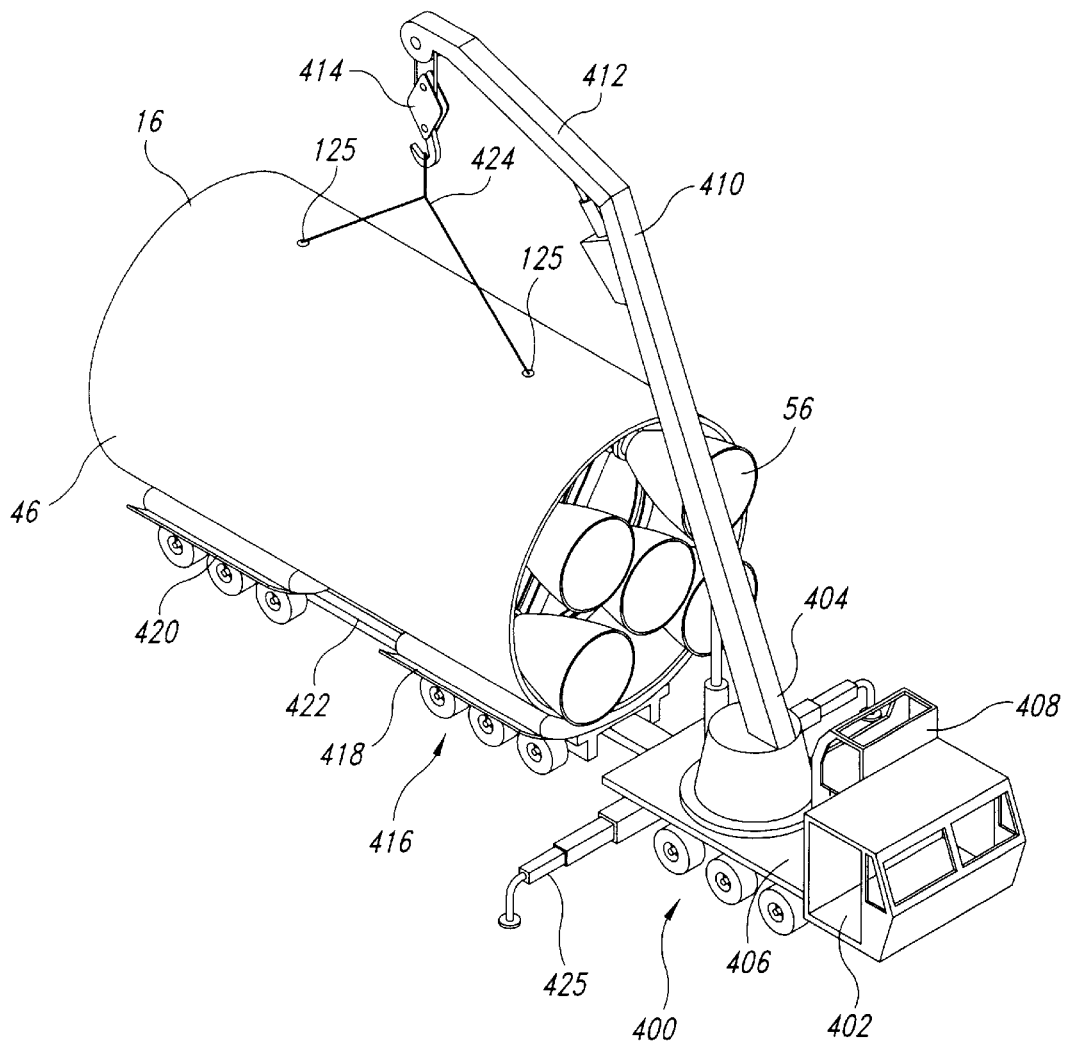
FIG. 21 is a top isometric view of a ground recovery vehicle supporting the lower stage of FIG. 4 upon recovery after landing, the outer body structure of the lower stage illustrated as translucent and selected interior components not shown for purposes of illustration.

As best seen in FIG. 21, a recovery vehicle 400 of the recovery and launch system 12 of the present invention recovers the upper and lower stages 14 and 16 when they return individually and land at the landing area 36. The recovery vehicle 400 is a wheeled, truck-like vehicle having a forward cab 402 and an engine system for propulsion of the recovery vehicle. A recovery crane 404 is mounted to a platform 406 behind the cab 402. A crane operator housing 408 is positioned on the platform 406 and is operatively connected to the crane 404 for moving and controlling a main arm 410 and a forearm 412. The forearm 412 supports a retrieving hook 414 at its upper end, and the retrieving hook is movable up and down upon activation of controls in the operating housing 408.

The recovery vehicle 400 has a wheeled trailer 416 that is towed by the cab 402. The trailer 416 has an elongated main frame 422, and forward and a rear cradles 418 and 420 that are mounted to the frame. The forward and rear cradles 418 and 420 are concave support structures having a curvature generally corresponding to the outer diameter of the lower stage 16.

Operation of the recovery vehicle 400 is described with reference to the lower stage 16, although the description also applies to recovery of the upper stage 14 (not shown). After the lower stage 16 lands, the recovery vehicle 400 is driven to the landing area 36 and is pulled up adjacent to the lower stage. A lifting bridle 424 is fastened to the lower stage 16 at the attachment points 125 for the parachute bridal, which was jettisoned upon landing. The crane 404 is maneuvered by controls in the operating house 408 to a position adjacent to the lower-stage body 46 and the hook 414 is connected to the lifting bridal 424. Upon landing, the outer airbags 110 are deflated and the inner airbags 112 remain inflated. The crane 404 lifts the lower stage 16 off of the landing area 36 and moves the lower stage over the forward and rear cradles 418 and 420. The crane 404 then sets the lower stage onto the cradles 418 and 420, with the inner airbags 112 engaging the cradles and supporting the lower-stage body 130 out of engagement with the cradles. The lower stage 16 is supported in a generally horizontal orientation.

During the lifting and positioning operation, the recovery vehicle 400 stabilizes the cab 402 and crane 404 with retractable stabilizing arms 425 to minimize tipping of the crane. After the lower stage 16 is securely positioned on the trailer 416, the stabilizing arms 425 are lifted and retracted, and the recovery vehicle 400 is driven to an installation and assembly complex located adjacent to the landing area 36. The lower stage 16 is then lifted off of the trailer 416 by the crane 404, the airbags 106 are removed from the lower-stage body 46, and the lower stage is placed onto the assembly and launch transport vehicle 18 of the transport and launch system 12 illustrated in FIGS. 1 and 22. The recovery vehicle 400 is then ready to recover the upper stage 14 upon its return to the landing area 36.

As best seen in FIG. 22, the assembly and launch transport vehicle 426 is a wheeled vehicle having an elongated frame 428 and a structural support beam 430 pivotally attached to a rear end 432 of the frame. The support beam 430 extends from the rear end 432 of the frame 428 to a forward beam end 441 beyond a forward end 434 of the frame. Two pairs of rear stabilizing arms 436 are attached to a rear portion 435 of the support beam 430 and spaced apart from each other. Each pair of rear stabilizing arms 436 is shaped and sized to receive and support the lower stage 16 (not shown) between the stabilizing arms 436 so the longitudinal axis of the lower stage is parallel to the support beam. The rear stabilizing arms 436 position the lower-stage body 130 (not shown) above and out of direct engagement with the support beam 430.

The rear stabilizing arms 436 of the preferred embodiment are hydraulically actuated arms movable between an outward released position and an inward secured position. In the outward released position, the rear stabilizing arms 436 are spaced apart to receive the lower stage 16, and in the inward secured position, the rear stabilizing arms securely engage and retain the lower stage to prevent movement of the lower stage relative to the support beam 430. The rear stabilizing arms 436 include conventional hydraulic systems for movement between the released and secured positions.

A translatable carriage 437 is mounted to a forward portion 438 of the support beam 430. The forward portion 438 of the support beam 430 includes rails 439 along its length, and the carriage 437 is movably mounted to the rails. Accordingly, the carriage 437 is translatable along the rails between forward and rearward positions. In the forward position, the carriage 437 is located at the forward end 441 of the support beam 430, and in the rearward position the carriage is located directly above the forward end 434 of the frame 428.

The carriage 437 has a contoured bed 440 connected to rollers that engage the rails 439, and the bed is shaped to receive and support the upper stage 14 (not shown) so the longitudinal axis of the upper stage is substantially parallel with the support beam 430. The carriage 437 also includes two pairs of forward stabilizing arms 442 that are mounted to the bed 440 and are translatable with the bed as a unit along the support beam 430. The forward stabilizing arms 442 also include conventional hydraulic systems for movement of the forward stabilizing arms relative to the bed 440 between an outward released position to receive the upper stage 14 and an inward secured positioned to retain the upper stage on the carriage 437 in a selected location relative to the support beam 430.

Figure 23A:
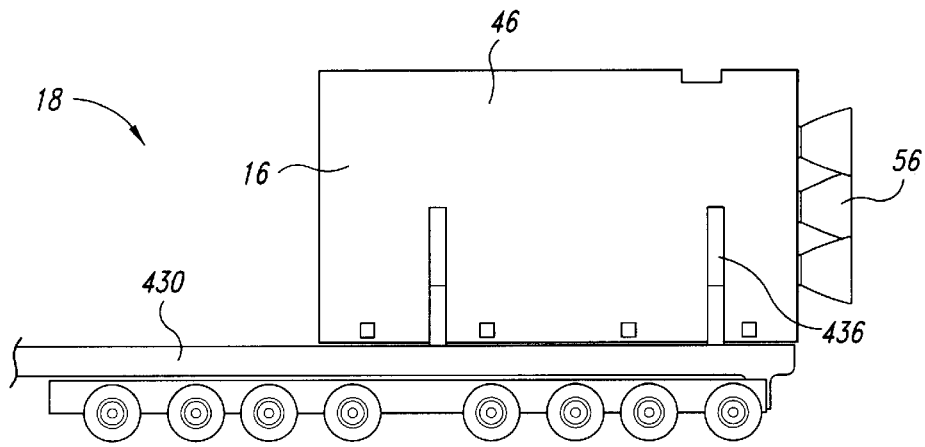
FIGS. 23A–C are a reduced side elevation views of the transport vehicle of FIG. 22 showing the integration of the lower stage and the upper stage in a horizontal position on the vehicle.
Figure 23B:
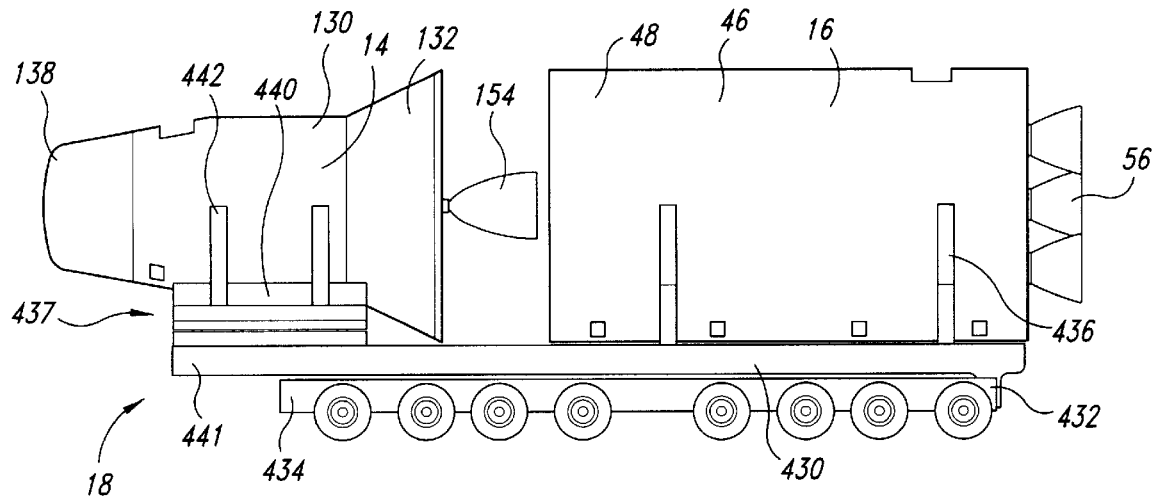

As best seen in FIG. 23A, the lower stage 16 is placed onto the assembly and launch transport vehicle 18 in a horizontal orientation with the rear stabilizing arms 436 securely retaining the lower stage in a fixed position relative to the support beam 430. As shown in FIG. 23B, the upper stage 14 is placed onto the translatable carriage 437 when the carriage is in the forward position to provide clearance for the booster nozzle 154. The upper stage 14 is supported in a substantially horizontal position and is coaxially aligned with the lower stage 16. The bed 440 of the carriage 437 supports the upper-stage body 130 with the flared proximal end portion 132 being rearward of the bed and aligned with the distal portion 48 of the lower stage 16.

Figure 23C:
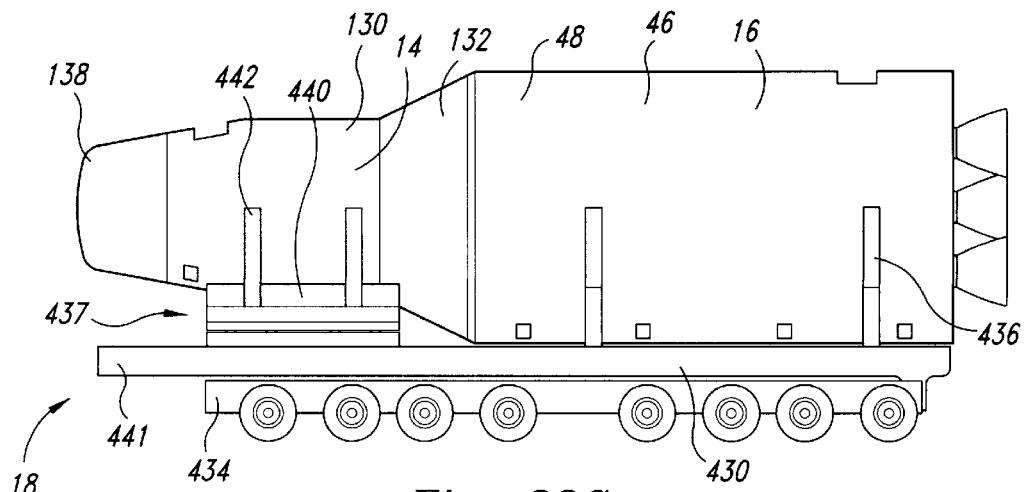

As best seen in FIG. 23C, the translatable carriage 437 and the upper stage 14 are moved as a unit laterally along the support beam 430 from the forward position to the rearward position so the flared proximal portion 132 of the upper-stage body 130 engages the distal portion 48 of the lower-stage body 130. The upper stage 14 is then securely reconnected to the lower stage 16 in preparation for a subsequent launch.

Figure 24:
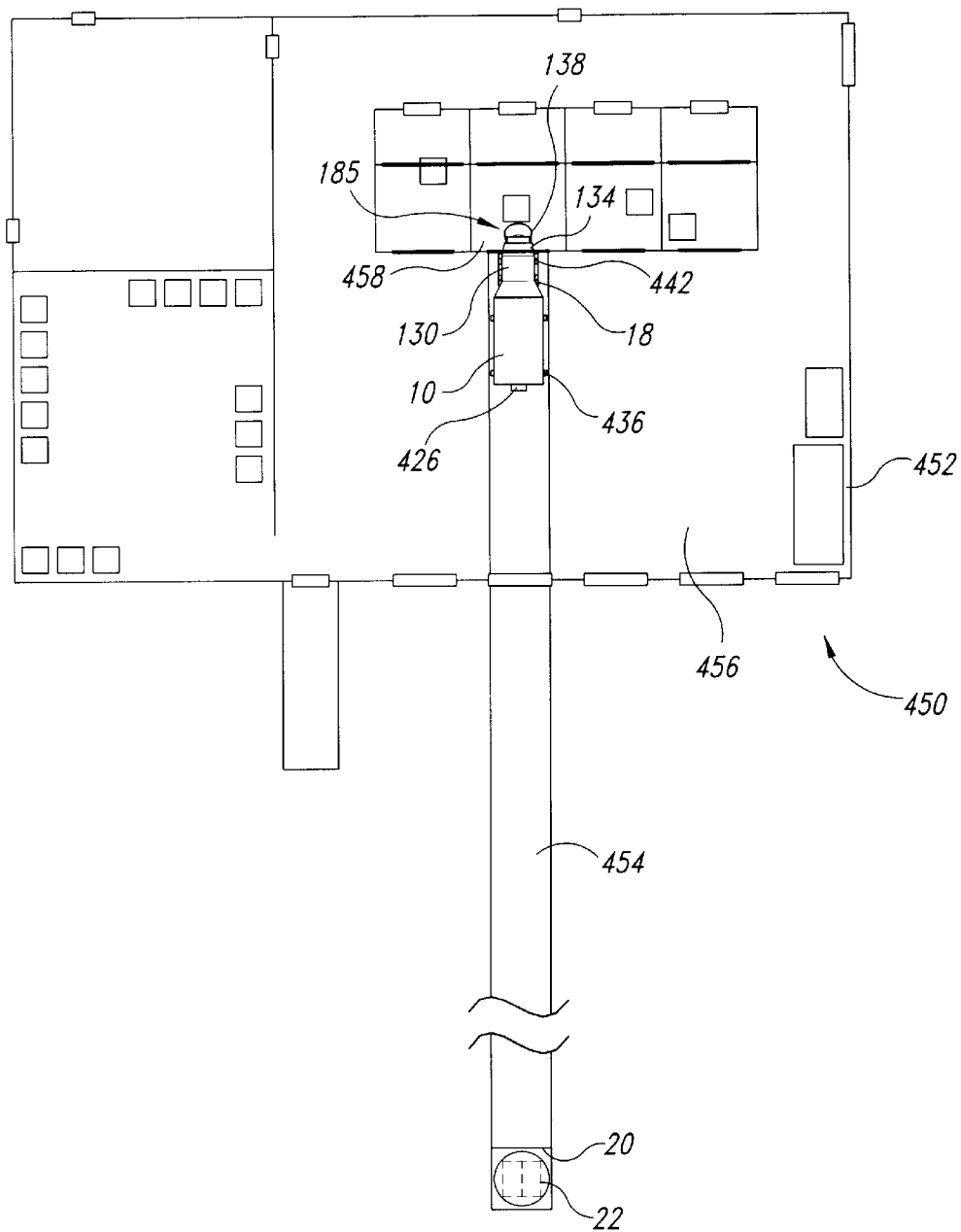
FIG. 24 is a schematic plan view of an assembly complex and take-off area for preparation and launch of the aerospace vehicle of FIG. 1.

As best seen in FIG. 24, the assembly and launch transport vehicle 18 carries the aerospace vehicle 10 in the substantially horizontal position to a reconfiguration and assembly complex 450. In the preferred embodiment, the transport vehicle 18 is controlled by conventional hard wire remote control mechanisms that drive the transport vehicle between the take-off area 20 and the assembly complex 450. The transport vehicle 18 receives the upper and lower stages 14 and 16 when the transport vehicle is adjacent to the assembly complex 450, and the transport vehicle is then moved into the assembly complex 450.

The assembly complex 450 includes an assembly building 452 with a road 454 extending from the take-off area 20 into an interior area 456 of the building. The aerospace vehicle 10 and the transport vehicle 18 are moved into the building 452 and out of the elements of the environment.

The assembly building 452 includes several clean rooms 458 that are designed to receive the payload fairing 138 and the proximal portion 134 of the upper-stage body 130 when the aerospace vehicle is supported horizontally on the transport vehicle 18. The payload bay 185 is located relatively close to the ground when the aerospace vehicle 10 is in the horizontal position, thereby making installation of the payload for deployment in the subsequent flight easier while working in the clean room environment. The remainder of the aerospace vehicle 10 is refurbished while on the assembly and launch transport vehicle 18 with the airbags, parachutes, drogue chutes and the like being replaced with repacked units.

When the aerospace vehicle 10 is ready for the next launch, typically within 3 to 5 days, the transport vehicle 18 carries the aerospace vehicle in the horizontal position over the road 454 to the take-off area 20. As best seen in FIG. 1, the aerospace vehicle 10 is positioned at the take-off area 20 with the distal portion 50 of the lower stage 16 being adjacent to the take-off stand 22 which is securely mounted on a lowered foundation 462 stepped down from the road 454.

Figure 25:
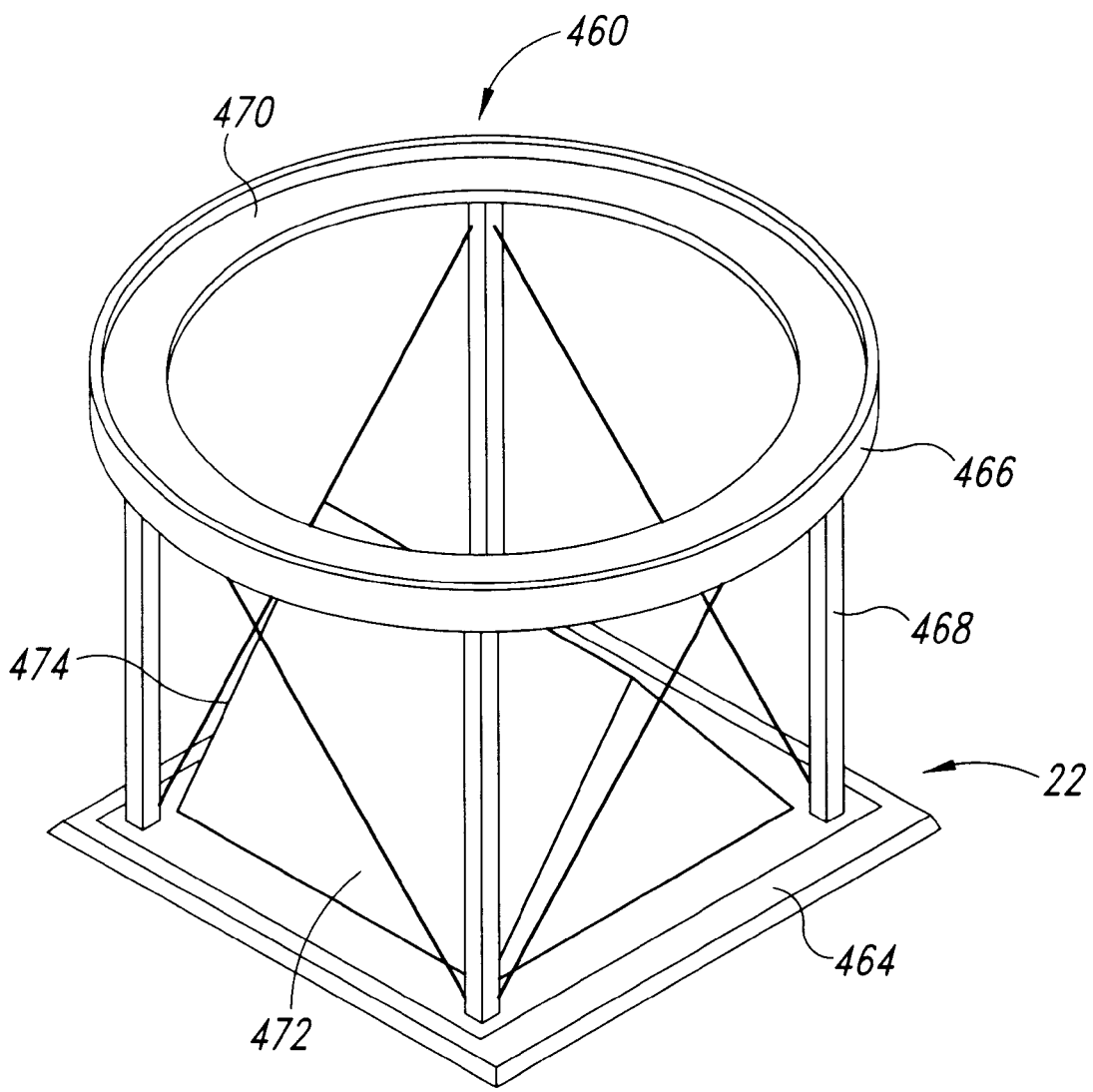
FIG. 25 is an enlarged top isometric view of a take-off stand of FIG. 1.

As best seen in FIG. 25, the take-off stand 22 is a rigid structure having a base 464 that provides a stable footing, and a support ring 466 that is supported above the base by rigid support legs 468. The support ring 466 has a vehicle support flange 470 extending radially inwardly and forming an annular platform on which the distal end of the aerospace vehicle 10 (FIG. 1) sets prior to launching. The take-off stand 22 also includes a wedge-shaped flame diverter structure 472 mounted to the base 464 below the support ring 466. The flame diverter 472 has angled surfaces 474 that direct the heat and flames sideways and away from the engines 56 (FIG. 1) during launch.

Figure 26:
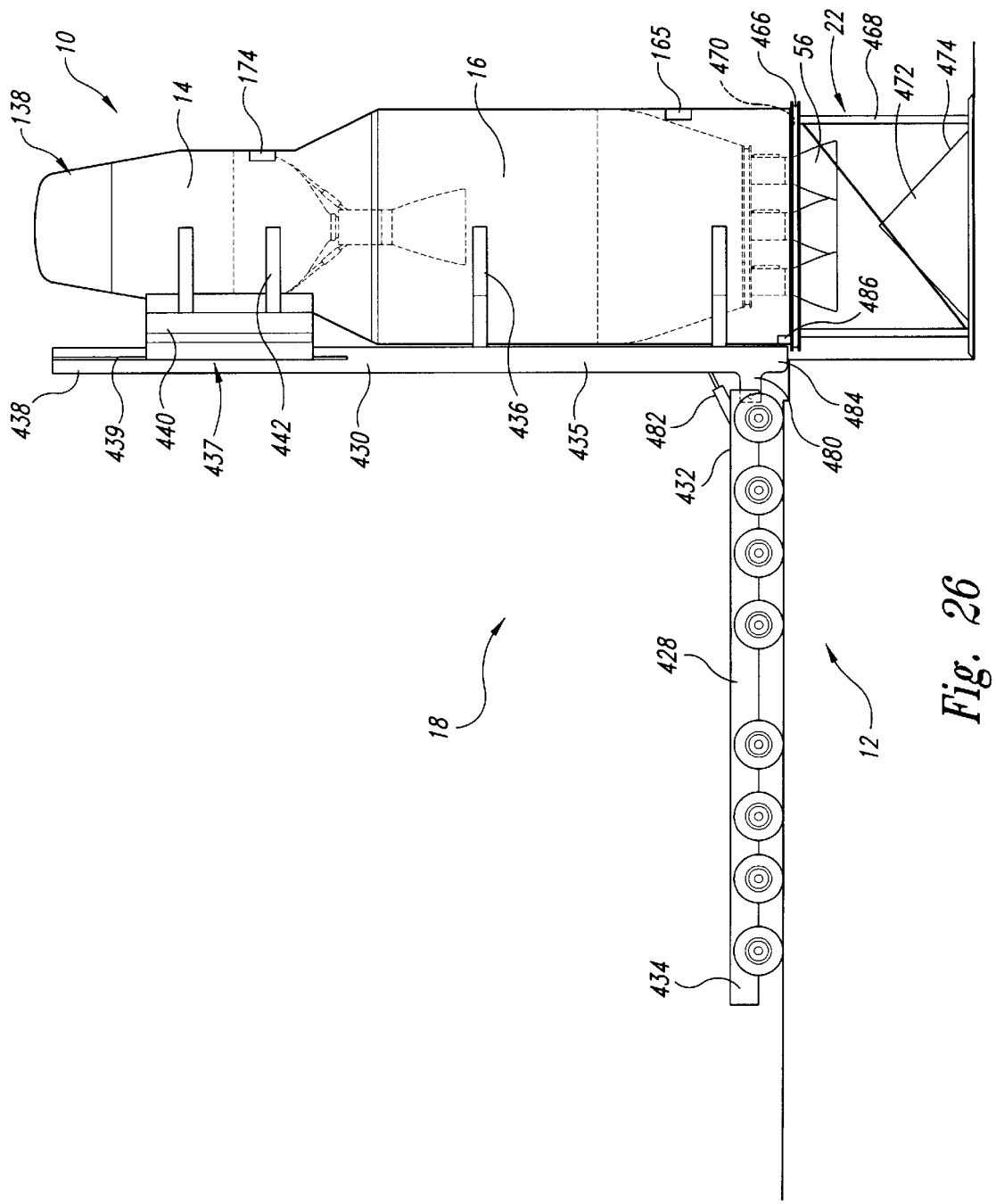
FIG. 26 is a side elevation view of the assembly and launch transport vehicle of FIG. 1 shown in a vertical take-off position.

As best seen in FIGS. 1 and 26, the assembly and launch transport vehicle 18 positions the distal end of the aerospace vehicle 10 adjacent to the takeoff stand 22 and then pivots the support beam 430 and aerospace vehicle as a unit to the vertical take-off position. The support beam 430 pivots about a hinge structure 480 connecting the rear end 484 of the support beam to the rear end 432 of the main frame 428. In the preferred embodiment, the transport vehicle 18 includes hydraulic erection cylinders 482 connected to the frame 428 and to the rearward portion 435 of the support beam 430. The erection cylinders 482 are actuated to pivot the support beam between the horizontal and vertical positions. As the support beam 430 and the aerospace vehicle 10 approach the vertical take-off position, the rear end 484 of the support beam engages the ground. Accordingly, the rear end 484 stabilizes the support beam and aerospace vehicle 10 and reacts tipping forces that occur as the center of mass of the aerospace vehicle moves upwardly and rearwardly past the rear end 432 of the main frame 428 during erection to the take-off position.

Erection of the aerospace vehicle 10 is completed as the distal portion of the lower stage 16 is set onto the support flange 470 of the take-off stand 22. In the preferred embodiment, the take-off stand 22 has a key member 486 that is keyed to the distal portion 50 of the lower stage 16, to ensure proper alignment of the aerospace vehicle 10 on the take-off stand.

Once the aerospace vehicle 10 is on the take-off stand 460, standard power lines, computer lines, and fuel and gas tanker lines are temporarily connected to the mating connectors at the umbilical panels 67 and 165, as discussed above, for final preparation for take-off. In the event a take-off is scrubbed, the aerospace vehicle 10 can be de-fueled and de-pressurized through the same lines. When the aerospace vehicle 10 is ready for take-off, the support arms 436 and 442 are moved to the outward, released position, the support beam 430 is lowered back onto the launcher in the horizontal position, and the launch transport vehicle is secured at the take-off area 20 for the remainder of the take-off sequence. The aerospace vehicle 10 then fires the lower stage engines 56 and takes off along its ascending trajectory as discussed above.

Numerous modifications and variations of the reusable two-stage aerospace vehicle and transport and launch system in accordance with the present invention and disclosed herein will occur to those skilled in the art in view of this disclosure. Therefore, it is to be expressly understood that these modifications and variations, and equivalents thereof, may be practices while remaining within the spirit and the scope of the invention as defined by the following claims.

We claim:

1. A reusable two-stage aerospace vehicle for use in carrying a payload from a take-off and landing area on Earth to an Earth orbit and returning to and landing at the take-off and landing area, comprising:

a wingless upper stage movable along a first trajectory away from the take-off and landing area to the Earth orbit and along a second trajectory from the Earth orbit to the take-off and landing area, the upper stage being reusable for a second Earth-to-orbit flight after the upper stage returns to the take-off and landing area, the upper stage including:

an upper body structure having a first proximal portion, a first distal portion, and a first interior area extending therebetween;

a payload support structure connected to the upper body structure and adapted to removably receive the payload;

a first power plant connected to the upper body structure and being activatable to propel the first body structure along a selected portion of the first trajectory to the Earth orbit and being activatable to move the upper stage out of the Earth orbit to the second trajectory;

a first fuel tank assembly positioned within the first interior area and coupled to the first power plant;

a first landing system attached to the upper body structure and being deployable as the upper stage moves along the second trajectory toward the take-off and landing area, the first landing system having a first velocity reduction system to reduce the velocity of the upper stage relative to the take-off and landing area, and the first landing system having a first landing member that engages the take-off and landing area and supports the first body structure above the ground upon landing; and a wingless lower stage releasably connected to the wingless upper stage, the lower stage being movable along the first trajectory away from the take-off and landing area to a separation portion along the first trajectory, the lower stage being separable from the upper stage at the separation portion and being movable along a return trajectory from the separation portion to the take-off and landing area, the lower stage being reconnectable to the upper stage and reusable for the second flight after the lower stage returns to the take-off and landing area, the lower stage including:

a lower body structure coaxially aligned with the upper body structure and having a second proximal portion, a second distal portion, and a second interior area extending therebetween, the second distal portion being connected to the first proximal portion of the upper body structure;

a second power plant connected to the lower body structure and being activatable to propel the upper and lower stages along the first trajectory from the take-off and landing area to the separation portion, the second power plant being activatable after separation of the upper and lower stages to move the lower stage from the separation portion to the return trajectory for return to the take-off and landing area;

a second fuel tank assembly positioned within the second interior area and being coupled to the second power plant;

a separation system connected to the lower body structure and releasably connected to the upper stage, the separation system being activatable to separate the upper body structure from the lower body structure at the separation portion of the first trajectory; and a second landing system attached to the lower body structure and being deployable as the lower stage moves along the return trajectory at a second velocity toward the take-off and landing area, the second landing system having a second velocity reduction system to reduce the second velocity of the lower stage, and the second landing system having a second landing member that engages the take-off and landing area and supports the lower body structure above the ground upon landing.

2. The aerospace vehicle of claim 1 wherein the payload support structure is mounted to the proximal portion of the upper body structure.

3. The aerospace vehicle of claim 2, further comprising a one-piece payload fairing connected to the proximal portion of the upper body structure, the payload fairing being movable between an open position with the payload support structure being exposed and a closed position with the payload support structure being covered to enclose the payload, the payload fairing defining a leading portion of the upper stage as the upper stage moves along the first and second selected trajectories.

4. The aerospace vehicle of claim 3 wherein the upper stage passes through an outer atmosphere of the Earth as the upper stage moves along the second trajectory, and the payload fairing being a heat shield that dissipates frictional heat generated at the payload fairing as the upper stage passes through the outer atmosphere.

5. The aerospace vehicle of claim 1 wherein the first velocity reduction system includes a parachute attached to the upper body structure, and the first landing member includes a plurality of airbags that inflate above the take-off and landing area to cushion the upper body structure upon landing.

6. The aerospace vehicle of claim 5 wherein the first landing member includes a gas source, and at least one of the airbags has a vented outer bag and a sealed inner bag contained within the vented outer bag, the vented outer bag and the sealed inner bag being inflated by a gas from the gas source, the vented outer bag having vents that allow a portion of the gas to exit therethrough upon landing of the upper stage to provide damping to the one airbag upon landing and the sealed inner bag supporting the upper body structure above the ground.

7. The aerospace vehicle of claim 1 wherein the second velocity reduction system includes a plurality of deployable parachutes attached to the lower body structure, and the second landing member includes a plurality of airbags that inflate above the take-off and landing area to cushion the lower body structure upon landing.

8. The aerospace vehicle of claim 7 wherein the second landing member includes a gas source, and at least one of the airbags has a vented outer bag and a sealed inner bag contained within the vented outer bag, the vented outer bag and the sealed inner bag being inflated by a gas from the gas source, the vented outer bag having vents that allow a portion of the gas to exit therethrough upon landing of the lower stage to provide damping to the one airbag upon landing and the sealed inner bag supporting the upper body structure above the ground.

9. The aerospace vehicle of claim 1 wherein the second power plant includes a plurality of engines powered by liquid oxygen and kerosene fuel.

10. The aerospace vehicle of claim 9 wherein the second fuel tank assembly is sized to carry a volume of the fuel with a first portion of the fuel being partially consumed by the engines as the engines propel the upper and lower stages from the take-off and landing area to the separation portion, one of the engines reactivated at the separation portion after separation of the upper and lower body structures to propel the lower stage away from the separation portion along a portion of the third trajectory, and a second portion of the fuel being consumed by the one of the engines after being reactivated.

11. The aerospace vehicle of claim 1 wherein the first power plant is an engine powered by liquid oxygen and kerosene fuel.

12. The aerospace vehicle of claim 1, further comprising a thrust distributing structure integrally attached to the first fuel tank assembly, the first power plant being mounted to the thrust distributing structure.

13. The aerospace vehicle of claim 1, further comprising a thrust distributing structure integrally attached to the second fuel tank assembly, the second power plant being mounted to the thrust distributing structure.

14. The aerospace vehicle of claim 1 wherein the separation system includes a sealing structure that creates a differential pressure to exert a separating force between the upper and lower body structures to move the upper and lower body structures apart from each other at the separation portion of the first trajectory, the sealing structure including a substantially gas impervious separation sleeve having a fixed length being attached to the upper and lower body structures and extending between the upper and lower body structures after the upper and lower body structures are initially separated at the separation portion, the separation sleeve containing gas between the upper and lower body structures as the upper and lower body structures move apart from each other until a distance between the upper and lower body structure exceeds the length of the separation sleeve.

15. The aerospace vehicle of claim 14 wherein the separation sleeve is releasably connected to the upper body structure.

16. The aerospace vehicle of claim 1 wherein the lower body structure has a first axis that substantially aligns with the first trajectory as the upper and lower stages move from the take-off and landing area to the separation portion, and the lower stage further includes a vehicle redirection assembly connected to the lower body structure, the vehicle redirection assembly being activatable to rotate the lower body structure so the first axis rotates out of alignment with the first trajectory to position the lower body structure for movement along the return trajectory.

17. The aerospace vehicle of claim 16 wherein the vehicle redirection assembly is a drogue parachute assembly.

18. The aerospace vehicle of claim 1 wherein the upper stage further includes a fuel tank pressurization system having a pressurant gas source and a gas line connecting the pressurant gas source to the first fuel tank assembly, the pressurant gas source providing a pressurized gas to the first tank assembly to pressurize the first fuel tank assembly at a selected pressure, and the upper stage further including orientation control thrusters attached to the upper body structure and coupled to the first fuel tank assembly, the orientation control thrusters being powered by the pressurized gas to control the orientation of the upper body structure.

19. The aerospace vehicle of claim 1 wherein the lower stage further includes a fuel tank pressurization system having a pressurant gas source and a gas line connecting the pressurant gas source to the second fuel tank assembly, the pressurant gas source providing pressurized gas to the second fuel tank assembly to pressurize the second fuel tank assembly at a selected pressure, and the lower stage further including orientation control thrusters attached to the lower body structure and coupled to the second fuel tank assembly, the orientation control thrusters being powered by the pressurized gas from the second fuel tank to control the orientation of the lower body structure.

20. The aerospace vehicle of claim 1 wherein the upper stage is a flare stabilized vehicle, the upper body structure having a substantially constant cross-sectional area from the distal portion to the proximal portion, the proximal portion being an outwardly flared portion with a continually increasing cross-sectional area to form a flared proximal portion, the flared proximal portion providing aerodynamic flight stabilization to the upper stage as the upper stage moves along the second trajectory.

21. The aerospace vehicle of claim 20 wherein the upper stage passes through an outer atmosphere of the Earth as the upper stage moves along the second trajectory away from the Earth orbit, the flared proximal portion being a heat shield to dissipate frictional heat generated at the flared, proximal portion as the upper stage passes through the outer atmosphere.

22. A reusable two-stage aerospace vehicle for conducting an Earth-to-orbit flight from a take-off and landing area on Earth to an orbit around the Earth and for returning to the take-off and landing area and landing, comprising:

an upper stage movable along a first trajectory away from the take-off and landing area to the orbit and along a second trajectory from the orbit to the take-off and landing area, the upper stage including:

an upper body structure having a first proximal portion, a first distal portion, and a first interior area extending therebetween;

a first power plant connected to the first proximal portion and being activatable to propel the upper stage along a selected portion of the first trajectory to the orbit and being activatable to move the upper stage out of the orbit to the second trajectory;

a first fuel tank assembly within the first interior area and being connected to the first power plant;

a first landing system attached to the first body structure and being deployable as the vehicle stage moves along the second trajectory toward the take-off and landing area, the first landing system engaging the take-off and landing area and supporting the upper body structure upon landing; and a lower stage releasably connected to the upper vehicle stage, the lower stage being movable along the first trajectory away from the take-off and landing area to a separation portion along the first trajectory, the lower stage being separated from the upper stage at the separation portion and the lower stage being movable along a return trajectory after separation from the upper stage from the separation portion to the take-off and landing area, the lower stage being reconnectable to the upper stage and reusable for a second Earth-to-orbit flight after the lower stage returns to the take-off and landing area, the lower stage including:

a lower body structure having a second proximal portion, a second distal portion, and a second interior area extending therebetween, the second distal portion being connected to the first proximal portion of the upper body structure;

a second power plant connected to the lower body structure and being activatable to propel the upper and lower stages along the first trajectory from the take-off and landing area to the separation portion;

a second fuel tank assembly positioned within the second interior area and connected to the second power plant;

a separation sleeve attached to the upper and lower body structures, the proximal portion of the upper body structure and the distal portion of the lower body structure containing a gas therein when the upper and lower body structures are at the separation portion, the gas being at a pressure higher than ambient pressure at the separation portion of the first trajectory to exert a separating force on the upper and lower stages to move the upper and lower body structures apart from each other at the separation portion, the separation sleeve extending between the upper and lower body structures after the upper and lower body structures are initially separated at the separation portion, the separation sleeve having a fixed length and sealing the gas between the upper and lower body structures as the upper and lower body structures move apart from each other until a distance between the upper and lower body structures exceeds the fixed length of the separation sleeve; and a second landing system attached to the lower body structure and being deployable as the lower stage moves along the return trajectory toward the take-off and landing area, the second landing system engaging the take-off and landing area and supporting the lower body structure upon landing.

23. The aerospace vehicle of claim 22 wherein the separation sleeve is releasably connected to the proximal portion of the upper body structure.

24. The aerospace vehicle of claim 22 wherein the separation sleeve is a substantially gas impervious material.

25. The aerospace vehicle of claim 22 wherein the second power plant is activatable after separation of the upper and lower stages at the separation portion to move the lower structure from the separation portion along the return trajectory for return to the take-off and landing area.

26. The aerospace vehicle of claim 22 wherein the distal portion of the lower body structure has a vent therein that is coupled to the second interior area to allow a portion of the gas to exit the second interior area as the upper and lower stages approach the separation portion to prevent the pressure of the gas relative to ambient pressure from exceeding a selected pressure.

27. The aerospace vehicle of claim 22 wherein the gas is air when the upper and lower body structures are at the separation portion of the first trajectory, and the air has a pressure of approximately atmospheric pressure when the aerospace vehicle is at the take-off and landing area, and the air is vented as the aerospace vehicle moves away from the take-off and landing area toward the separation portion, to a pressure greater than ambient air pressure at the separation portion.

28. The aerospace vehicle of claim 22 wherein the gas is at a pressure above ambient air pressure at the separation portion of the first trajectory, and the gas exerts the separating force to move the upper and lower body structures away from each other at a relative speed of at least 6 meters per second.

29. The aerospace vehicle of claim 22 wherein the lower stage further includes a plurality of retaining members connected to the second distal portion of the lower body structure, the retaining members being releasably connected to the upper stage and being movable between a locked position and a released position, the retaining members being in the locked position as the upper and lower stages move along the first trajectory until the separation portion, the retaining members being simultaneously moved to the released position at the separation portion to allow the upper and lower stages to separate from each other.

30. The aerospace vehicle of claim 29 wherein the retaining members are connected to a pneumatic system attached to the lower body structure, the pneumatic system simultaneously moving all of the retaining members from the locked position to the released position.

31. The aerospace vehicle of claim 30 wherein the pneumatic system includes two tanks for containing a pressurant gas and a gas line operatively connecting each tank to each retaining member.

32. A reusable two-stage aerospace vehicle for use in carrying a payload on an Earth-to-orbit flight from a take-off and landing area on Earth to an orbit around the Earth and returning to the take-off and landing area, comprising:

a wingless upper stage movable along a first trajectory away from the take-off and landing area to the orbit and along a second trajectory from the orbit through an outer atmosphere of the Earth and returning to the take-off and landing area, the upper stage generating frictional heat as the upper stage moves through the outer atmosphere, the upper stage being reusable to carry a payload along a second Earth-to-orbit flight after the upper stage returns to the take-off and landing area, the upper stage including:

an upper body structure having a first distal portion and a first proximal portion;

a payload support structure connected to the first distal portion;

a single payload fairing connected to the first distal portion and positioned to cover the payload support structure and to enclose the payload therebetween, the payload fairing defining a leading portion of the upper vehicle stage as the upper stage moves along the first and second trajectories, the payload fairing being a heat shield to dissipate the frictional heat generated as the upper stage moves through the outer atmosphere;

a first power plant connected to the upper body structure and being activatable to propel the upper stage from the separation portion of the first trajectory to the orbit;

a first landing system attached to the upper body structure and being deployable as the upper stage moves along the second trajectory toward the take-off and landing area, the first landing system having a first landing member that engages the take-off and landing area and supports the upper body structure upon landing; and a wingless lower stage releasably connected to the wingless upper stage, the lower stage being movable along the first trajectory away from the take-off and landing area to a separation portion along the first trajectory, the lower stage being separable from the upper stage at the separation portion and being movable along a return trajectory to the take-off and landing area, the lower stage being reconnectable to the upper stage and reusable for the second Earth-to-orbit flight after the lower stage returns to the take-off and landing area, the lower stage including:
a lower body structure coaxially aligned with the upper body structure and having a second proximal portion and a second distal portion, the second distal portion being connected to the first proximal portion of the upper body structure;
a second power plant connected to the lower body structure, at least a portion of the second power plant being activatable to propel the upper and lower vehicle stages along the first trajectory from the take-off and landing area to the separation portion and a portion of the second power plant being activatable to direct the lower stage along the return trajectory; and
a second landing system attached to the lower body structure and being deployable as the lower stage moves along the return trajectory toward the take-off and landing area, the second landing system having a second landing member that engages the take-off and landing area and supports the lower body structure upon landing.

33. The aerospace vehicle of claim 32 wherein the payload fairing is a one-piece structure pivotally attached at a first portion of the payload fairing to the upper body structure and releasably secured at a second portion of the payload fairing to the upper body structure, the payload fairing being movable between an open position to expose the payload support structure and a closed position to cover the payload support structure.

34. The aerospace vehicle of claim 32 wherein the payload fairing is a blunt tipped structure having sidewalls that connect to the first proximal portion of the upper body structure when the payload fairing is in the closed position, and having an endwall extending between the sidewalls to define a leading surface of the upper stage as the upper stage moves along the first and second trajectories.

35. A reusable two-stage aerospace vehicle for moving in a first Earth-to-orbit flight from a take-off and landing area on Earth to an orbit around the Earth and returning to the take-off and landing area, comprising:

a wingless upper stage movable along a first trajectory away from the take-off and landing area to the orbit and along a second trajectory from the orbit to the take-off and landing area, the upper stage being reusable for a second Earth-to-orbit flight after the upper stage returns to the take-off and landing area, the upper stage including:
an upper body structure having a first proximal portion, a first distal portion and a first interior area therebetween;
a first power plant connected to the upper body structure;
a first fuel tank assembly positioned within the first interior area and connected to the first power plant;
a first parachute assembly connected to the upper body structure and being deployable to reduce a velocity of the upper stage relative to the take-off and landing area as the upper stage moves along the second trajectory toward the take-off and landing area;
a plurality of inflatable first airbag assemblies mounted to the upper body structure, each first airbag assembly having a first airbag and a first inflation device to inflate the first airbag as the upper stage moves along the second trajectory and prior to the upper stage landing at the take-off and landing area and cushioning and supporting the upper body structure upon landing; and
a wingless lower stage releasably connected to the upper stage, the lower stage being movable with the upper stage along the first trajectory away from the take-off and landing area to a separation portion along the first trajectory, the lower stage being separable from the upper stage at the separation portion and being movable along a return trajectory from the separation portion to the take-off and landing area, the lower return stage being reconnectable to the upper stage and reusable for the second Earth-to-orbit flight, the lower stage including:
a lower body structure having a second proximal portion, a second distal portion and a second interior area therebetween, the second distal portion being connected to the first proximal portion of the upper body structure;
a second power plant connected to the lower body structure and being activatable to propel the upper and lower vehicle stages along the first trajectory from the take-off and landing area to the separation portion, the second power plant being activatable after separation of the upper and lower stages to move the lower stage from the separation portion to the return trajectory for return to the take-off and landing area;
a second fuel tank assembly positioned in the second interior area and connected to the second power plant;
a second parachute assembly connected to the lower body structure and being deployable to reduce a second velocity of the lower stage relative to the take-off and landing area as the lower stage moves along the return trajectory toward the take-off and landing area; and
a plurality of inflatable second airbag assemblies mounted to the lower body structure, each second airbag assembly having a second airbag and a second inflation device to inflate the airbag as the lower stage moves along the return trajectory and prior to landing the inflated second airbag engaging the take-off and landing area and cushioning and supporting the second body structure upon landing.

36. The aerospace vehicle of claim 35 wherein the first inflation devices each include a pressurized gas source and each first airbag has a vented outer bag and a sealed inner bag contained within the vented outer bag, the vented outer bag and the sealed inner bag being inflated by a gas from the pressurized gas source, the vented outer bag having a vent that allows a portion of the gas to exit therethrough upon landing of the upper stage to provide damping to the respective first airbag upon landing, the sealed inner bags supporting the upper body structure above the take-off and landing zone.

37. The aerospace vehicle of claim 35 wherein the second inflation devices each include a pressurized gas source, and each second airbag has a vented outer bag and a sealed inner bag contained within the vented outer bag, the vented outer bag and the sealed inner bag being inflated by a gas from the pressurized gas source, the vented outer bag having a vent that allows a portion of the gas to exit therethrough upon landing of the lower stage to provide damping to the respective second airbag upon landing, the sealed inner bags supporting the lower body structure above the take-off and landing zone.

38. A reusable two-stage aerospace vehicle for an Earth-to-orbit flight from a take-off and landing area on Earth to an orbit around the Earth and returning to the take-off and landing area, comprising:
an upper stage movable along a first trajectory away from the take-off and landing area to the orbit and along a second trajectory from the orbit to the take-off and landing area, the upper stage being reusable for a second Earth-to-orbit flight after the upper stage returns to the take-off and landing area, the upper stage including:

an upper body structure having a first proximal portion, a first distal portion, an interior area extending therebetween, and a first longitudinal axis extending through the first interior area;
a first power plant connected to the upper body structure;
a first fuel tank assembly positioned in the interior area and connected to the first power plant;
a first landing system attached to the upper body structure and being deployable as the upper stage moves along the second trajectory toward the take-off and landing area, the first landing system having a first landing member that engages the take-off and landing area and supports the upper body structure upon landing; and
a lower stage releasably connected to the wingless upper stage, the lower stage having a center of mass and being movable along the first trajectory away from the take-off and landing area to a separation portion along the first trajectory, the lower stage being separable from the upper stage at the separation portion and being movable along a return trajectory from the separation portion to the take-off and landing area, the lower stage being reconnectable to the upper stage and reusable for the second Earth-to-orbit flight, the lower stage including:
a lower body structure having a second proximal portion, a second distal portion, and a second longitudinal axis extending through the second proximal and distal portions, the second longitudinal axis being coaxially aligned with the first longitudinal axis, the second distal portion being connected to the first proximal portion of the upper body structure;
a separation system releasably interconnecting the upper and lower body structures, the separation system being activatable to separate the upper body structure from the lower body structure at the separation portion of the first trajectory;
a vehicle redirection parachute connected to the lower body structure at an attachment portion away from the center of mass, the redirection parachute being deployable from a packed position to a deployed position, the redirection parachute in the deployed position exerting a drag force on the lower body structure at the attachment portion to rotate the lower body structure relative to the upper body structure after separation with the second longitudinal axis being rotated out of coaxial alignment with the first longitudinal axis to position the lower body structure to align with the return trajectory;
a second power plant connected to the lower body structure and being activatable to propel the upper and lower stages along the first trajectory from the take-off and landing area to the separation portion, the second power plant being activatable after separation of the upper and lower stages to move the lower stage from the separation portion to the return trajectory for return to the take-off and landing area; and
a second landing system attached to the lower body structure and being deployable as the lower stage moves along the return trajectory toward the take-off and landing area, the second landing system having a second landing member that engages the take-off and landing area and supports the lower body structure upon landing.

39. A reusable two-stage aerospace vehicle for use in an Earth-to-orbit flight from a take-off and landing area on Earth to an orbit around the Earth and returning to the take-off and landing area, comprising:

a wingless upper stage movable along a first trajectory away from the take-off and landing area to the orbit and along a second trajectory from the orbit to the take-off and landing area, the upper stage being reusable for a second Earth-to-orbit flight after the upper stage returns to the take-off and landing area, the upper stage including:

an upper body structure having a first proximal portion, a first distal portion, and a first interior area extending therebetween;

a first power plant connected to the upper body structure and being activatable to propel the upper body structure along a selected portion of the first trajectory to the orbit and being activatable to move the upper stage out of the orbit to the second trajectory;

a first fuel tank assembly positioned within the first interior area and connected to the first power plant;

a first landing system attached to the upper body structure and being deployable as the upper stage moves along the second trajectory toward the take-off and landing area, the first landing system having a first landing member that engages the take-off and landing area and supports the upper body structure upon landing;

a first flight control computer assembly mounted to the upper body structure, and having a plurality of first sensors mounted to the upper body structure, the first power plant, and the first landing system; and a wingless lower stage releasably connected to the wingless upper stage, the lower stage being movable with the upper stage along the first trajectory away from the take-off and landing area to a separation portion along the first trajectory, the lower stage being separable from the upper stage at the separation portion and being movable along a return trajectory from the separation portion to the take-off and landing area, the lower stage being reconnectable to the upper stage and reusable for the second Earth-to-orbit flight after the lower stage returns to the take-off and landing area, the lower stage including:

a lower body structure coaxially aligned with the upper body structure and having a second proximal portion, a second distal portion, and a second interior area extending therebetween, the second distal portion being connected to the first proximal portion of the upper body structure;

a second power plant connected to the lower body structure, at least a portion of the second power plant being activatable to propel the upper and lower stages along the first trajectory from the take-off and landing area to the separation portion and a portion being activatable to direct the lower stage along the return trajectory;

a second fuel tank positioned within the second interior area and connected to the second power plant;

a separation system releasably interconnecting the upper and lower body structures, the separation system being activatable to separate the upper body structure from the lower body structure at the separation portion of the first trajectory;

a second landing system attached to the lower body structure and being deployable as the lower stage moves along the return trajectory toward the take-off and landing area, the second landing system having a second landing member that engages the take-off and landing area and supports the lower body structure upon landing; and a second flight control computer assembly mounted to the lower body structure and having a plurality of second sensors mounted to the lower body structure, the second power plant, the separation system, and the second landing system.

40. A reusable two-stage aerospace vehicle for a first Earth-to-orbit flight from a take-off and landing area on Earth to an orbit around the Earth and returning to the take-off and landing area, comprising:

a wingless upper stage movable along a first trajectory away from the take-off and landing area to the orbit and along a second trajectory from the orbit to the take-off and landing area, the upper stage being reusable for a second Earth-to-orbit flight after the upper stage returns to the take-off and landing area, the upper stage including:

an upper body structure having a first proximal portion, a first distal end portion and a first interior area therebetween;

a payload support structure connected to the upper body structure;

a first power plant connected to the first body structure and being activatable to propel the upper stage along a selected portion of the first trajectory to the orbit;

a first microprocessor assembly connected to the first power plant and a plurality of first sensors attached to the first power plant, the first sensors being operatively connected the first microprocessor to transmit first data between the first sensors and the first microprocessor;

a first fuel tank assembly positioned within the first interior area and being connected to the first power plant;

a second microprocessor and a plurality of second sensors connected to the first fuel tank assembly, the second sensors being operatively connected to the second microprocessor to transmit second data between the second sensors and the second microprocessor;

a first landing system attached to the upper body structure and being deployable as the upper stage moves along the second trajectory at a first velocity toward the take-off and landing area, the first landing system having a first landing member that engages the take-off and landing area and that supports the upper body structure off of the Earth upon landing;

a third microprocessor connected to the first landing system and a plurality of third sensors connected to the first landing system and being operatively connected to the third microprocessor to transmit third data to the third microprocessor;

a first flight control computer assembly attached to the upper body structure and having a fourth microprocessor, a first data storage device, a first inertial measurement device, a first positioning system receiver, and a first power supply;

a first data bus connected to the first flight control computer and being connected to each of the first, second, and third microprocessors, the first data bus transmitting the first, second, and third data between the first flight control computer assembly and the respective first, second, and third microprocessors; and a wingless lower stage releasably connected to the upper stage, the lower stage being movable along the first trajectory away from the take-off and landing area to a separation portion along the first trajectory, being separable from the upper stage at the separation portion, and being movable along a return trajectory from the separation portion to the take-off and landing area, the lower stage being reconnectable to the upper stage and reusable for the second Earth-to-orbit flight after the lower stage returns to the take-off and landing area, the lower stage including:

a lower body structure coaxially aligned with the first body structure, and having a second proximal portion and a second distal portion, the second distal portion being connected to the first proximal portion of the upper body structure;

a second power plant connected to the lower body structure and being activatable to propel the upper and lower stages along the first trajectory from the take-off and landing area to the separation portion, the second power plant being activatable after separation of the upper and lower stages to move the lower stage from the separation portion to the return trajectory for return to the take-off and landing area;

a second fuel tank assembly connected to the lower body structure and connected to the second power plant; and a second landing system attached to the lower body structure and being deployable as the lower stage moves along the return trajectory toward the take-off and landing area, the second landing system having a second landing member that engages the take-off and landing area and supports the lower body structure.

41. The aerospace vehicle of claim 40 wherein the first power plant and the first microprocessor are removable from the upper body structure as a unit, and the first landing system and the third microprocessor are removable from the upper body structure as a unit.

42. The aerospace vehicle of claim 40 wherein the lower stage further includes:

a fifth microprocessor connected to the second power plant and a plurality of fourth sensors mounted on the second power plant, the fourth sensors being operatively connected to the fifth microprocessor to transmit fourth data to the fifth microprocessor;

a sixth microprocessor connected to the second fuel tank, and a plurality of fifth sensors mounted to the second fuel tank assembly, the fifth sensors being operatively connected to the sixth microprocessor to transmit fifth data to the sixth microprocessor;

a seventh microprocessor connected to the second landing system, and a plurality of sixth sensors mounted on the second landing system, the sixth sensors being operatively connected to the seventh microprocessor to transmit sixth data to the seventh microprocessor;

a second flight control computer assembly attached to the lower body structure and having a eighth microprocessor, a second data storage device, a second inertial measurement device, a second positioning system receiver, and a second dedicated power supply; and a second data bus connected to the second flight control computer assembly and being connected to each of the fifth, sixth, seventh, and eighth microprocessors, the second data bus transmitting the fourth, fifth, sixth, and seventh data between the second flight control computer assembly and the respective fifth, sixth, seventh, and eighth microprocessors.

43. A method of transporting a payload from a take-off and landing area on Earth to an orbit around the Earth using a reusable two-stage aerospace vehicle and returning the aerospace vehicle to the take-off and landing area, comprising the steps of:

releasably attaching the payload to the aerospace vehicle, the aerospace vehicle having an upper stage and a lower stage separately connected together, the upper stage including an upper body structure with a first proximal portion and a first distal portion, a payload support structure mounted to the first distal portion, a payload fairing mounted to the first distal portion, and a first power plant connected to first body structure, the lower stage including a second body portion with a second proximal portion and a second distal portion and a second power plant connected to the second body structure, the payload fairing being movable between an open position with the payload support structure being exposed and a closed position with the payload support structure being covered;

positioning the aerospace vehicle on a take-off area;

activating the second power plant and propelling the upper and lower stages upwardly away from the take-off area along a first trajectory away from the Earth to a separation portion of the first trajectory, the payload fairing being in the closed position and defining a leading portion of the aerospace vehicle as the aerospace vehicle moves along the first trajectory;

separating the lower stage from the upper stage at the separation portion of the first trajectory and moving the upper and lower stages apart from each other;

activating the first power plant of the upper stage after separation of the stages and propelling the upper stage from the separation portion along the first trajectory to the orbit;

activating a portion of the second power plant of the lower stage after separation of the upper and lower stages and propelling the lower stage to the return trajectory;

moving the second stage along the return trajectory and landing the second stage on the take-off and landing area;

activating the second landing system as the lower stage approaches the take-off and landing area and landing the lower stage on the landing area with the first landing members engaging the landing area with the lower stage being reusable for a second Earth-to-orbit flight;

moving the upper stage along the orbit and moving the payload fairing from the closed position to the open position to expose the payload;

deploying the payload to a selected Earth orbit from the payload support structure when the payload fairing is in the open position and moving the payload fairing to the closed position after deployment of the payload;

moving the upper stage from the orbit to a second trajectory from the Earth orbit toward the Earth, through an outer atmosphere of the Earth, and to the landing area, the upper stage generating frictional heat at the payload fairing as the upper stage moves through the outer atmosphere; and landing the upper stage on the take-off and landing area with the upper stage being reconnectable to the lower stage after returning to the landing area and being reusable for the second Earth-to-orbit flight.

44. The method of claim 43, further including the steps of:

deactivating the second power plant as the upper and lower stages approach the separation portion of the first trajectory;

rotating the lower stage relative to the first trajectory after the upper and lower stages have separated; and reactivating the second power plant and propelling the lower stage along a return trajectory away from the first trajectory after separation to the take-off and landing area.

45. The method of claim 44 wherein the step of rotating the lower stage includes deploying a vehicle redirection parachute assembly attached to the lower body structure and exerting with the parachute assembly a rotating force on the lower body structure to rotate the lower stage.

46. The method of claim 43 wherein the step of releasably attaching the payload to the aerospace vehicle includes attaching the payload at an installation area, and the method further includes the steps of transporting the aerospace vehicle in a generally horizontal position from the installation area to the take-off area after the payload is attached and erecting the aerospace vehicle to a vertical take-off position.

47. The method of claim 43 wherein the first proximal portion of the upper body structure and the second distal portion of the lower body structure contain a volume of separation air at atmospheric pressure when the aerospace vehicle is at the take-off area, and the method further includes the steps of retaining at least some of the separation air as the aerospace vehicle moves along the first trajectory to the separation position so that the pressure of the retained air is greater than ambient air pressure at the separation portion, and the step of separating the upper stage from the lower stage includes releasing the upper and lower stages from each other so that the pressure of the retained air relative to ambient pressure exerts a separation force to push the upper and lower stages apart from each other.

48. The method of claim 47 wherein the step of retaining at least some of the separation air comprises placing an air impervious separation sleeve between the upper and lower body structures, the separation sleeve having a fixed length and the separation air being contained between the upper and lower body structures until a distance between the upper and lower body structures exceeds the fixed length of the separation sleeve and the separation sleeve disengages from one of the upper and lower body structures.

49. The method of claim 43 wherein the step of activating the second landing system includes deploying a plurality of airbags attached to the lower body structure as the lower stage approaches the landing area, and landing the lower stage with the airbags engaging the landing area and cushioning the lower body structure, the airbags supporting the lower body structure out of engagement with the landing area.

50. The method of claim 43 wherein the step of propelling the upper stage to the orbit includes moving the upper vehicle into a 50° inclination orbit at an altitude in the range of 505 km to 545 km relative to the Earth.

51. The method of claim 43 wherein the step of propelling the upper stage to the orbit includes moving the upper vehicle into a 50° inclination orbit at an altitude in the range of 490 km to 520 km relative to the Earth.

52. The method of claim 43 wherein the step of propelling the upper stage to the orbit includes moving the upper vehicle into a 50° inclination orbit at an altitude in the range of 830 km to 870 km relative to the Earth.

53. The method of claim 43 wherein the step of propelling the upper stage to the orbit includes moving the upper vehicle into a 50° inclination orbit at an altitude in the range of 190 km to 870 km relative to the Earth.

54. The method of claim 43 wherein the step of propelling the upper stage to the orbit includes moving the upper vehicle into a 52° inclination orbit at an altitude in the range of 305 km to 1140 km relative to the Earth.

55. The method of claim 43 wherein the step of propelling the upper stage to the orbit includes moving the upper vehicle into a 52° inclination orbit at an altitude in the range of 190 km to 870 km relative to the Earth.

56. The method of claim 43 wherein the step of propelling the upper stage to the orbit includes moving the upper vehicle into a 86° inclination orbit at an altitude in the range of 505 km to 1020 km relative to the Earth.

57. The method of claim 43 wherein the step of propelling the upper stage to the orbit includes moving the upper vehicle into a 86° inclination orbit at an altitude in the range of 250 km to 910 km relative to the Earth.

* * * * *